(12) United States Patent
Chang et al.

(10) Patent No.: US 10,442,931 B2
(45) Date of Patent: Oct. 15, 2019

(54) DYE COMPOUND, COMPOSITION COMPRISING DYE COMPOUND, AND DISPLAY DEVICE USING DYE COMPOUND

(71) Applicant: Samsung Display Co. Ltd., Yongin-si, Gyeonggi-do (KR)

(72) Inventors: Jae Bok Chang, Incheon (KR); Ji Yun Park, Hwaseong-si (KR); Jae Hong Park, Seoul (KR); Hyung Guen Yoon, Hwaseong-si (KR); Kyung Hee Lee, Suwon-si (KR); Kyung Seon Tak, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 225 days.

(21) Appl. No.: 15/707,323

(22) Filed: Sep. 18, 2017

(65) Prior Publication Data
US 2018/0355179 A1    Dec. 13, 2018

(30) Foreign Application Priority Data
Jun. 8, 2017    (KR) .................. 10-2017-0071318

(51) Int. Cl.
*C09B 29/36*    (2006.01)
*C09B 29/00*    (2006.01)
(Continued)

(52) U.S. Cl.
CPC ...... *C09B 29/3665* (2013.01); *C09B 29/0085* (2013.01); *C09B 29/0808* (2013.01);
(Continued)

(58) Field of Classification Search
None
See application file for complete search history.

(56) References Cited

U.S. PATENT DOCUMENTS 4,562,249 A * 12/1985 Schwander ............. C09B 33/06
                                                    534/619
4,596,754 A *  6/1986 Tsutsui ................... G03G 5/047
                                                    430/49.43
(Continued)

FOREIGN PATENT DOCUMENTS

JP      60/151644       *  8/1985
JP      2013209367 A      10/2013
(Continued)

OTHER PUBLICATIONS

J. Griffiths, et al., "The Application of PPP-MO Theory to the Halochromism of 4-Aminoazobenzene Dyes", Dyes and Pigments 15, No. 4, 1991, 307-317.
(Continued)

*Primary Examiner* — Helene Klemanski
(74) *Attorney, Agent, or Firm* — Cantor Colburn LLP

(57) ABSTRACT

Provided are a dye compound, a composition comprising the dye compound, and a display device using the dye compound. The dye compound is represented by Formula 1.

(1)

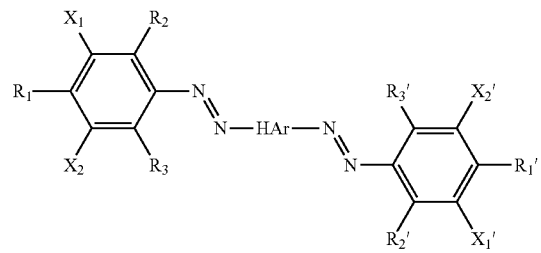

20 Claims, 21 Drawing Sheets

(51) Int. Cl.

| | |
|---|---|
| C09B 29/08 | (2006.01) |
| C09B 35/023 | (2006.01) |
| C09B 35/025 | (2006.01) |
| C09B 35/027 | (2006.01) |
| C09B 35/34 | (2006.01) |
| C09B 67/00 | (2006.01) |
| C09K 19/24 | (2006.01) |
| C09K 19/30 | (2006.01) |
| C09K 19/60 | (2006.01) |
| G02B 5/30 | (2006.01) |
| G02F 1/1335 | (2006.01) |
| C09B 29/52 | (2006.01) |
| C09B 67/22 | (2006.01) |
| C09K 19/34 | (2006.01) |
| C09B 29/033 | (2006.01) |
| G02F 1/1333 | (2006.01) |

(52) U.S. Cl.
CPC ........ *C09B 29/3691* (2013.01); *C09B 35/023* (2013.01); *C09B 35/025* (2013.01); *C09B 35/027* (2013.01); *C09B 35/34* (2013.01); *C09B 67/0041* (2013.01); *C09B 67/0055* (2013.01); *C09K 19/24* (2013.01); *C09K 19/3048* (2013.01); *C09K 19/3068* (2013.01); *C09K 19/3086* (2013.01); *C09K 19/3483* (2013.01); *C09K 19/3497* (2013.01); *C09K 19/601* (2013.01); *G02B 5/3016* (2013.01); *G02F 1/133528* (2013.01); *C09K 2019/305* (2013.01); *C09K 2019/3069* (2013.01); *G02F 1/133533* (2013.01); *G02F 2001/133354* (2013.01); *G02F 2202/04* (2013.01)

(56) References Cited

U.S. PATENT DOCUMENTS

| | | | |
|---|---|---|---|
| 4,764,599 A * | 8/1988 | Colberg | C08K 5/3462 106/31.77 |
| 8,728,976 B2 | 5/2014 | Morishima | |
| 9,889,321 B2 * | 2/2018 | Gebert-Schwarzwaelder | A61K 8/496 |
| 2011/0177262 A1 * | 7/2011 | Kim | C09J 133/08 428/1.54 |
| 2016/0216424 A1 * | 7/2016 | Seo | G02B 5/3016 |
| 2016/0274274 A1 * | 9/2016 | Yoo | C09B 35/021 |
| 2017/0306237 A1 * | 10/2017 | Morimoto | C09B 39/00 |
| 2018/0355181 A1 * | 12/2018 | Yoon | C09B 69/106 |

FOREIGN PATENT DOCUMENTS

| | | |
|---|---|---|
| JP | 2016011346 A | 1/2016 |
| JP | 2016139055 A | 8/2016 |
| JP | 2017037192 A | 2/2017 |
| KR | 1020100003715 A | 1/2010 |
| KR | 1020130098915 | 9/2013 |
| KR | 1020150077320 A | 7/2015 |
| KR | 1020160092163 A | 8/2016 |
| WO | 2005045485 A1 | 5/2005 |

OTHER PUBLICATIONS

M.A. Metwally, et al., "New disperse dyes derived from 1,3-thiazolidin-4-ones and -5-ones for dyeing polyester fabrics", Advances in Colour Science and Technology, vol. 7, No. 3, 2004, pp. 71-78.
The Search Report (dated Apr. 30, 2018), issued by the EPO for European patent application No. 17194656.9, which was filed Oct. 4, 2017.

\* cited by examiner

DYE COMPOUND, COMPOSITION COMPRISING DYE COMPOUND, AND DISPLAY DEVICE USING DYE COMPOUND

This application claims priority to Korean Patent Application No. 10-2017-0071318, filed on Jun. 8, 2017, and all the benefits accruing therefrom under 35 U.S.C. § 119, the content of which in its entirety is herein incorporated by reference.

BACKGROUND

1. Field

The present invention relates to a dye compound, a composition including the dye compound, and a display device using the dye compound.

2. Description of the Related Art

A polarizing element transmits a polarized component vibrating in a direction parallel to its transmission axis and absorbs a polarized component vibrating in a direction parallel to its absorption axis, so as to convert unpolarized incident light into light having a specific polarized state. The polarizing element having such polarization ability is applied to a display device, thereby allowing the display device to having various optical functions.

For example, in a liquid crystal display device, a polarizing element can perform a shutter function of adjusting the amount of light provided from a light source together with a liquid crystal layer, thereby realizing an image display. In another example, the polarizing element can convert unpolarized light into circularly polarized light together with a phase retardation layer, thereby suppressing the deterioration of display quality due to the reflection of external light.

There remains a need for an improved polarizing element which may be used in a display device.

SUMMARY

An aspect of the present invention is to provide a novel dichroic dye compound having a high dichroic ratio and excellent durability.

Another aspect of the present invention is to provide a composition for forming a polarizing element, the composition including the novel dichroic dye compound.

Still another aspect of the present invention is to provide a display device using the novel dichroic dye compound.

According to an exemplary embodiment of the invention, there is provided a dye compound. The dye compound, is represented by Formula 1:

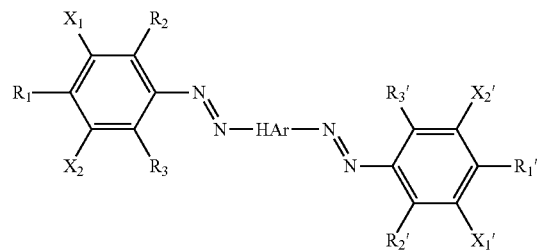
(1)

wherein in Formula 1, HAr is

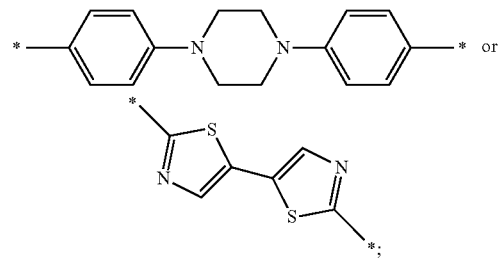
or $R_1$ and $R_{1'}$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

(wherein $R_{11}$ and $R_{12}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{13}$ (wherein n is an integer of 1 to 20, and $R_{13}$ is a halogen atom, a hydroxyl group, an amine group, an acryloyl group, an acrylate group, a methacryloyl group, or a methacrylate group), or *—O—$(CH_2)_n$—$R_{14}$ (wherein n is an integer of 1 to 20, and $R_{14}$ is a halogen atom, a hydroxyl group, an amine group, an acryloyl group, an acrylate group, a methacryloyl group, or a methacrylate group), or each of $R_1$ and $R_1'$ forms an aromatic ring together with any one of adjacent $X_1$, $X_2$, $X_1'$, and $X_2'$; $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

(wherein $R_{21}$ and $R_{22}$ are each independently a hydrogen atom, an alkyl group of $C_{1-5}$, an alkoxy group of $C_{1-5}$, an alkylalcohol group of $C_{1-5}$, or alkylamino group of $C_{1-5}$), *—$(CH_2)_n$—$R_{23}$ (wherein n is an integer of 1 to 5, and $R_{23}$ is a halogen atom, a hydroxyl group, an amine group, an acryloyl group, an acrylate group, a methacryloyl group, or a methacrylate group), or *—$(CH_2)_n$—$R_{24}$ (wherein n is an integer of 1 to 5, and $R_{24}$ is a halogen atom, a hydroxyl group, amine group, an acryloyl group, an acrylate group, a methacryloyl group, or a methacrylate group), or each of $R_2$, $R_3$, $R_2'$ and $R_3'$ forms an aromatic ring together with any one of adjacent $X_1$, $X_2$, $X_1'$, and $X_2'$; and $X_1$, $X_2$, $X_1'$, and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$, or each of $X_1$, $X_2$, $X_1'$, and $X_2'$ forms an aromatic ring together with any one of adjacent $R_1$, $R_2$, $R_3$, $R_1'$, $R_2'$, and $R_3'$.

In an exemplary embodiment, the compound represented by Formula 1 may be a compound represented by Formula A-2 or Formula B-2:

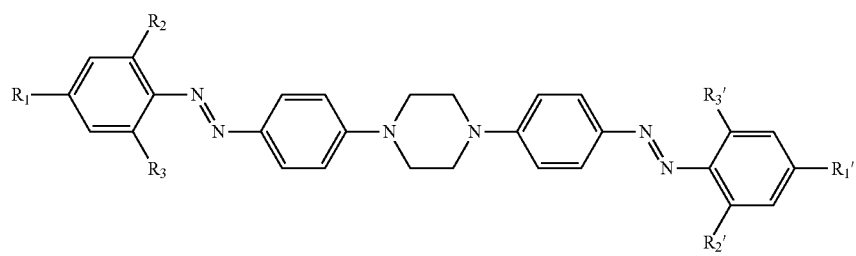

(A-2)

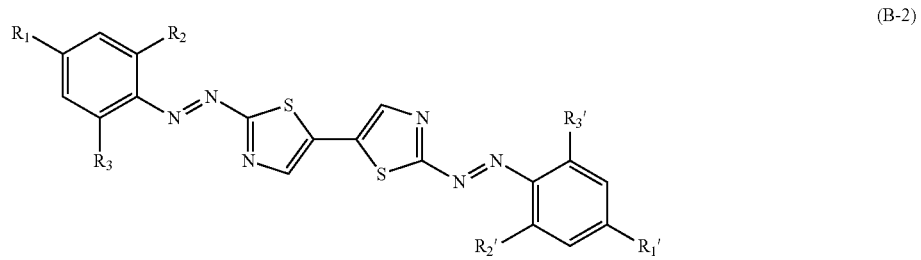

(B-2)

wherein in Formulae A-2 and B-2, $R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

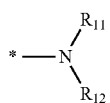

(wherein $R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{13}$ (wherein n is an integer of 1 to 20, and $R_{13}$ is a halogen atom, a hydroxyl group, an amine group, an acryloyl group, an acrylate group, a methacryloyl group, or a methacrylate group), or *—$(CH_2)_n$—$R_{14}$ (wherein n is an integer of 1 to 20, and $R_{14}$ is a halogen atom, a hydroxyl group, an amine group, an acryloyl group, an acrylate group, a methacryloyl group, or a methacrylate group); and $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

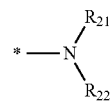

(wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$), *—$(CH_2)_n$—$R_{23}$ (wherein n is an integer of 1 to 5, and $R_{23}$ is a halogen atom, a hydroxyl group, an amine group, an acryloyl group, an acrylate group, a methacryloyl group, or a methacrylate group), or *—$(CH_2)_n$—$R_{24}$ (wherein n is an integer of 1 to 5, and $R_{24}$ is a halogen atom, a hydroxyl group, an amine group, an acryloyl group, an acrylate group, a methacryloyl group, or a methacrylate group).

In an exemplary embodiment, in Formulae A-2 and B-2, the number of carbon atoms of $R_1$ may be more than the number of carbon atoms of $R_2$ and $R_3$, the number of carbon atoms of $R_1'$ may be more than the number of carbon atoms of $R_2'$ and $R_3'$, at least one of $R_2$ and $R_3$ may be a hydrogen atom, and at least one of $R_2'$ and $R_3'$ may be a hydrogen atom.

In an exemplary embodiment, the compound represented by Formula 1 may be a compound represented by Formula A-3, Formula B-3, or Formula B-4:

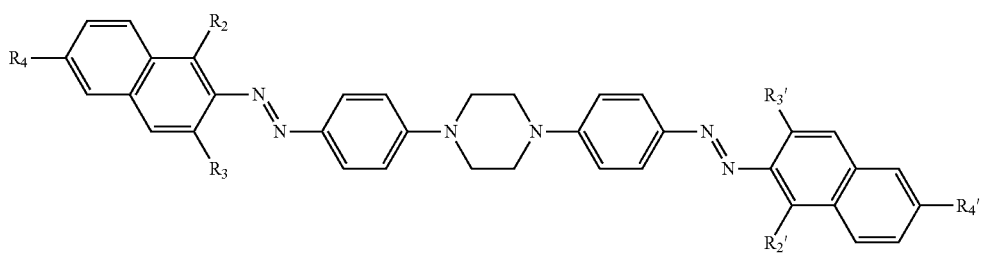

(A-3)

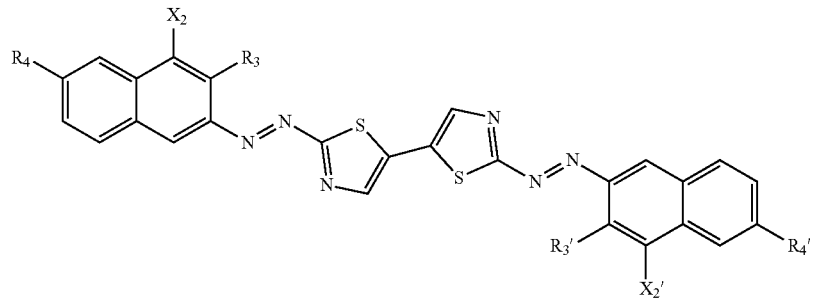

(B-3)

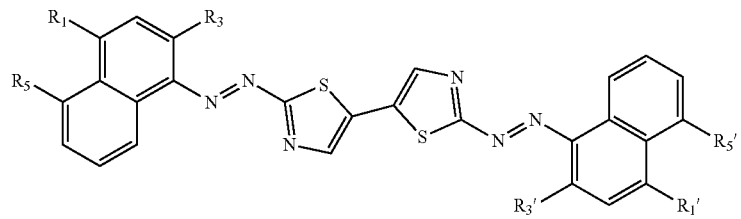

(B-4)

wherein in Formulae A-3, B-3, and B-4, $R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

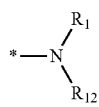

(wherein $R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{13}$ (wherein n is an integer of 1 to 20, and $R_{13}$ is a halogen atom, a hydroxyl group, an amine group, an acryloyl group, an acrylate group, a methacryloyl group, or a methacrylate group), or *—$(CH_2)_n$—$R_{14}$ (wherein n is an integer of 1 to 20, and $R_{14}$ is a halogen atom, a hydroxyl group, an amine group, an acryloyl group, an acrylate group, a methacryloyl group, or a methacrylate group); $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

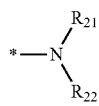

(wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$), *—$(CH_2)_n$—$R_{23}$ (wherein n is an integer of 1 to 5, and $R_{23}$ is a halogen atom, a hydroxyl group, an amine group, an acryloyl group, an acrylate group, a methacryloyl group, or a methacrylate group), or *—$(CH_2)_n$—$R_{24}$ (wherein n is an integer of 1 to 5, and $R_{24}$ is a halogen atom, a hydroxyl group, an amine group, an acryloyl group, an acrylate group, a methacryloyl group, or a methacrylate group); $X_2$ and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$; $R_4$ and $R_4'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

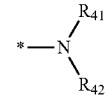

(wherein $R_{41}$ and $R_{42}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{43}$ (wherein n is an integer of 1 to 20, and $R_{43}$ is a halogen atom, a hydroxyl group, an amine group, an acryloyl group, an acrylate group, a methacryloyl group, or a methacrylate group), or *—$(CH_2)_n$—$R_{44}$ (wherein n is an integer of 1 to 20, and $R_{44}$ is a halogen atom, a hydroxyl group, an amine group, an acryloyl group, an acrylate group, a methacryloyl group, or a methacrylate group); and $R_5$ and $R_5'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

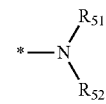

(wherein $R_{51}$ and $R_{52}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{53}$ (wherein n is an integer of 1 to 20, and $R_{53}$ is a halogen atom, a hydroxyl group, an amine group, an acryloyl group, an acrylate group, a methacryloyl group, or a methacrylate group), or *—$(CH_2)_n$—$R_{54}$ (wherein n is an integer of 1 to 20, and $R_{54}$ is a halogen atom, a hydroxyl group, an amine group, an acryloyl group, an acrylate group, a methacryloyl group, or a methacrylate group).

According to an exemplary embodiment of the invention, there is provided a composition comprising a dye compound. The composition comprises: a liquid crystalline compound; and a dye compound, wherein the dye compound is represented by Formula 1:

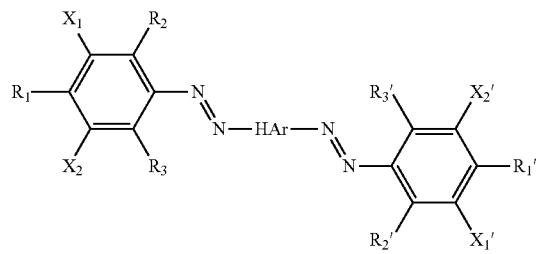

(1)

wherein in Formula (1), HAr is

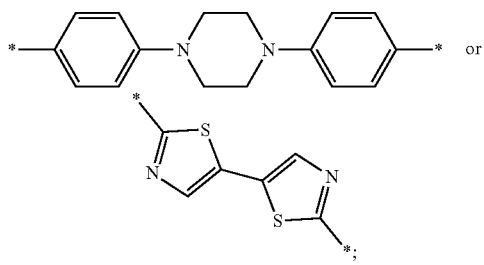 or 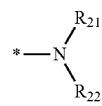

$R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

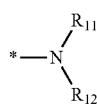

(wherein $R_{11}$ and $R_{12}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{13}$ (wherein n is an integer of 1 to 20, and $R_{13}$ is a halogen atom, a hydroxyl group, an amine group, an acryloyl group, an acrylate group, a methacryloyl group, or a methacrylate group), or *—$(CH_2)_n$—$R_{14}$ (wherein n is an integer of 1 to 20, and $R_{14}$ is a halogen atom, a hydroxyl group, an amine group, an acryloyl group, an acrylate group, a methacryloyl group, or a methacrylate group), or each of $R_1$ and $R_1'$ forms an aromatic ring together with any one of adjacent $X_1$, $X_2$, $X_1'$, and $X_2'$; $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$, $$*-N\begin{matrix}R_{21}\\R_{22}\end{matrix}$$

(wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$), *—$(CH_2)_n$—$R_{23}$ (wherein n is an integer of 1 to 5, and $R_{23}$ is a halogen atom, a hydroxyl group, an amine group, an acryloyl group, an acrylate group, a methacryloyl group, or a methacrylate group), or *—$(CH_2)_n$—$R_{24}$ (wherein n is an integer of 1 to 5, and $R_{24}$ is a halogen atom, a hydroxyl group, an amine group, an acryloyl group, an acrylate group, a methacryloyl group, or a methacrylate group), or each of $R_2$, $R_3$, $R_2'$ and $R_3'$ forms an aromatic ring together with any one of adjacent $X_1$, $X_2$, $X_1'$, and $X_2'$; and $X_1$, $X_2$, $X_1'$, and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$, or each of $X_1$, $X_2$, $X_1'$, and $X_2'$ forms an aromatic ring together with any one of adjacent $R_1$, $R_2$, $R_3$, $R_1'$, $R_2'$, and $R_3'$.

In an exemplary embodiment, the dye compound may include a compound represented by Formula A-1 and a compound represented by Formula B-2:

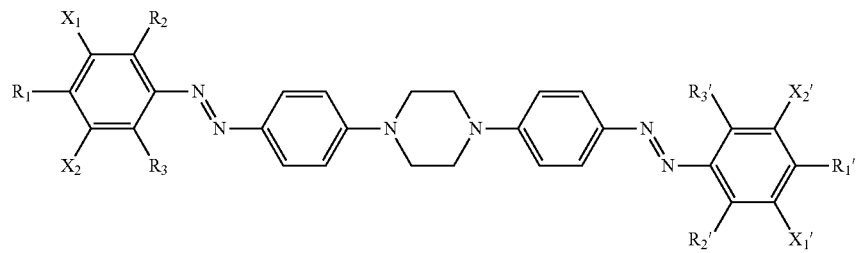

(A-1)

-continued (B-2)

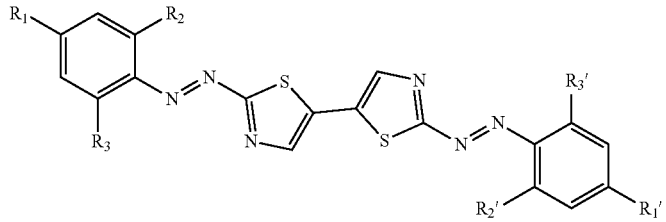

wherein in Formula A-1, $R_1$, $R_2$, $R_3$, $R_1'$, $R_2'$, $R_3'$, $X_1$, $X_2$, $X_1'$, and $X_2'$ have been defined in Formula 1, respectively, and in Formula B-2, $R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

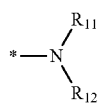

(wherein $R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{13}$ (wherein n is an integer of 1 to 20, and $R_{13}$ is a halogen atom, a hydroxyl group, an amine group, an acryloyl group, an acrylate group, a methacryloyl group, or a methacrylate group), or *—$(CH_2)_n$—$R_{14}$ (wherein n is an integer of 1 to 20, and $R_{14}$ is a halogen atom, a hydroxyl group, an amine group, an acryloyl group, an acrylate group, a methacryloyl group, or a methacrylate group); and $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

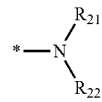

(wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$), *—$(CH_2)_n$—$R_{23}$ (wherein n is an integer of 1 to 5, and $R_{23}$ is a halogen atom, a hydroxyl group, an amine group, an acryloyl group, an acrylate group, a methacryloyl group, or a methacrylate group), or *—$(CH_2)_n$—$R_{24}$ (wherein n is an integer of 1 to 5, and $R_{24}$ is a halogen atom, a hydroxyl group, an amine group, an acryloyl group, an acrylate group, a methacryloyl group, or a methacrylate group).

In an exemplary embodiment, the dye compound may further include a compound represented by Formula C-2 or a compound represented by Formula D-2:

(C-2)

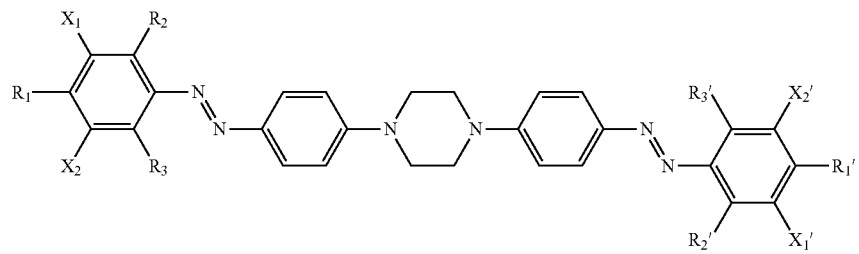

(D-2)

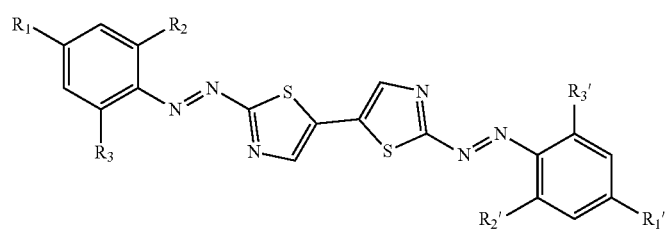

wherein in Formula C-2, $R_{c2}$ and $R_{c2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group, and in Formula D-2, $R_{d2}$ and $R_{d2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

In an exemplary embodiment, the dye compound may further include a compound represented by Formula B-3 or a compound represented by Formula B-4:

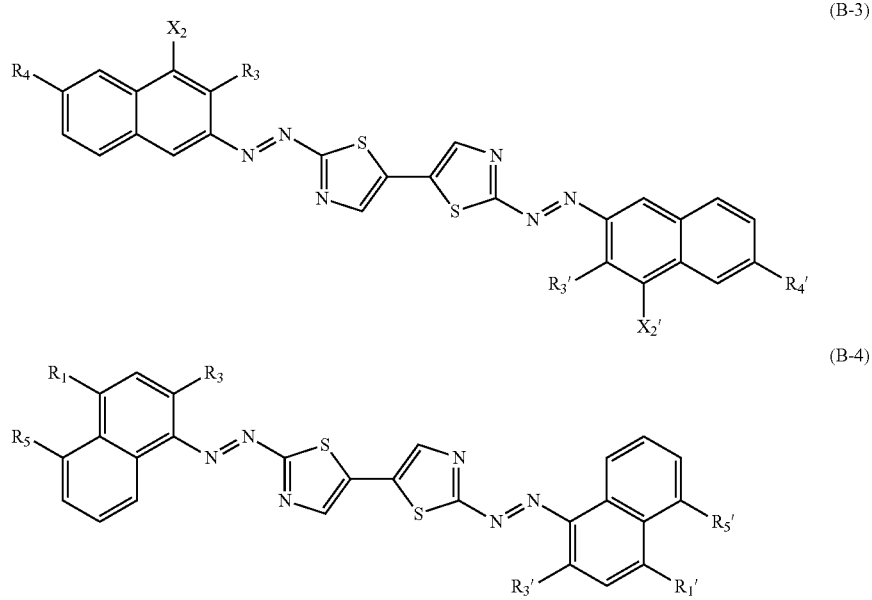

wherein in Formulae B-3 and B-4, $R_1$, $R_3$, $R_1'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

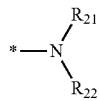

(wherein $R_{21}$ and $R_{22}$ are each independently a hydrogen atom, an alkyl group of $C_{1-5}$, an alkoxy group of $C_{1-5}$, an alkylalcohol group of $C_{1-5}$, or alkylamino group of $C_{1-5}$), *—$(CH_2)_n$—$R_{23}$ (wherein n is an integer of 1 to 5, and $R_{23}$ is a halogen atom, a hydroxyl group, an amine group, an acryloyl group, an acrylate group, a methacryloyl group, or a methacrylate group), or *—$(CH_2)_n$—$R_{24}$ (wherein n is an integer of 1 to 5, and $R_{24}$ is a halogen atom, a hydroxyl group, an amine group, an acryloyl group, an acrylate group, a methacryloyl group, or a methacrylate group); $X_2$ and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$; $R_4$ and $R_4'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

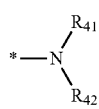

(wherein $R_{41}$ and $R_{42}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{43}$ (wherein n is an integer of 1 to 20, and $R_{43}$ is a halogen atom, a hydroxyl group, an amine group, an acryloyl group, an acrylate group, a methacryloyl group, or a methacrylate group), or *—$(CH_2)_n$—$R_{44}$ (wherein n is an integer of 1 to 20, and $R_{44}$ is a halogen atom, a hydroxyl group, an amine group, an acryloyl group, an acrylate group, a methacryloyl group, or a methacrylate group); and $R_5$ and $R_5'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

(wherein $R_{51}$ and $R_{52}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{53}$ (wherein n is an integer of 1 to 20, and $R_{53}$ is a halogen atom, a hydroxyl group, an amine group, an acryloyl group, an acrylate group, a methacryloyl group, or a methacrylate group), or *—$(CH_2)_n$—$R_{54}$ (wherein n is an integer of 1 to 20, and $R_{54}$ is a halogen atom, a hydroxyl group, an amine group, an acryloyl group, an acrylate group, a methacryloyl group, or a methacrylate group).

In an exemplary embodiment, the liquid crystalline compound may have a smectic phase, and the liquid crystalline compound includes a compound represented by Formula F-1:

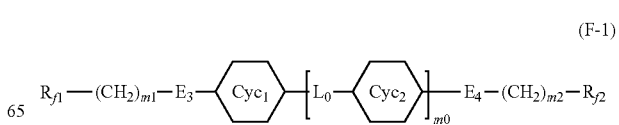

in Formula F-1, $Cyc_1$ and $Cyc_2$ are each independently 1,4-phenylene, 1,4-cyclohexylene,

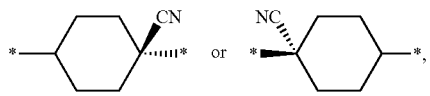

m0 is an integer of 1 to 3, $L_0$ is a single bond, *—(C=O)O—*, *—O(C=O)—*, an alkylene group of $C_{1-4}$ (*—$(CH_2)_k$—* wherein k is a natural number), *—CH=CH—*, or *—C≡C—*, $L_0$ and $Cyc_2$ in a repetition unit defined by m0 are the same as or different from each other, $E_3$ and $E_4$ are each independently a single bond, *—O—*, *—(C=O)O—*, or *—O(C=O)—*, m1 and m2 are independently an integer of 0 to 12, and $R_{f1}$ and $R_{f2}$ are each independently a hydrogen atom, an acryloyl group, an acrylate group, a methacryloyl group, or a methacrylate group, and at least one of $R_{f1}$ and $R_{f2}$ is an acryloyl group, an acrylate group, a methacryloyl group, or a methacrylate group.

In an exemplary embodiment, the dye compound may further include a compound represented by Formula E-1:

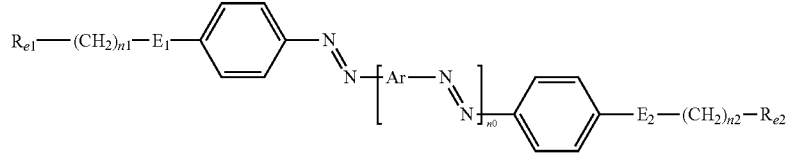

(E-1)

wherein in Formula E-1, Ar is 1,4-phenylene, 4,4'-biphenylene, 1,4-naphthalene, 2,6-naphthalene,

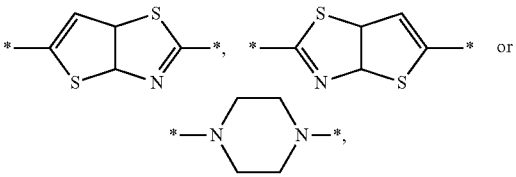

n0 is an integer of 1 to 3, each Ar in a repeat unit defined by n0 are the same as or different from each other, $E_1$ and $E_2$ are each independently a single bond, *—O—*, *—(C=O)O—*, or *—O(C=O)—*, n1 and n2 are independently an integer of 1 to 12, and $R_{e1}$ and $R_{e2}$ are each independently an acryloyl group, an acrylate group, a methacryloyl group, or a methacrylate group.

In an exemplary embodiment, the composition may further comprise: a crosslinking agent; and an initiator, wherein the composition includes 250 to 1500 parts by weight of the liquid crystalline compound, 50 to 500 parts by weight of the crosslinking agent, and 10 to 150 parts by weight of the initiator, with respect to 100 parts by weight of the dye compound.

In an exemplary embodiment, the composition may have a smectic phase at a certain temperature range of 0° C. to 100° C.

In an exemplary embodiment, the compound represented by Formula 1 may be represented by Formula B-1, and the dye compound may further include a compound represented by Formula C-3 or a compound represented by Formula D-3:

(B-1)

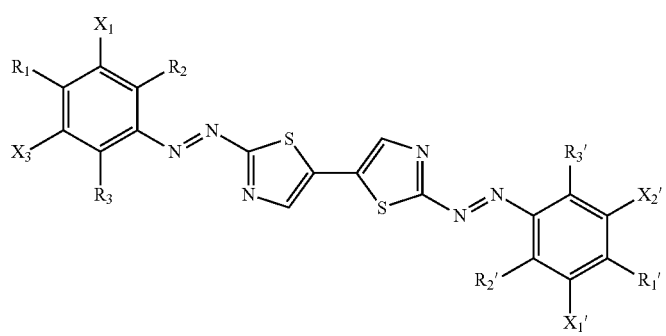

-continued

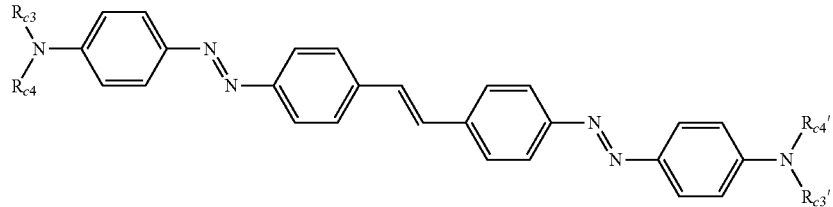
(C-3)

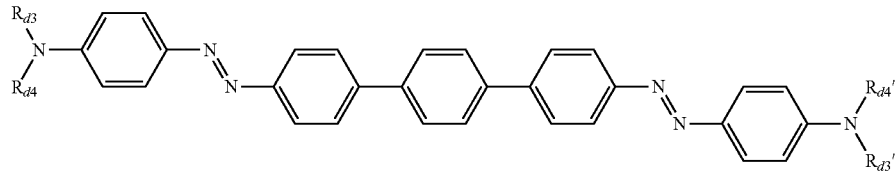
(D-3)

wherein in Formula B-1, $R_1$, $R_2$, $R_3$, $R_1'$, $R_2'$, $R_3'$, $X_1$, $X_2$, $X_1'$, and $X_2'$ have been defined in Formula 1, in Formula C-3, $R_{c3}$, $R_{c4}$, $R_{c3}'$, and $R_{c4}'$ each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group, and in Formula D-3, $R_{d3}$, $R_{d4}$, $R_{d3}'$ and $R_{d4}'$ each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

In an exemplary embodiment, the dye compound may further include a compound represented by Formula C-2 or a compound represented by Formula D-2:

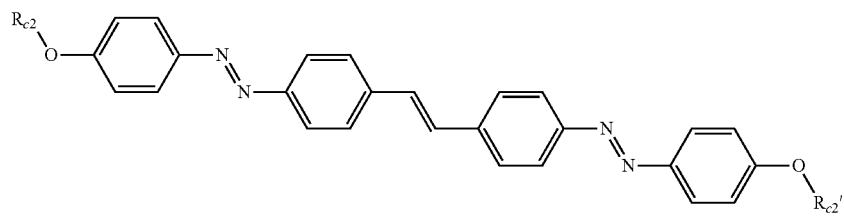
(C-2)

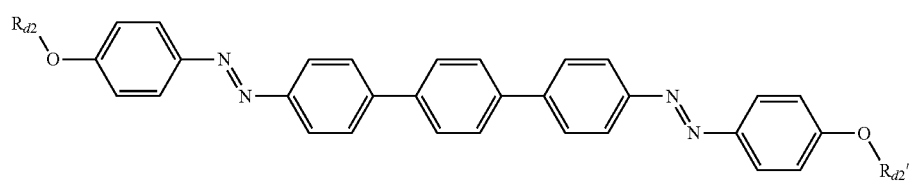
(D-2)

in Formula C-2, $R_{c2}$ and $R_{c2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group, and in Formula D-3, $R_{d2}$ and $R_{d2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

According to an exemplary embodiment of the invention, there is provided a display device. The display device comprises: a polarizing layer containing a dye compound represented by Formula 1:

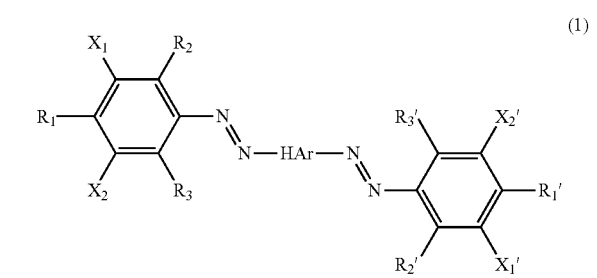
(1)

wherein in Formula (1), HAr is

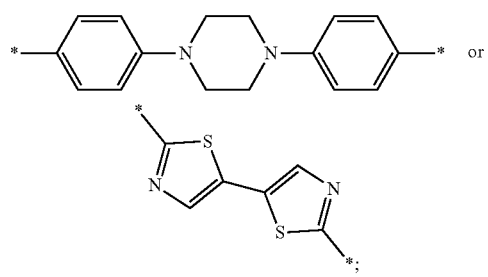

$R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

(wherein $R_{11}$ and $R_{12}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{13}$ (wherein n is an integer of 1 to 20, and $R_{13}$ is a halogen atom, a hydroxyl group, an amine group, an acryloyl group, an acrylate group, a methacryloyl group, or a methacrylate group), or *—$(CH_2)_n$—$R_{14}$ (wherein n is an integer of 1 to 20, and $R_{14}$ is a halogen atom, a hydroxyl group, an amine group, an acryloyl group, an acrylate group, a methacryloyl group, or a methacrylate group), or each of $R_1$ and $R_1'$ forms an aromatic ring together with any one of adjacent $X_1$, $X_2$, $X_1'$, and $X_2'$; $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

(wherein $R_{21}$ and $R_{22}$ are each independently a hydrogen atom, an alkyl group of $C_{1-5}$, an alkoxy group of $C_{1-5}$, an alkylalcohol group of $C_{1-5}$, or alkylamino group of $C_{1-5}$), *—$(CH_2)_n$—$R_{23}$ (wherein n is an integer of 1 to 5, and $R_{23}$ is a halogen atom, a hydroxyl group, an amine group, an acryloyl group, an acrylate group, a methacryloyl group, or a methacrylate group), or *—$(CH_2)_n$—$R_{24}$ (wherein n is an integer of 1 to 5, and $R_{24}$ is a halogen atom, a hydroxyl group, an amine group, an acryloyl group, an acrylate group, a methacryloyl group, or a methacrylate group), or each of $R_2$, $R_3$, $R_2'$ and $R_3'$ forms an aromatic ring together with any one of adjacent $X_1$, $X_2$, $X_1'$, and $X_2'$; and $X_1$, $X_2$, $X_1'$, and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$, or each of $X_1$, $X_2$, $X_1'$, and $X_2'$ forms an aromatic ring together with any one of adjacent $R_1$, $R_2$, $R_3$, $R_1'$, $R_2'$, and $R_3'$.

In an exemplary embodiment, the display device may further comprise: a first display substrate including a first base substrate and a switching element disposed on the first base substrate; a second display substrate facing the first display substrate and including a second base substrate and the polarizing layer disposed on one side of the second base substrate, facing the first display substrate; a liquid crystal layer interposed between the first display substrate and the second display substrate; and a sealing member attaching the first display substrate and the second display substrate to seal the liquid crystal layer.

In an exemplary embodiment, the second display substrate may include: a color control pattern layer disposed on one side of the second base substrate; an overcoating layer disposed on the color control pattern layer; and a dye alignment layer disposed on the overcoating layer, wherein the polarizing layer may be directly disposed on the dye alignment layer.

In an exemplary embodiment, the display device may further comprise: a first display substrate; a second display substrate facing the first display substrate and including a base substrate having one side facing the first display substrate and the other side; a liquid crystal layer between the first display substrate and the second display substrate; a sealing member attaching the first display substrate and the second display substrate to seal the liquid crystal layer; and a dye alignment layer directly disposed on the other side of the base substrate, wherein the polarizing layer may be directly disposed on the dye alignment layer.

In an exemplary embodiment, the display device may further comprise: a base substrate; an organic light-emitting element disposed between the base substrate and the polarizing layer; and an encapsulation member disposed between the organic light-emitting element and the polarizing layer to seal the organic light-emitting element.

In an exemplary embodiment, the encapsulation member may include at least one inorganic layer and at least one organic layer which are alternately laminated, and wherein the display device may further include: a first touch electrode disposed on the encapsulation member; a second touch electrode disposed on the first touch electrode to be insulated from the first touch electrode; an insulating layer disposed on the second touch electrode; a phase retardation layer disposed on the insulating layer; and a dye alignment layer directly disposed on the phase retardation layer, wherein the polarizing layer may be directly disposed on the dye alignment layer.

As described above, since the dye compound according to an embodiment of the present invention has excellent physical/chemical stability and a high dichroic ratio, this dye compound can be used as a dichroic compound.

Further, when the composition according to an embodiment of the present invention is used, a polarizing layer having excellent polarization degree and durability can be formed by a comparatively simple process.

Moreover, since the display device according to an embodiment of the present invention includes the polarizing layer having excellent polarization degree and durability, the reliability and display quality of the display device can be improved.

The effects of the present invention are not limited by the foregoing, and other various effects are anticipated herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
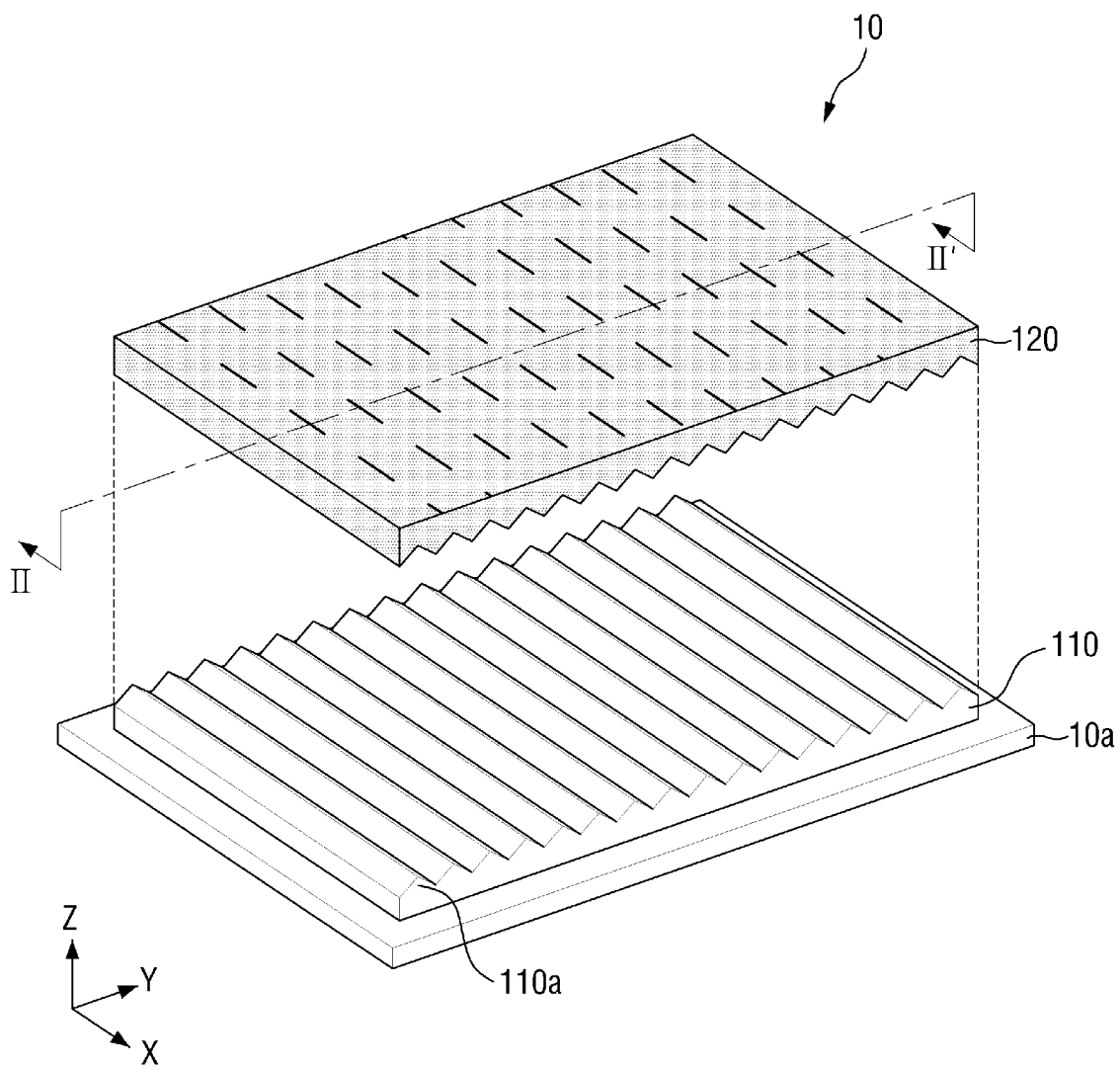
FIG. 1 is an exploded perspective view of a polarizing element according to an embodiment.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a numerical range indicated by using "to" or "through" denotes a numerical range including first and last values as a lower limit and an upper limit, respectively. As used herein, "*" denotes a binding site at which adjacent atoms are covalently bonded. As used herein, "$C_{A-B}$" denotes having A to B carbon atoms. For example, a $C_{1-5}$ alkyl group is an alkyl group having 1 to 5 carbon atoms.

As used herein, the term "alkyl group" means a monovalent atomic group excluding one hydrogen atom in a linear or branched aliphatic saturated hydrocarbon, and is represented by "*—$C_nH_{2n+1}$ (wherein n is a natural number)".

As used herein, the term "alkoxy group" means a monovalent atomic group where one alkyl group is bonded with one oxygen atom, and is represented by "*—O—$C_nH_{2n+1}$ (wherein n is a natural number)".

Unless otherwise defined, the term "alkylene group", as used herein, means a divalent atomic group excluding two hydrogen atoms in a linear or branched aliphatic saturated hydrocarbon, and is represented by "*—$C_nH_{2n}$ (wherein n is a natural number)".

Unless otherwise defined, the term "alkylamino group", as used herein, means a monovalent atomic group where an alkylene group is bonded with one amino group (—$NH_2$), and is represented by "*—$C_nH_{2n}$—$NH_2$ (wherein n is a natural number)".

Unless otherwise defined, the term "alkylalcohol group", as used herein, means a monovalent atomic group where an alkylene group is bonded with one hydroxyl group (—OH), and is represented by "*—$C_nH_{2n}$—OH (wherein n is a natural number)".

Unless otherwise defined, the term "alkylcarbonyl group", as used herein, means a monovalent atomic group where an alkyl group is bonded with one carbonyl group (—C(=O)—), and is represented by "*—C(=O)—$C_nH_{2n+1}$ (wherein n is a natural number)".

Unless otherwise defined, the term "allyl group", as used herein, means a monovalent atomic group including an unsaturated hydrocarbon, and is represented by "*—$C_nH_{2n}$—CH=$CH_2$ (wherein n is a natural number)".

As used herein, the term "dichroic" means that the absorbance in one axial direction is different from the absorbance in the other axial direction.

An example of a polarizing element that may be used in a display device may be a polarizing plate using an iodine-polyvinyl alcohol film obtained by stretching iodine-adsorbed polyvinyl alcohol. However, polyvinyl alcohol, which is a water-soluble polymer, has poor water resistance and heat resistance, and iodine is also vulnerable to heat. Therefore, when iodine is exposed to strong light or is heated, iodine is sublimed, thereby deteriorating the polarization characteristics of a polarizing element. In addition, a manufacturing process under a stretching/pressurizing process is complicated, and an iodine-polyvinyl alcohol polarizing plate has poor mechanical strength. Therefore, when the iodine-polyvinyl alcohol polarizing plate contracts due to heat or moisture, the iodine-polyvinyl alcohol polarizing plate has poor durability due to the occurrence of defective deflection or cracks, thereby resulting in a continuous deterioration in the polarization characteristics thereof. Therefore, it is desirable to develop a polarizing element capable of replacing a polarizing plate using an iodine-polyvinyl alcohol film.

Hereinafter, a dye compound according to an embodiment and a composition including the dye compound will be described.

The composition according to an embodiment may include at least one dye compound and a liquid crystalline compound.

The at least one dye compound includes a dye compound represented by Formula 1. For example, the at least one dye compound may include a single kind of dye compound represented by Formula 1. In another example, the at least one dye compound may include a plurality of dye compounds different from each other represented by Formula 1.

Formula 1

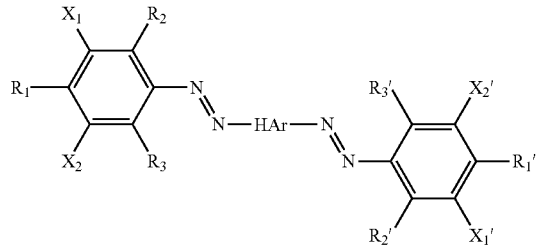

In Formula 1, HAr is a divalent hetero group of 6 to 20 carbon atoms containing two or more nitrogen atoms as hetero atoms. For example, HAr may be a divalent hetero group containing two or more nitrogen atoms as hetero atoms, having two or more fused or unfused ring groups, and having 6, 7, 8, 9, 10, 11, 12, 13, 14, 15, 16, 17, 18, 19 or 20 carbon atoms. HAr may be

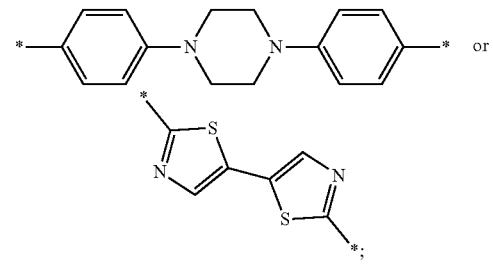

In an exemplary embodiment, $R_1$ and $R_1'$ may be each independently a hydrogen atom, a halogen atom, a carboxyl group (—COOH), an aldehyde group (—CHO), a hydroxyl group (—OH), a cyano group (—C≡N), a nitro group (—$NO_2$), an alkyl group of $C_{1-20}$, an alkoxy group of $C_{1-20}$,

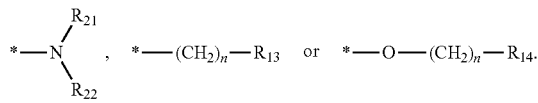

In

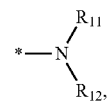

$R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group

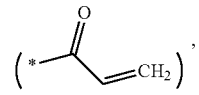

an acrylate group

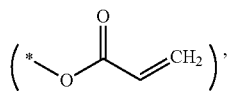

a methacryloyl group

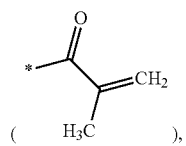

or a methacrylate group

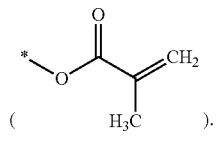

In *—$(CH_2)_n$—$R_{13}$, n is an integer of 1 to 20, and $R_{13}$ is a halogen atom, a hydroxyl group, an amine group, an acryloyl group, an acrylate group, a methacryloyl group, or a methacrylate group. In *—O—$(CH_2)$—$R_{14}$, n is an integer of 1 to 20, and $R_{14}$ is a halogen atom, a hydroxyl group, amine group, an acryloyl group, an acrylate group, a methacryloyl group, or a methacrylate group.

In another embodiment, each of $R_1$ and $R_1'$ may form an aromatic ring together with any one of adjacent $X_1$, $X_2$, $X_1'$, and $X_2'$. For example, $R_1$ may form an aromatic ring of 6 carbon atoms together with $X_1$, and $R_1'$ may form an aromatic ring of 6 carbon atoms together with $X_1'$. An aromatic ring formed by $R_1$ and $X_1$ and an aromatic ring formed by $R_1'$ and $X_1'$ may be substituted or unsubstituted.

Further, $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

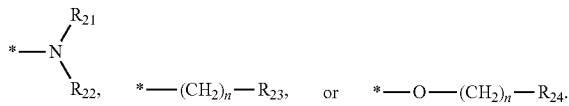

In

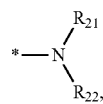

$R_{21}$ and $R_{22}$ are each independently a hydrogen atom, an alkyl group of $C_{1-5}$, an alkoxy group of $C_{1-5}$, an alkylalcohol group of $C_{1-5}$, or alkylamino group of $C_{1-5}$. In *—$(CH_2)_n$—$R_{23}$, n is an integer of 1 to 5, and $R_{23}$ is a halogen atom, a hydroxyl group, an amine group, an acryloyl group, an acrylate group, a methacryloyl group, or a methacrylate group. In *—$(CH_2)_n$—$R_{24}$, n is an integer of 1 to 5, and $R_{24}$ is a halogen atom, a hydroxyl group, amine group, an acryloyl group, an acrylate group, a methacryloyl group, or a methacrylate group.

In another embodiment, each of $R_2$, $R_3$, $R_2'$ and $R_3'$ may form an aromatic ring together with any one of adjacent $X_1$, $X_2$, $X_1'$, and $X_2'$. For example, $R_2$ may form an aromatic ring of 6 carbon atoms together with $X_1$, and $R_2'$ may form an aromatic ring of 6 carbon atoms together with $X_1'$. $R_3$ may form an aromatic ring of 6 carbon atoms together with $X_2$, and $R_3'$ may form an aromatic ring of 6 carbon atoms together with $X_2'$. An aromatic ring formed by $R_3$ and $X_2$ and an aromatic ring formed by $R_3'$ and $X_2'$ may be substituted or unsubstituted.

$X_1$, $X_2$, $X_1'$, and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$, and may form an aromatic ring together with any one of adjacent $R_1$, $R_2$, $R_3$, $R_1'$, $R_2'$, and $R_3'$.

The azo group (—N═N—) located in the mother basic skeleton of the dye compound according to this embodiment may be in a trans isomer state in which one end and the other end are located in different directions with respect to the double bond. The azo group can impart color developing properties to the compound.

Substituents $R_1$ and $R_1'$ may be introduced at the para position of a benzene ring. The substituents $R_1$ and $R_1'$ bonded to the para position exerts an induced effect by an electron donating group or an electron withdrawing group without deteriorating the linearity of the dye compound, so as to impart absorption capacity for light of a specific wavelength band and transition dipole moment to the dye compound. In Formula 1, $R_1$ and $R_1'$ may be the same as or different from each other.

Substituents $R_2$, $R_3$, $R_2'$, and $R_3'$ may be introduced at the ortho position of a benzene ring. The substituents $R_2$, $R_3$, $R_2'$, and $R_3'$ bonded to the ortho position can improve the physical/chemical stability and durability of the dye compound while minimizing the deterioration of linearity of the dye compound. Further, the substituents $R_2$, $R_3$, $R_2'$, and $R_3'$ can shift the absorption wavelength band of the dye compound toward a short wavelength or a long wavelength by an induced effect.

In terms of securing the linearity of the dye compound, the number of carbon atoms of the $R_1$ and $R_1'$ bonded to the para position may be more than the number of carbon atoms of the substituents $R_2$, $R_3$, $R_2'$, and $R_3'$ bonded to the ortho position.

For example, $R_2$, $R_3$, $R_2'$, and $R_3'$ may be each independently a hydrogen atom, a halogen atom, a hydroxyl group, a cyano group, or a nitro group. $R_1$ and $R_1'$ are each independently an aldehyde group, an alkyl group of $C_{1-20}$, an alkoxy group of $C_{1-20}$,

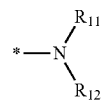

(wherein $R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group, an acrylate group, a methacryloyl group, or a methacrylate group), *—$(CH_2)_n$—$R_{13}$ (wherein n is an integer of 1 to 20, and $R_{13}$ is a halogen atom, a hydroxyl group, an amine group, an acryloyl group, an acrylate group, a methacryloyl group, or a methacrylate group), or *—(CH$_2$)$_n$—R$_{14}$ (wherein n is an integer of 1 to 20, and R$_{14}$ is a halogen atom, a hydroxyl group, amine group, an acryloyl group, an acrylate group, a methacryloyl group, or a methacrylate group).

In another example, R$_2$, R$_3$, R$_2$', and R$_3$' may be each independently an aldehyde group, an alkyl group of C$_{1-5}$, an alkoxy group of C$_{1-5}$,

(wherein R$_{21}$ and R$_{22}$ are each independently a hydrogen atom, an alkyl group of C$_{1-5}$, an alkoxy group of C$_{1-5}$, an alkylalcohol group of C$_{1-5}$, or alkylamino group of C$_{1-5}$), *—(CH$_2$)$_n$—R$_{23}$ (wherein n is an integer of 1 to 5, and R$_{23}$ is a halogen atom, a hydroxyl group, an amine group, an acryloyl group, an acrylate group, a methacryloyl group, or a methacrylate group), or *—(CH$_2$)$_n$—R$_{14}$ (wherein n is an integer of 1 to 5, and R$_{24}$ is a halogen atom, a hydroxyl group, amine group, an acryloyl group, an acrylate group, a methacryloyl group, or a methacrylate group). R$_1$ and R$_1$' may be each independently an alkyl group of C$_{2-20}$, an alkoxy group of C$_{2-20}$,

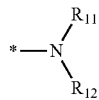

(wherein R$_{11}$ and R$_{12}$ are each independently a hydrogen atom, an alkyl group of C$_{1-10}$, an alkoxy group of C$_{1-10}$, an alkylamino group of C$_{1-10}$, an allyl group of C$_{3-20}$, an acryloyl group, an acrylate group, a methacryloyl group, or a methacrylate group), *—(CH$_2$)$_n$—R$_{13}$ (wherein n is an integer of 1 to 20, and R$_{13}$ is a halogen atom, a hydroxyl group, an amine group, an acryloyl group, an acrylate group, a methacryloyl group, or a methacrylate group), or *—(CH$_2$)$_n$—R$_{14}$ (wherein n is an integer of 1 to 20, and R$_{14}$ is a halogen atom, a hydroxyl group, amine group, an acryloyl group, an acrylate group, a methacryloyl group, or a methacrylate group).

In Formula 1, R$_2$, R$_3$, R$_2$', and R$_3$' may be the same as or different from each other. In a non-limiting example, at least one of R$_2$ and R$_3$ may be a hydrogen atom, and at least one of R$_2$' and R$_3$' may be a hydrogen atom.

Substituents X$_1$, X$_2$, X$_1$', and X$_2$' may be introduced at the meta position of a benzene ring. For example, each of the substituents X$_1$, X$_2$, X$_1$', and X$_2$' bonded to the meta position may be a halogen atom, an aldehyde group, a hydroxy group, a cyano group, a nitro group, a alkyl group of C$_{1-5}$, or a alkoxy group of C$_{1-5}$. In terms of linearity and electro density of the dye compound, at least one of X$_1$ and X$_2$ may be a hydrogen atom, and at least one of X$_1$' and X$_2$' may be a hydrogen atom.

Further, R$_2$, R$_3$, X$_1$, and X$_2$ may represent at least two kinds of substituents. That is, at least one of R$_2$, R$_3$, X$_1$, and X$_2$ may be a substituent different from the other substituents. For example, R$_3$, X$_1$, and X$_2$ may be hydrogen atoms, and R$_2$ may be a substituent other than a hydrogen atom, but the present invention is not limited thereto.

The hetero group (*—HAr—*) of the mother basic skeleton of the dye compound according to this embodiment may be an unsubstituted state. In an exemplary embodiment, the the compound represented by Formula 1 may be represented by Formula A-1 or Formula B-1.

Formula A-1

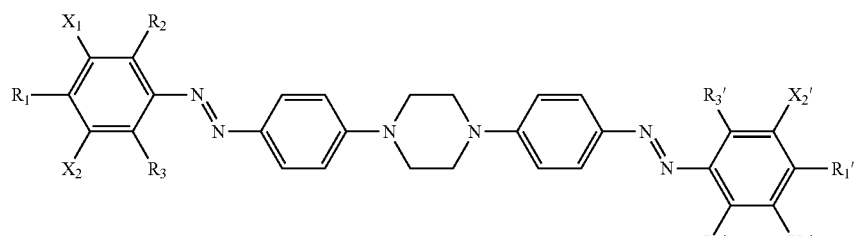

Formula B-1

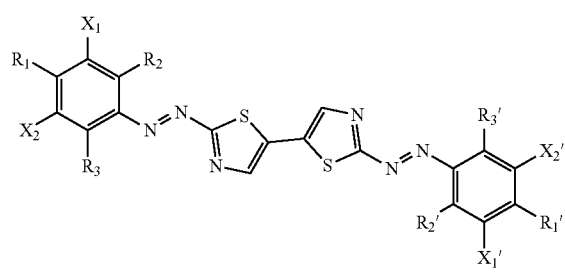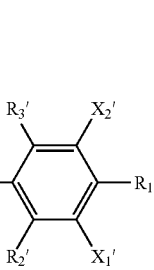

In Formulae A-1 and B-1, R$_1$, R$_2$, R$_3$, R$_1$', R$_2$', R$_3$', X$_1$, X$_2$, X$_1$' and X$_2$' have been defined in Formula 1.

When the mother basic skeleton of the dye compound is maintained in an unsubstituted state, for example, when a carboxyl group (—COOH) and/or a sulfo group (—SO$_3$H), which is introduced into the above-mentioned hetero group and can be oriented in the minor axis direction of the dye compound, is excluded, it is possible to secure the linearity of the dye compound and to impart lipid solubility to the dye compound, thereby improving the affinity to a liquid crystalline compound to be described later.

The hetero group of the mother basic skeleton of each of the dye compounds represented by Formulae A-1 and B-1 may affect the wavelength band absorbed by each of the dye compounds. For example, the dye compound represented by Formula A-1 may absorb light of a wavelength band of about 500 nm to 600 nm. Further, the dye compound represented by Formula B-1 may absorb light of a wavelength band of about 600 nm to 700 nm.

The dye compound having the structure represented by Formula A-1 or B-1 may be a positive dichroic dye that absorbs polarized light in the major axis direction of a molecule. For example, the absorbance of the dye compound represented by Formula A-1 in the maximum absorption wavelength band in the major axis direction may be about 30,000 or more, or about 35,000 or more. Further, the absorbance of the dye compound represented by Formula B-1 in the maximum absorption wavelength band in the major axis direction may be about 40,000 or more, or about 45,000 or more. However, the present invention is not limited thereto.

In an exemplary embodiment where HAr is

and $X_1$, $X_2$, $X_1'$ and $X_2'$ are hydrogen atoms, the dye compound represented by Formula 1 may be represented by Formula A-2.

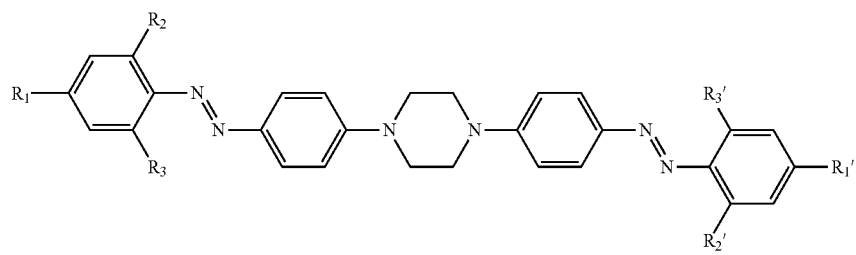

In Formula A-2, $R_1$, $R_2$, $R_3$, $R_1'$, $R_2'$ and $R_3'$ have been described in Formula 1.

In a non-limiting example, in Formula A-2, the number of carbon atoms of each of $R_1$ and $R_1'$ may be more than the number of carbon atoms of each of $R_2$, $R_3$, $R_2'$ and $R_3'$. At least one of $R_2$ and $R_3$ may be a hydrogen atom, and at least one of $R_2'$ and $R_3'$ may be a hydrogen atom.

Since the dye compound represented by Formula A-2 has excellent linearity and high electron density, when it is applied as a polarizing layer, sufficient polarization degree can be secured, and excellent physical/chemical stability can be obtained. For example, the dye compound represented by Formula A-2 can absorb light of a wavelength band of about 500 nm to 570 nm, or about 500 nm to 550 nm.

Meanwhile, in an exemplary embodiment where HAr is

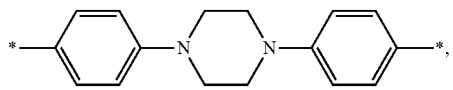

$R_1$ forms an aromatic ring together with adjacent $X_1$, and $R_1'$ forms an aromatic ring together with adjacent $X_1'$, the dye compound represented by Formula 1 may be represented by Formula A-3.

Formula A-3

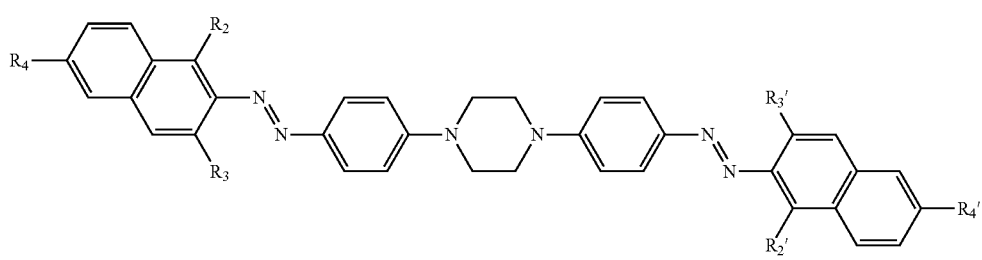

In Formula A-3, $R_4$ and $R_4'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

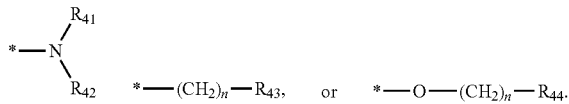

In

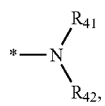

$R_{41}$ and $R_{42}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group. In *—$(CH_2)_n$—$R_{43}$, n is an integer of 1 to 20, and $R_{43}$ is a halogen atom, a hydroxyl group, an amine group, an acryloyl group, an acrylate group, a methacryloyl group, or a methacrylate group. In *—$(CH_2)_n$—$R_{44}$, n is an integer of 1 to 20, and $R_{44}$ is a halogen atom, a hydroxyl group, amine group, an acryloyl group, an acrylate group, a methacryloyl group, or a methacrylate group.

The substituents $R_4$ and $R_4'$ exerts an induced effect by an electron donating group or an electron withdrawing group without deteriorating the linearity of the dye compound, so as to impart absorption capacity for light of a specific wavelength band and transition dipole moment to the dye compound.

$R_2$, $R_3$, $R_2'$ and $R_3'$ have been defined in Formula 1.

As a non-limiting example, in Formula A-3, $R_2$, $R_3$, $R_2'$ and $R_3'$ may be the same as or different from each other. For example, at least one of $R_2$ and $R_3$ may be a hydrogen atom, and at least one of $R_2'$ and $R_3'$ may be a hydrogen atom.

The dye compound represented by Formula A-3 can induce a long wavelength shift in the absorption wavelength band by a naphthalene ring located at the terminal. For example, the dye compound represented by Formula A-3 can absorb light of a wavelength band of about 550 nm to 600 nm, or about 570 nm to 600 nm.

The dye compound represented by Formula A-1 may be exemplified by any one of the following compounds, but the present invention is not limited thereto.

A101

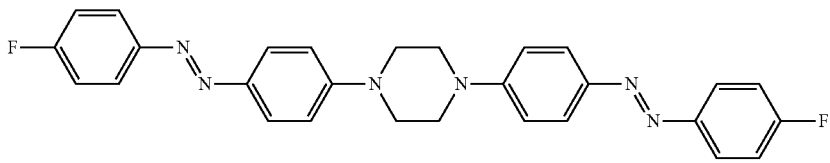

A102

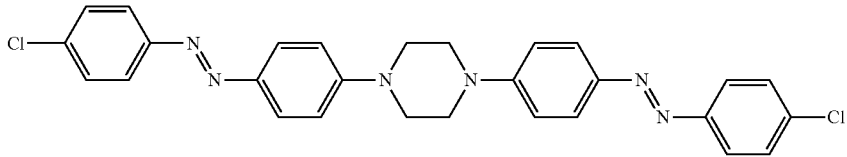

A103

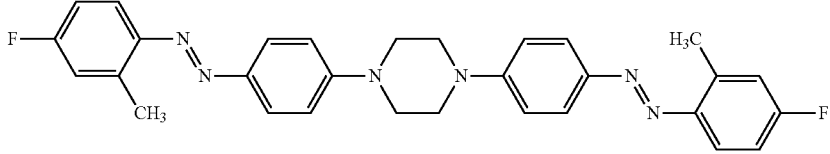

A104

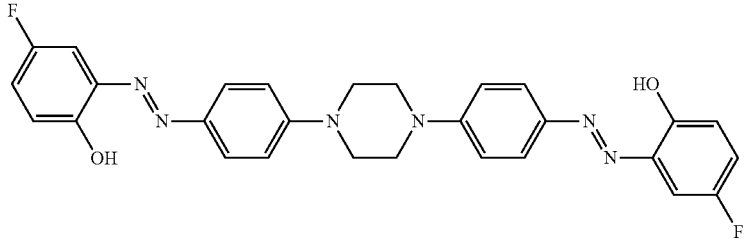

A105

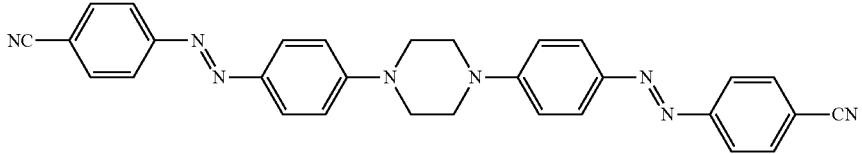

-continued
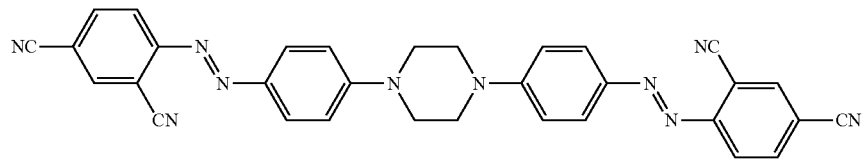
A106
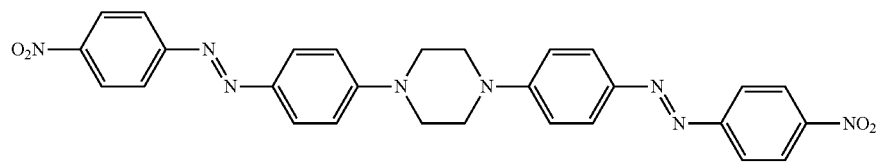
A107
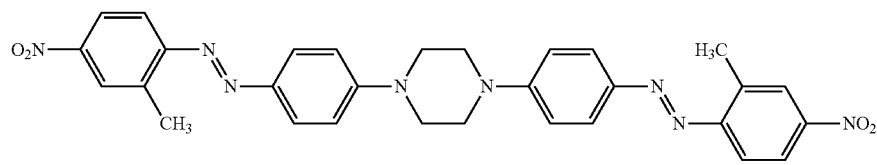
A108
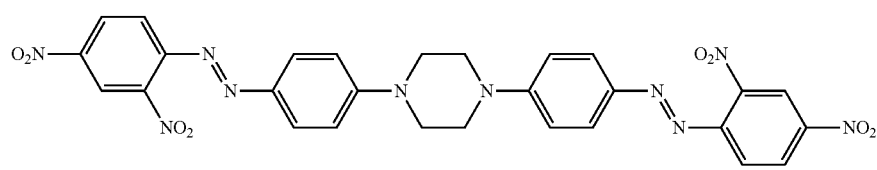
A109
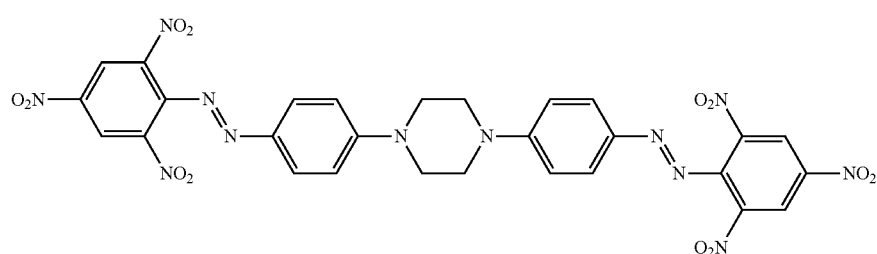
A110
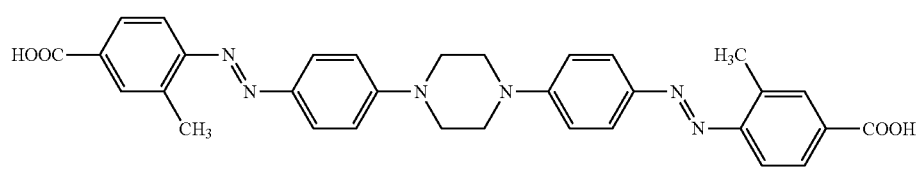
A111
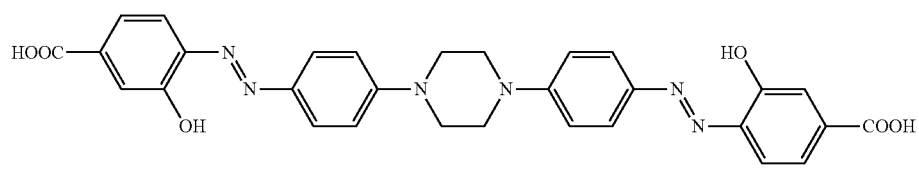
A112
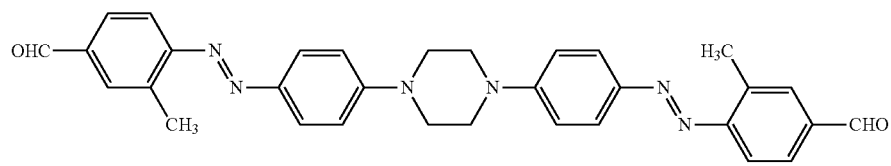
A113
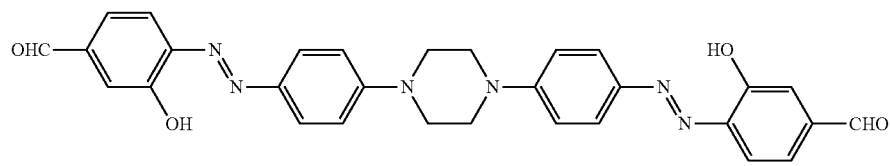
A114

-continued
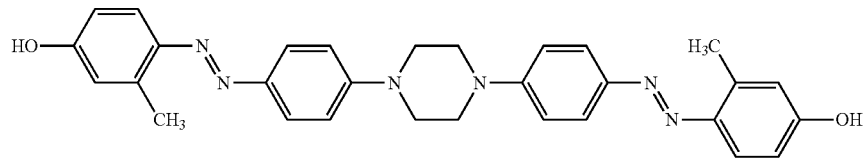
A115
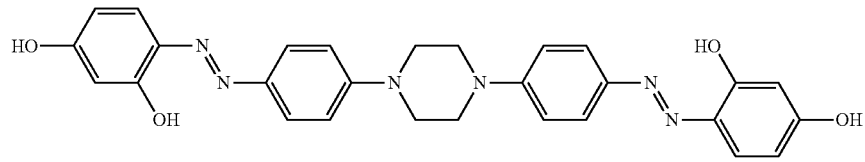
A116
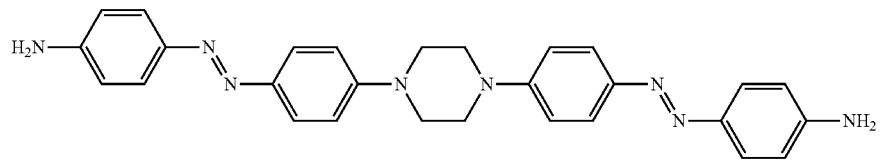
A117
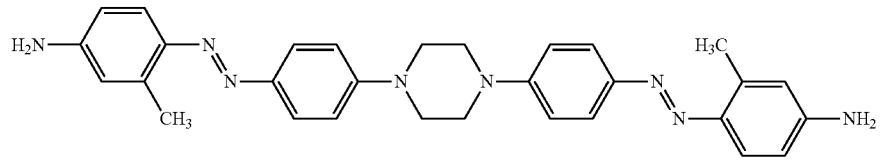
A118
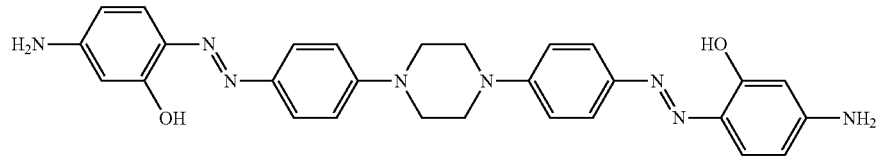
A119
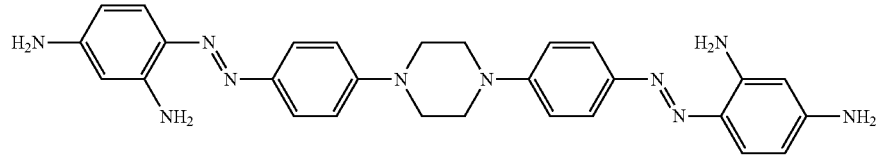
A120
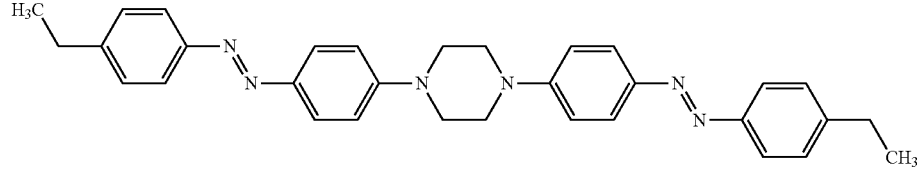
A121
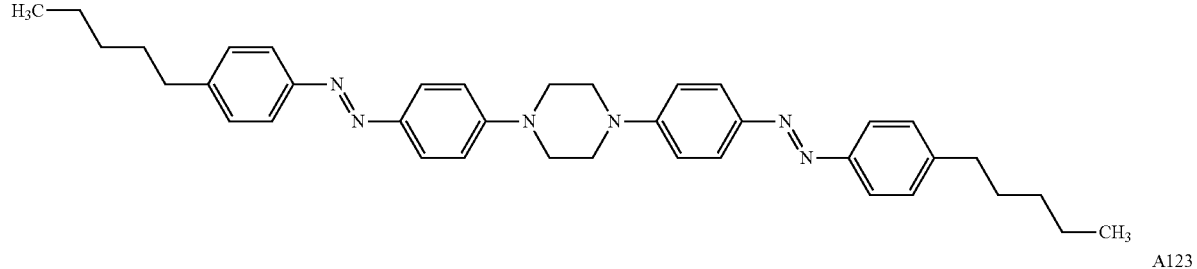
A122
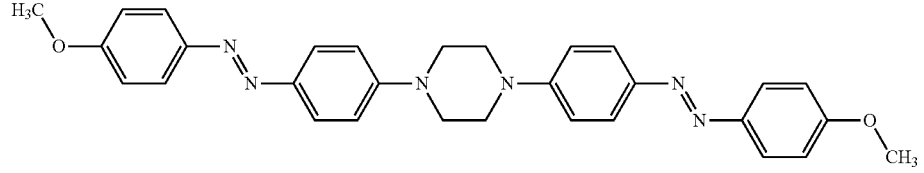
A123

-continued
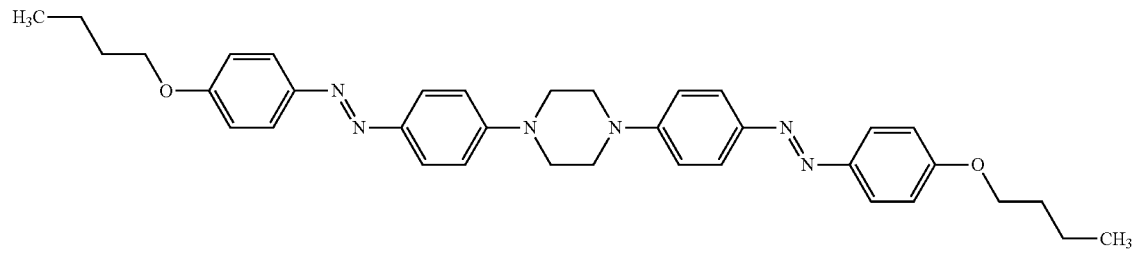
A124
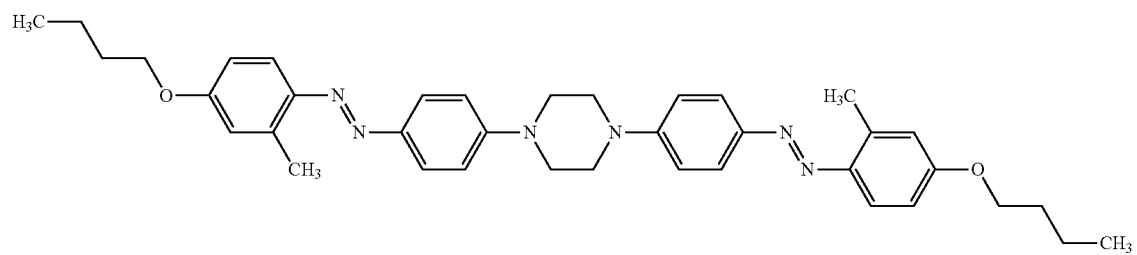
A125
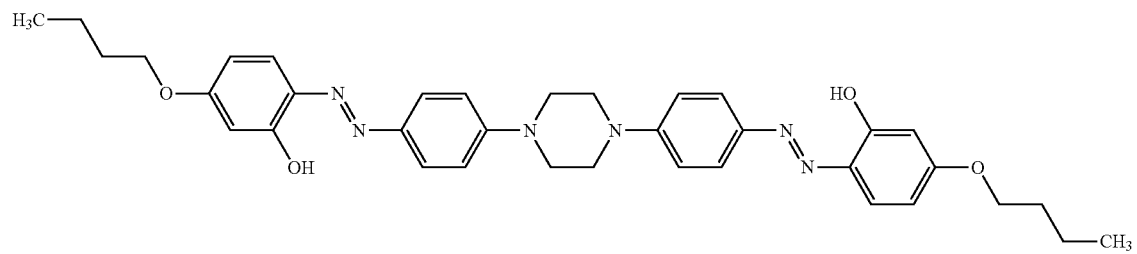
A126
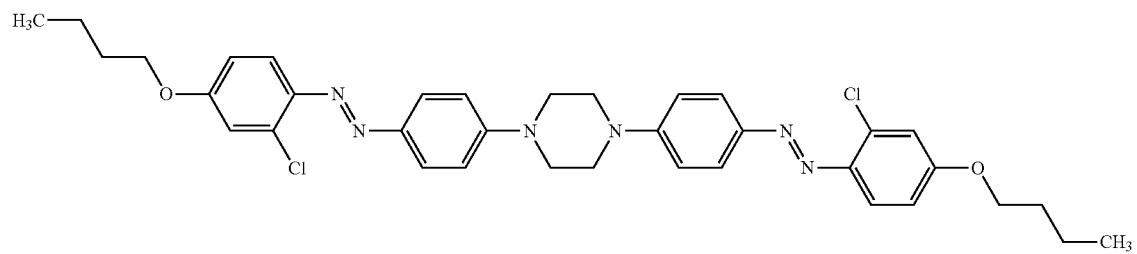
A127
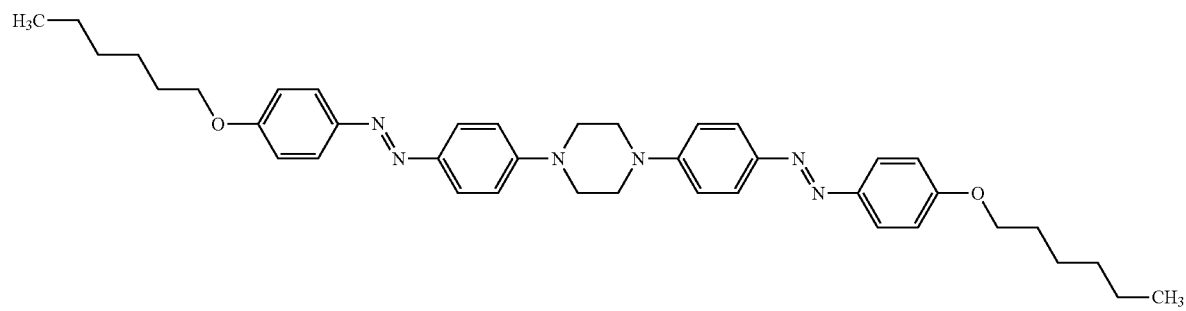
A128

-continued
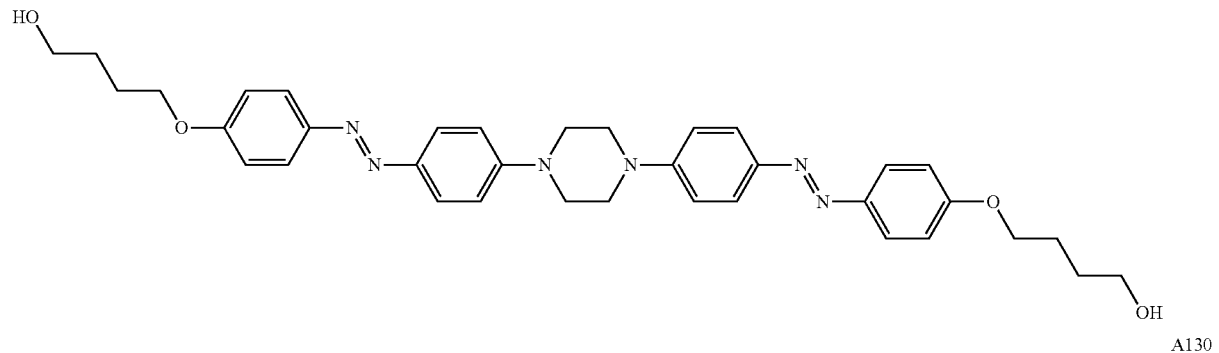
A129
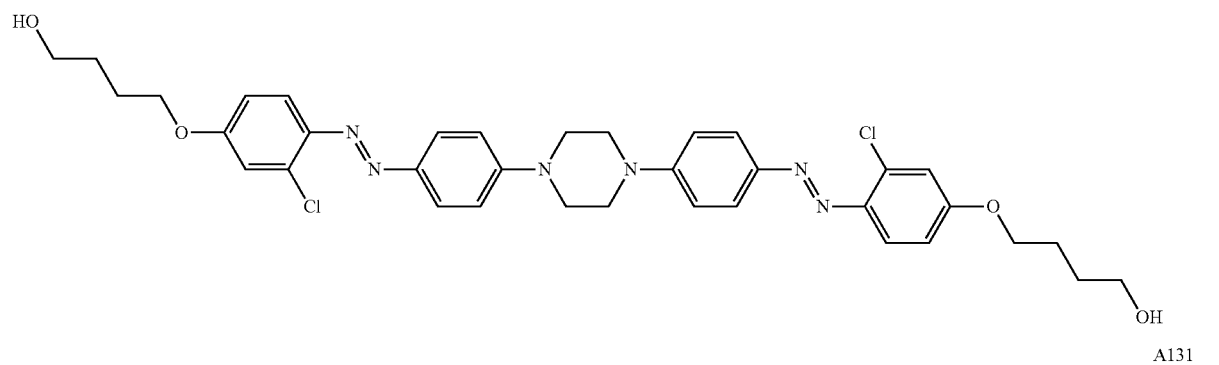
A130
A131
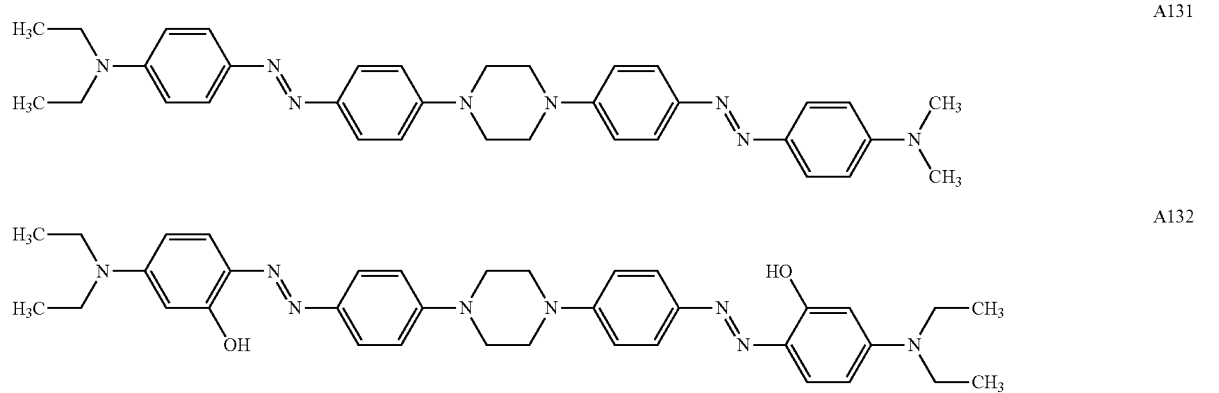
A132
A133
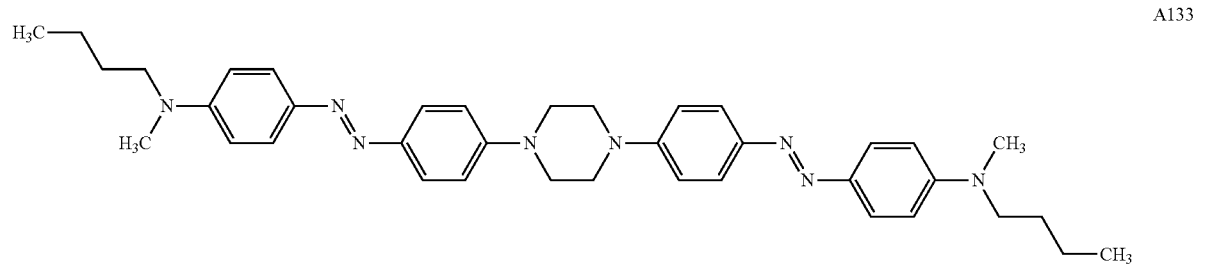
A134
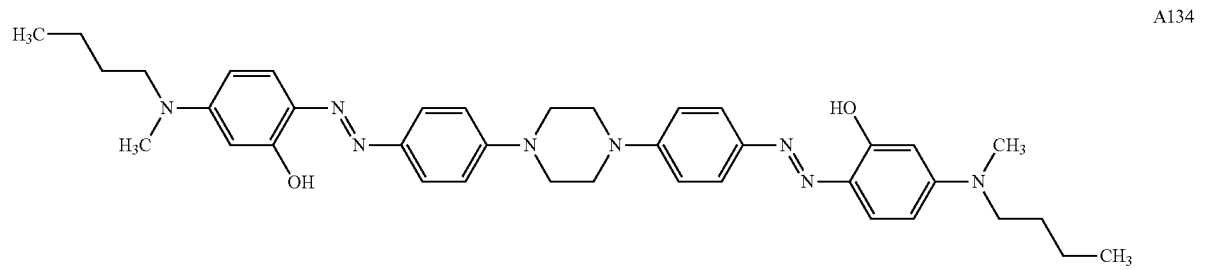

-continued
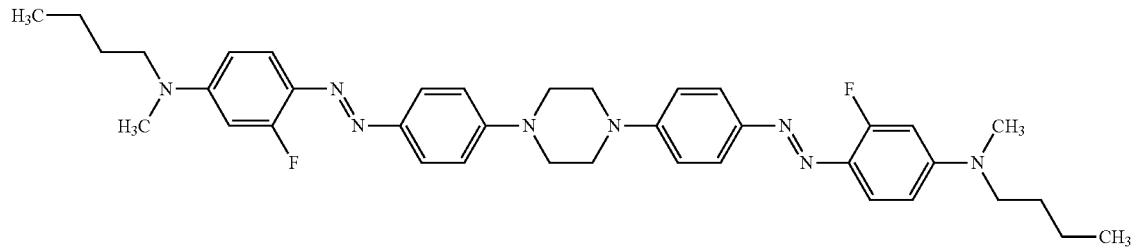
A135
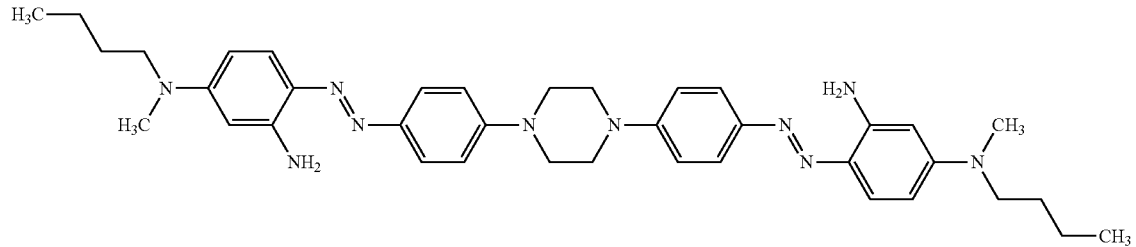
A136
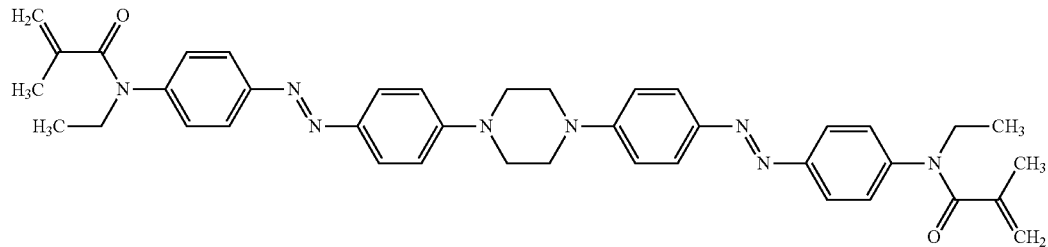
A137
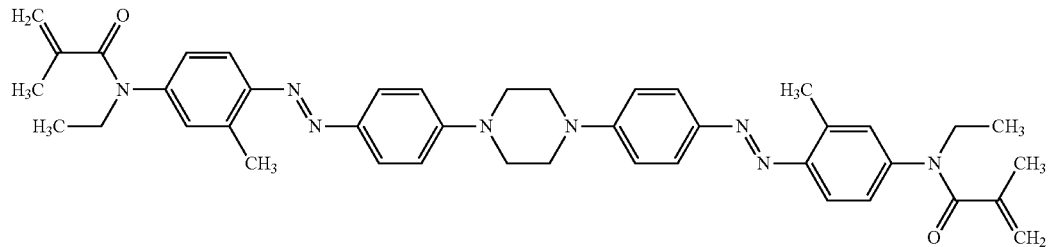
A138
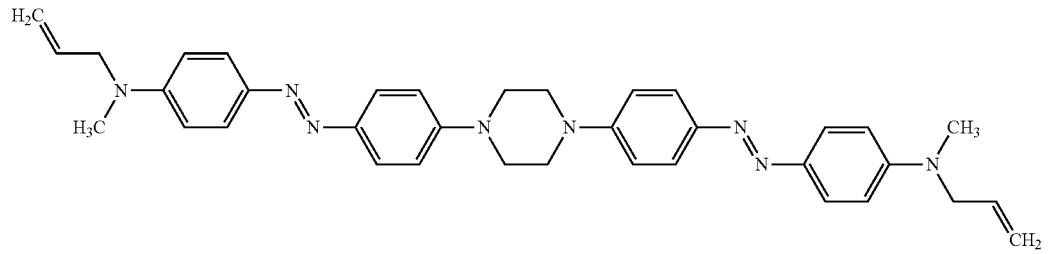
A139
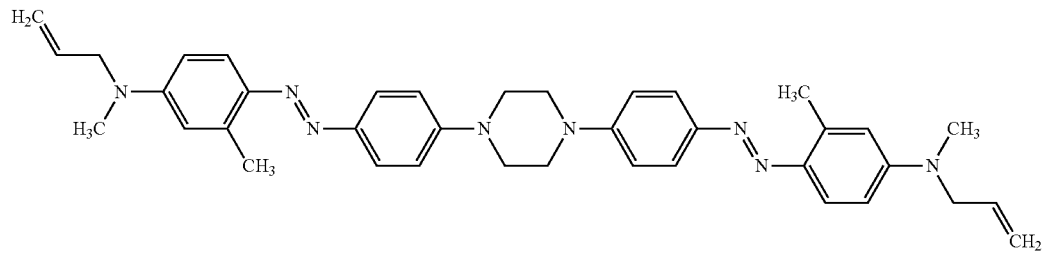
A140

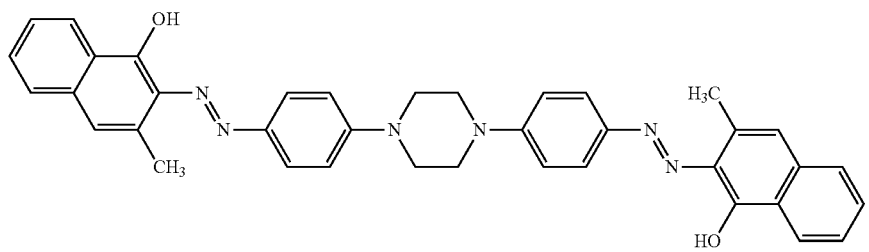

A141

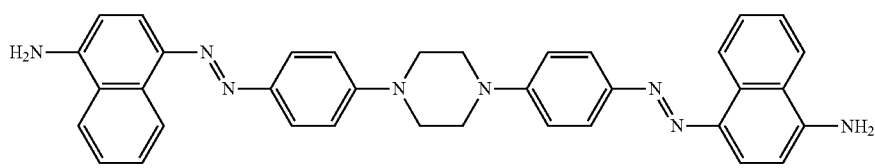

A142

Meanwhile, in an exemplary embodiment where HAr is

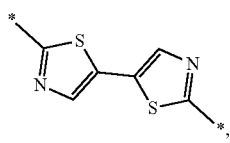

and $X_1$, $X_2$, $X_1'$ and $X_2'$ are hydrogen atoms, the dye compound represented by Formula 1 may be represented by Formula B-2.

Formula B-2

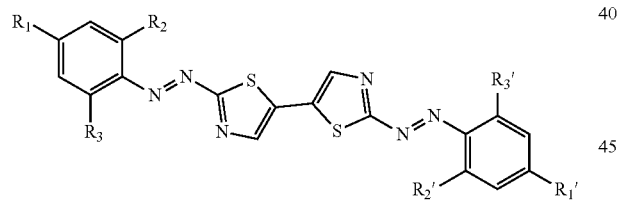

In Formula B-2, $R_1$, $R_2$, $R_3$, $R_1'$, $R_2'$ and $R_3'$ have been described in Formula 1. As a non-limiting example, in Formula B-2, the number of carbon atoms of each of $R_1$ and $R_1'$ may be more than the number of carbon atoms of each of $R_2$, $R_3$, $R_2'$ and $R_3'$. At least one of $R_2$ and $R_3$ may be a hydrogen atom, and at least one of $R_2'$ and $R_3'$ may be a hydrogen atom.

Since the dye compound represented by Formula B-2 has excellent linearity and a structure of facilitating electron donation, when it is applied as a polarizing layer, sufficient polarization degree can be secured, and excellent physical/chemical stability can be obtained. For example, the dye compound represented by Formula B-2 can absorb light of a wavelength band of about 600 nm to 670 nm, or about 600 nm to 650 nm.

Meanwhile, in an exemplary embodiment where HAr is

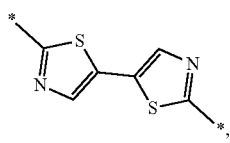

$R_1$ forms an aromatic ring together with adjacent $X_1$, $R_1'$ forms an aromatic ring together with adjacent $X_1'$, and $R_2'$ is a hydrogen atom, the dye compound represented by Formula 1 may be represented by Formula B-3.

Formula B-3

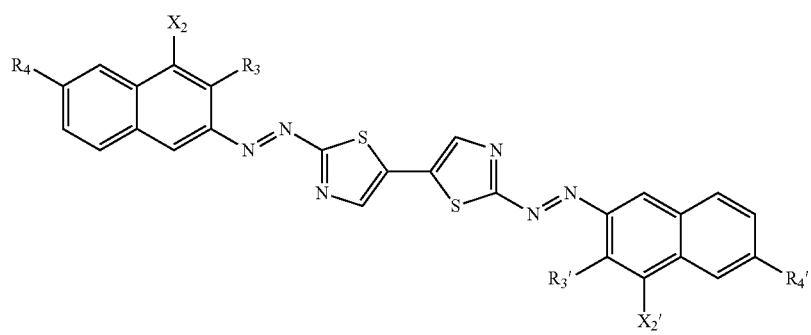

In Formula B-3, $R_4$ and $R_4'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

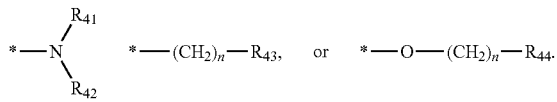

In

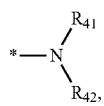

$R_{41}$ and $R_{42}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group. In *—$(CH_2)_n$—$R_{43}$, n is an integer of 1 to 20, and $R_{43}$ is a halogen atom, a hydroxyl group, an amine group, an acryloyl group, an acrylate group, a methacryloyl group, or a methacrylate group. In *—$(CH_2)_n$—$R_{44}$, n is an integer of 1 to 20, and $R_{44}$ is a halogen atom, a hydroxyl group, an amine group, an acryloyl group, an acrylate group, a methacryloyl group, or a methacrylate group.

The substituents $R_4$ and $R_4'$ exerts an induced effect by an electron donating group or an electron withdrawing group without deteriorating the linearity of the dye compound, so as to impart absorption capacity for light of a specific wavelength band and transition dipole moment to the dye compound.

$R_3$, $X_2$, $R_3'$ and $X_2'$ have been defined in Formula 1.

As a non-limiting example, in Formula B-3, $R_3$ and $X_2$ are different from each other, and $R_3'$ and $X_2'$ may be different from each other. For example, at least one of $R_3$ and $X_2$ may be a hydrogen atom, and at least one of $R_3'$ and $X_2'$ may be a hydrogen atom.

The dye compound represented by Formula B-3 can induce a long wavelength shift in the absorption wavelength band by a naphthalene ring located at the terminal. For example, the dye compound represented by Formula B-3 can absorb light of a wavelength band of about 650 nm to 700 nm, or about 670 nm to 700 nm.

Meanwhile, in an exemplary embodiment where HAr is

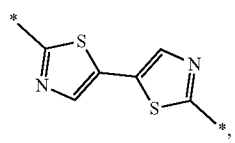

$R_2$ forms an aromatic ring together with adjacent $X_1$, $X_2$ is a hydrogen atom, $R_2'$ forms an aromatic ring together with adjacent $X_1'$, and $X_2'$ is a hydrogen atom, the dye compound represented by Formula 1 may be represented by Formula B-4.

Formula B-4

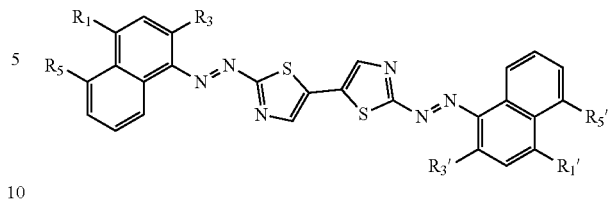

In Formula B-4, $R_5$ and $R_5'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

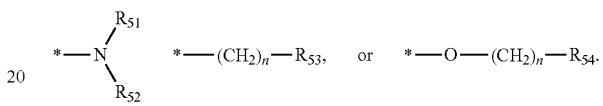

In

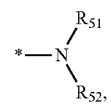

$R_{51}$ and $R_{52}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group. In *—$(CH_2)_n$—$R_{53}$, n is an integer of 1 to 20, and $R_{43}$ is a halogen atom, a hydroxyl group, an amine group, an acryloyl group, an acrylate group, a methacryloyl group, or a methacrylate group. In *—$(CH_2)_n$—$R_{54}$, n is an integer of 1 to 20, and $R_{44}$ is a halogen atom, a hydroxyl group, amine group, an acryloyl group, an acrylate group, a methacryloyl group, or a methacrylate group.

$R_1$, $R_3$, $R_1'$ and $R_3'$ have been defined in Formula 1.

As a non-limiting example, in Formula B-4, the number of carbon atoms of each of $R_1$ and $R_1'$ may be more than the number of carbon atoms of each of $R_3$ and $R_3'$.

The dye compound represented by Formula B-4 can induce a long wavelength shift in the absorption wavelength band by a naphthalene ring located at the terminal. For example, the dye compound represented by Formula B-4 can absorb light of a wavelength band of about 650 nm to 700 nm, or about 670 nm to 700 nm.

The dye compound represented by Formula B-1 may be exemplified by any one of the following compounds, but the present invention is not limited thereto.

B101 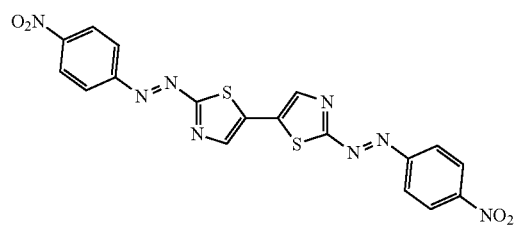
B103 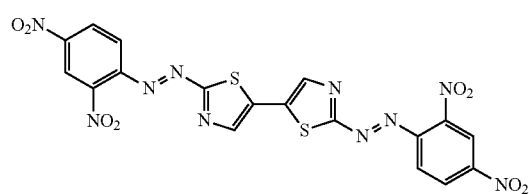
B105 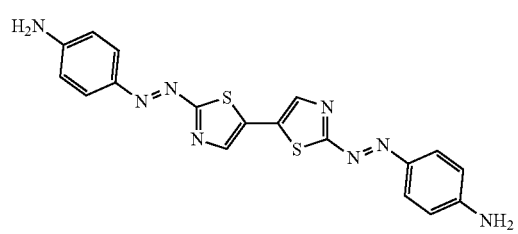
B107 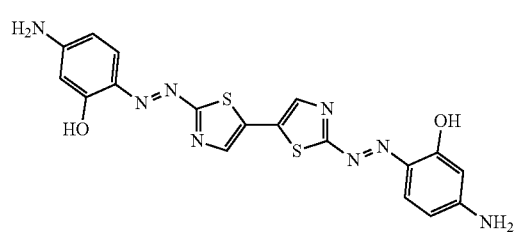
B109 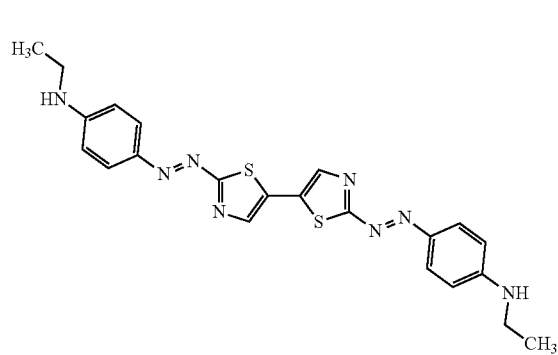
B111 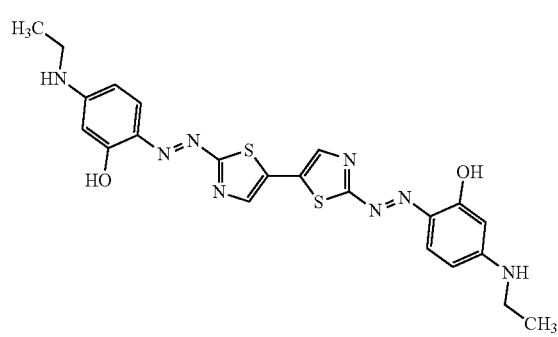
B102 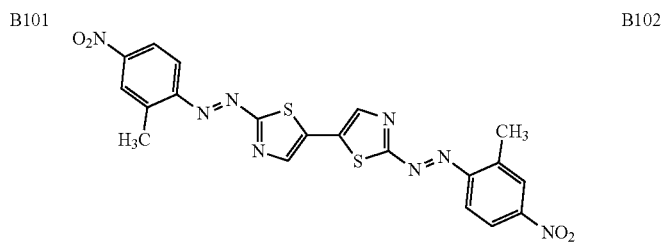
B104 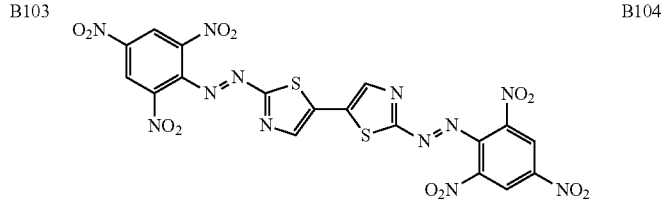
B106 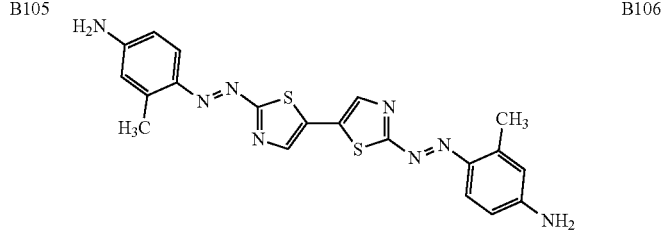
B108 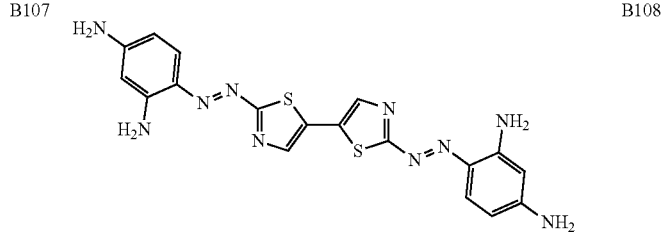
B110 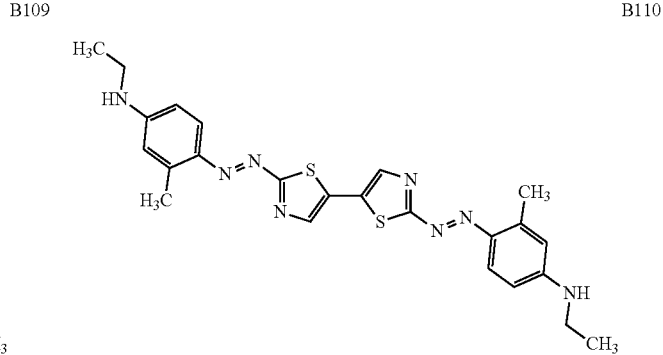
B112 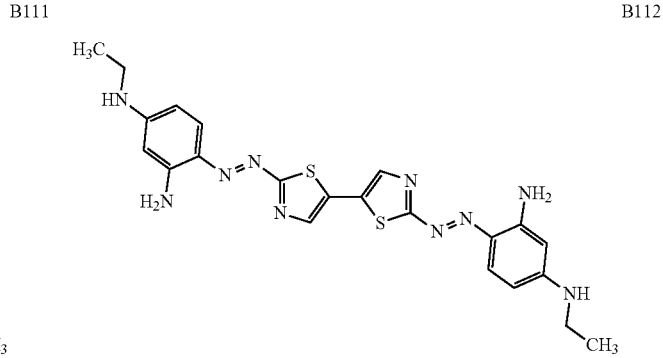

-continued
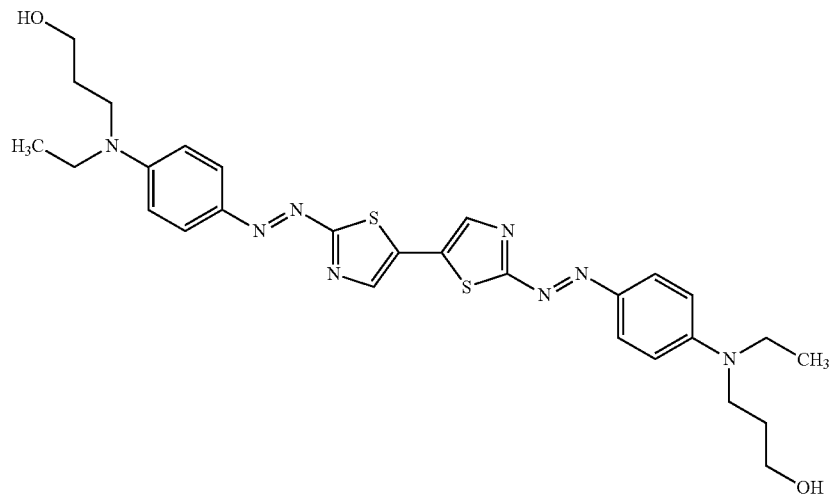
B113
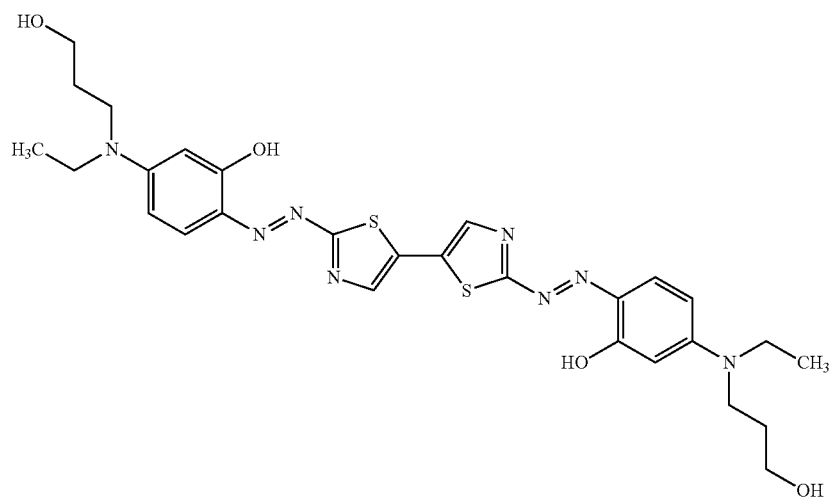
B114
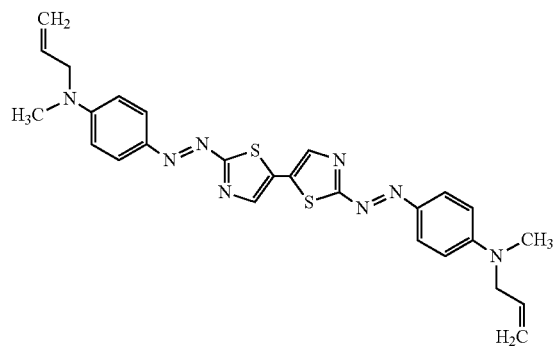
B115
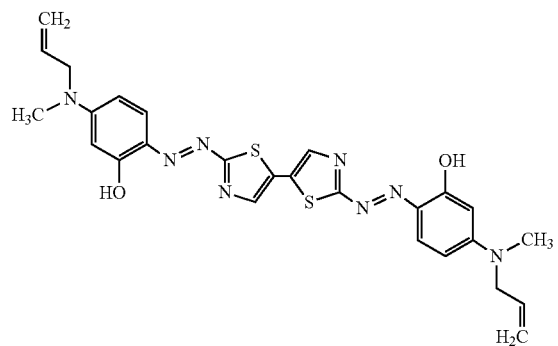
B116

-continued
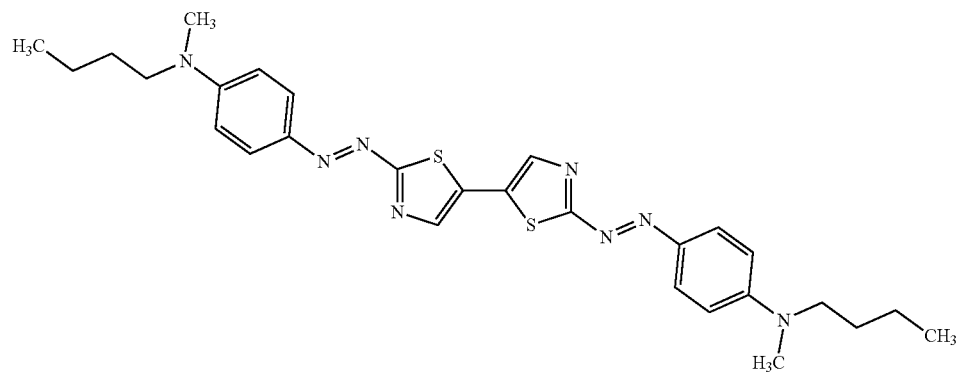
B117
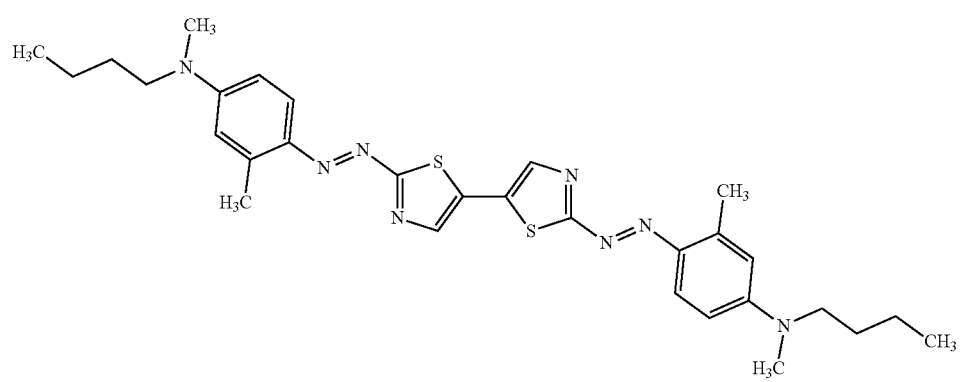
B118
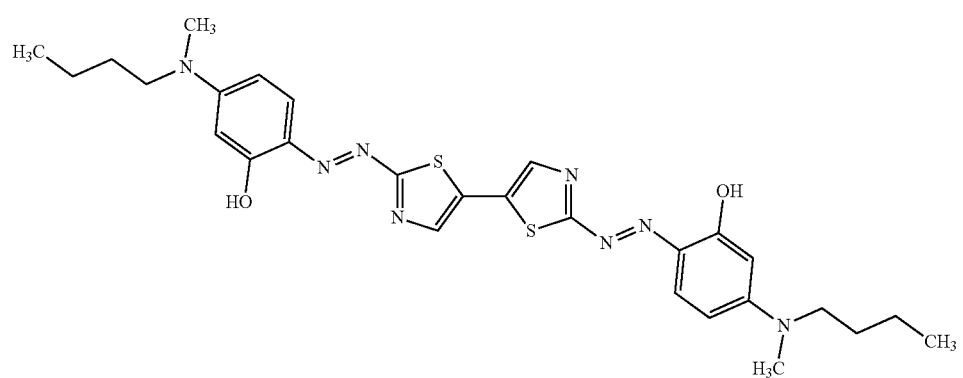
B119
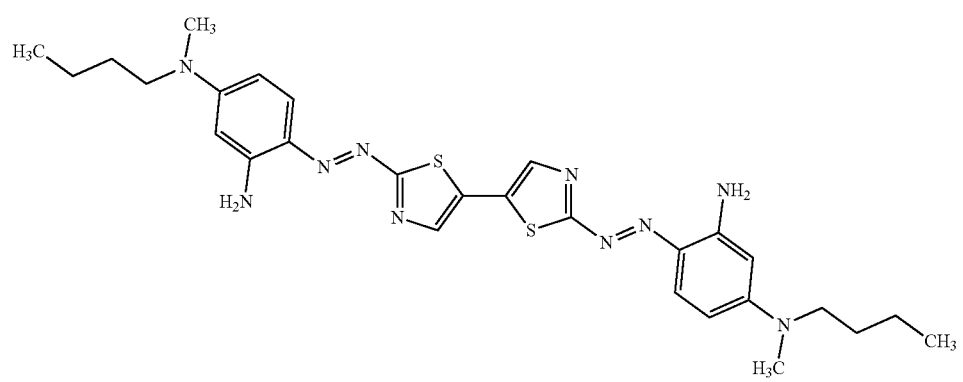
B120

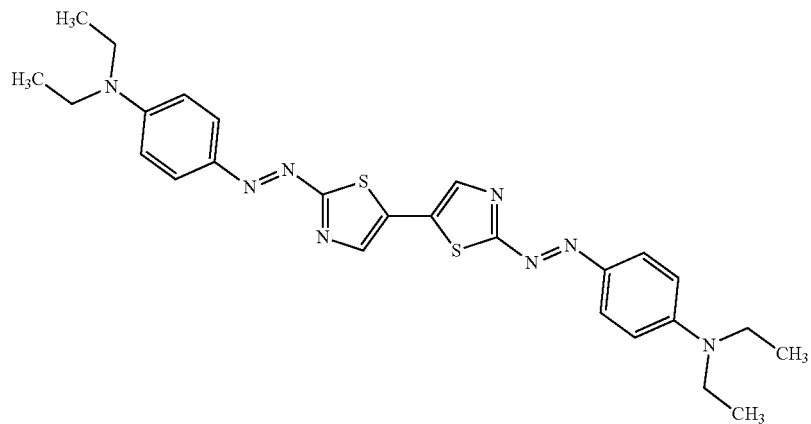
B121
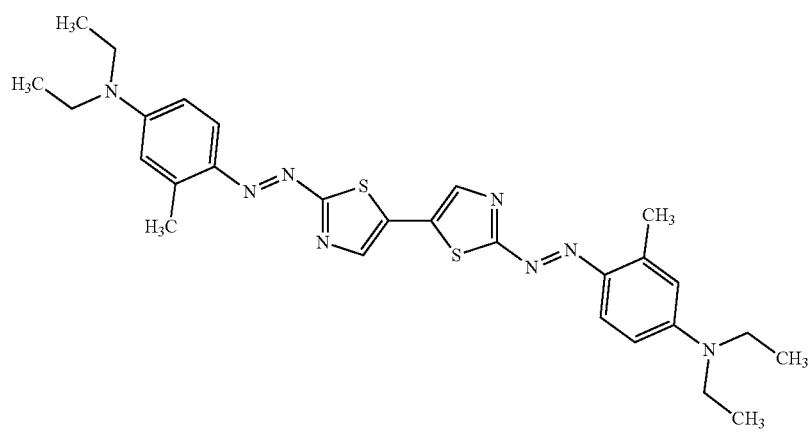
B122
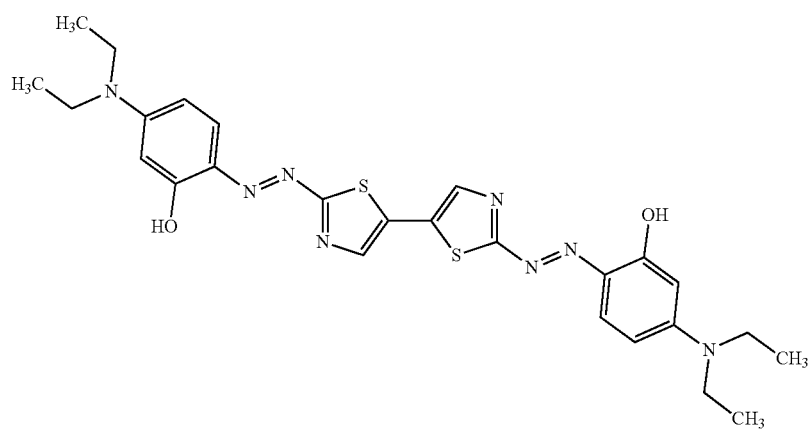
B123

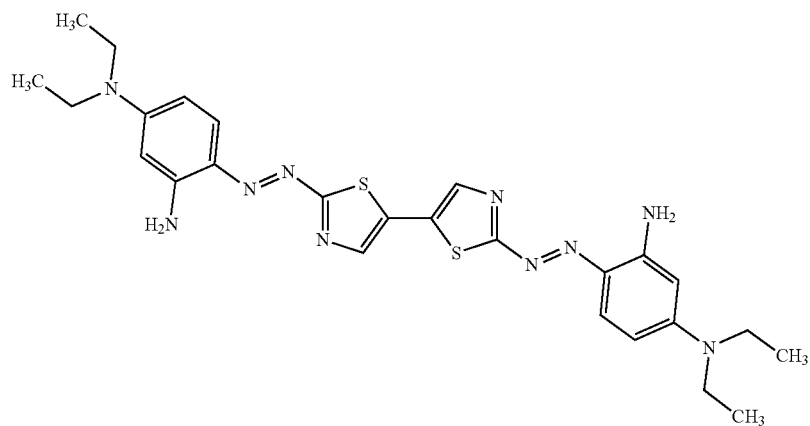
B124
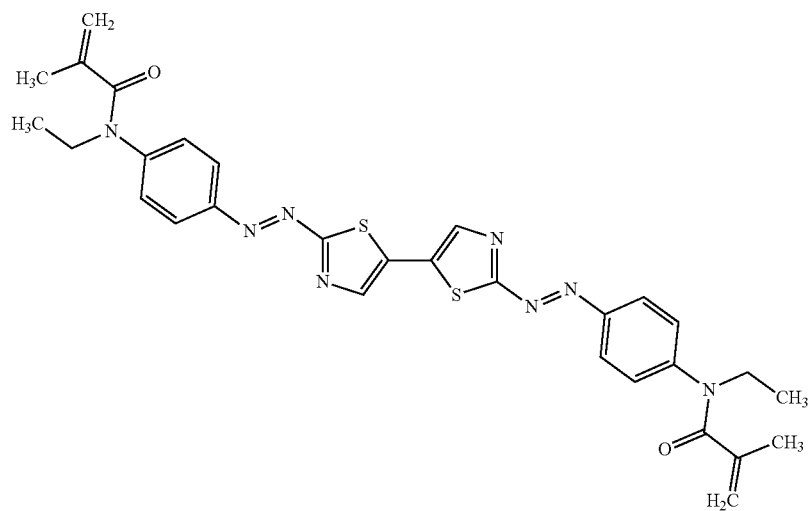
B125
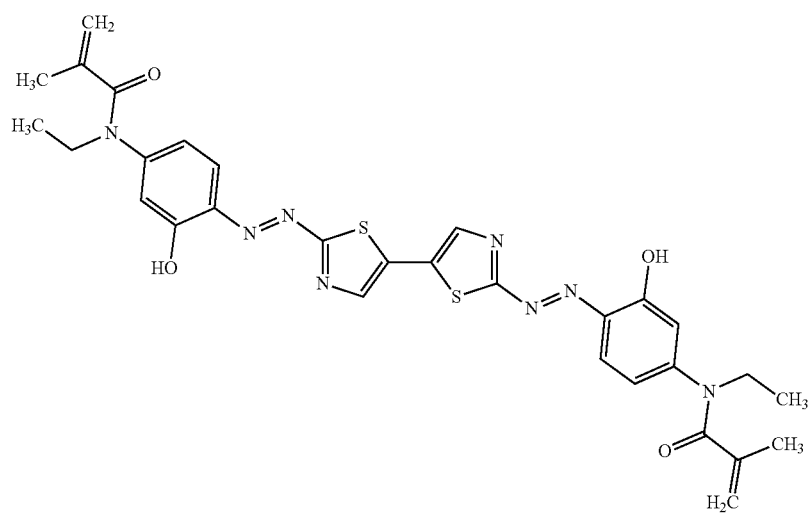
B126

-continued
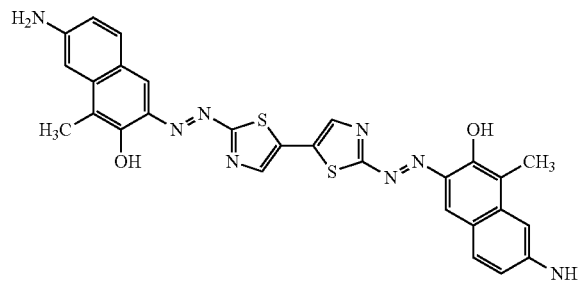
B127
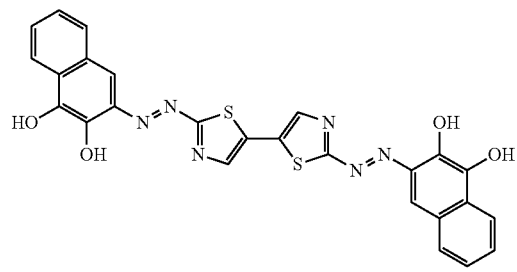
B128
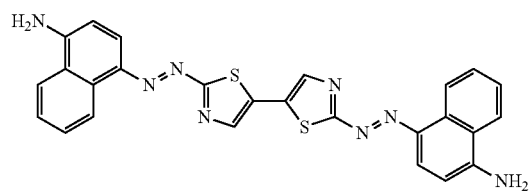
B129
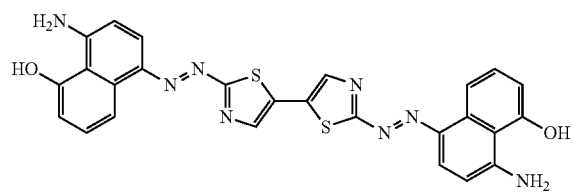
B130
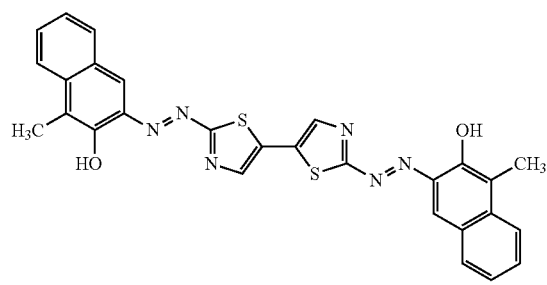
B131
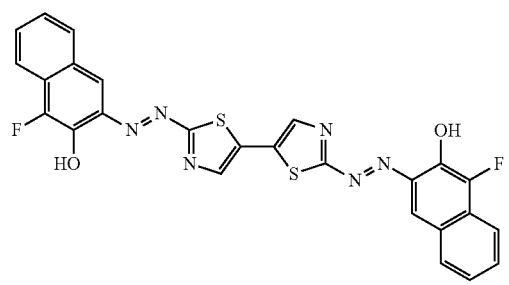
B132
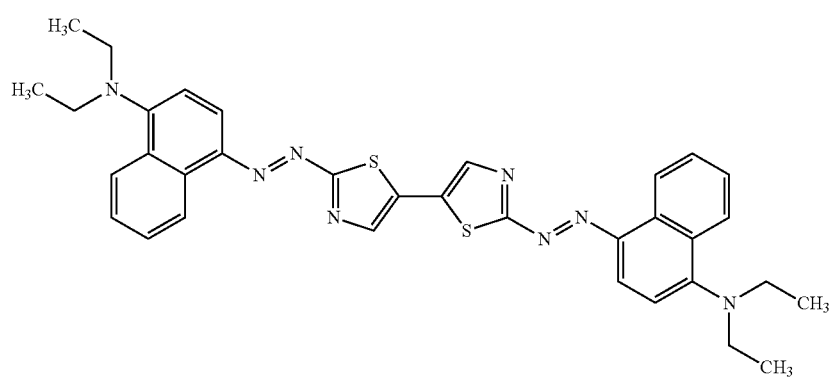
B133

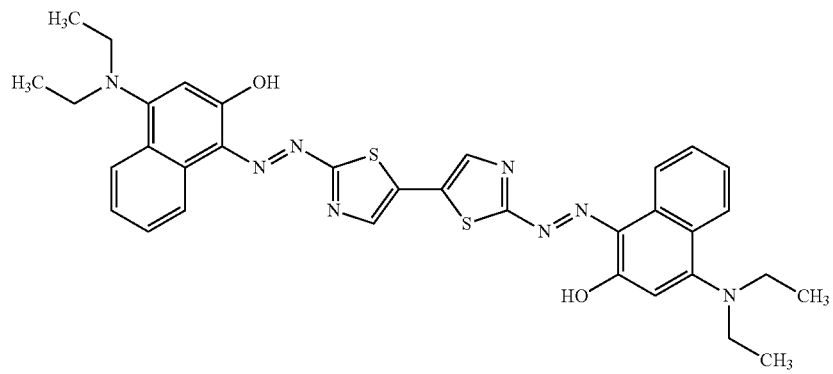

B134

The dye compound represented by Formula 1 may function as a dichroic dye exhibiting a good dichroic ratio because it has a substituent acting as a strong electron donor. Further, this dye compound can absorb light of a long wavelength band that a conventional dye compound did not have. Further, since this dye compound has excellent physical/chemical stability, the denaturation can be minimized even when it is exposed to high temperature or moisture, thereby exhibiting an effect of forming a polarizing layer having improved polarization degree and durability. Furthermore, since this dye compound has lipid solubility, it has excellent affinity to a liquid crystalline compound to be described later, and thus it has an advantage of being easy to align. Meanwhile, the present invention is not limited thereto, but there is an advantage that this dye compound can be synthesized by a relative simple method by performing a diazo-coupling reaction only once.

In some embodiments, the at least one dye compound may further include at least one of a dye compound represented by Formula C-1, a dye compound represented by Formula D-1, and a dye compound represented by Formula E-1, in addition to the aforementioned dye compound represented by Formula 1.

First, a dye compound represented by Formula C-1 will be described.

Wherein $R_{c11}$ may be a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group. $R_{c12}$ and $R_{c13}$ may be each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

In Formula C-1, substituents $R_{c1}$ and $R_{c1}'$ may be introduced at the para position of a benzene ring. The substituents $R_{c1}$ and $R_{c1}'$ bonded to the para position act as electron donors while minimizing the deterioration of linearity of the dye compound, thereby affecting the wavelength band of light absorbed by the dye compound. The stilbene group of the mother basic skeleton of the dye compound represented by Formula C-1 may be in an unsubstituted state. For example, when a carboxyl group and/or a sulfone group, Formula C-1

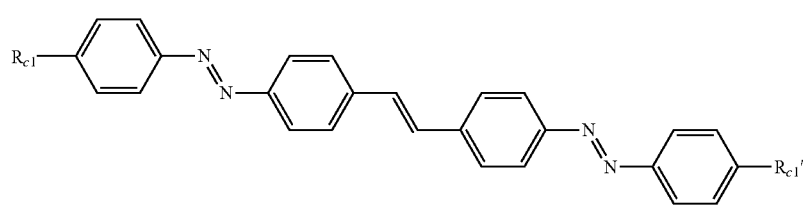

In Formula C-1, $R_{c1}$ and $R_{c1}'$ are each independently

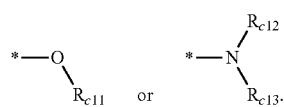

which is introduced into the stilbene group and can be oriented in the minor axis direction of the dye compound, is excluded, it is possible to secure the linearity of the dye compound and to impart lipid solubility to the dye compound.

In an exemplary embodiment, the dye compound represented by Formula C-1 may be a dye compound represented by Formula C-2 or Formula C-3.

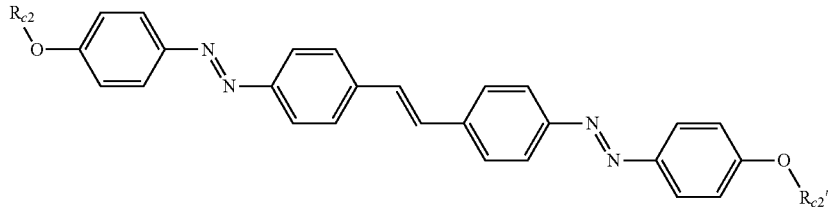

Formula C-2

In Formula C-2, $R_{c2}$ and $R_{c2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

The dye compound represented by Formula C-2 can absorb light of a wavelength band of about 400 nm to 500 nm, or about 430 nm to 470 nm, but the present invention is not limited thereto.

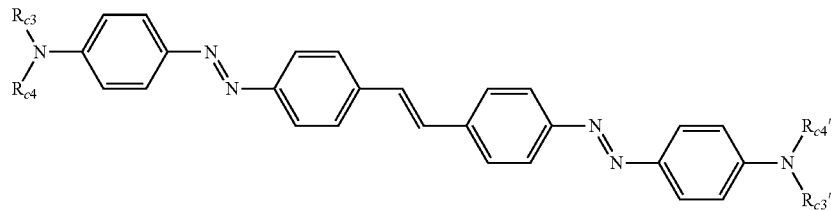

Formula C-3

In Formula C-3, $R_{c3}$, $R_{c4}$, $R_{c3}'$, and $R_{c4}'$ each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

The dye compound represented by Formula C-3 can absorb light of a wavelength band of about 500 nm to 600 nm, or about 530 nm to 570 nm, but the present invention is not limited thereto.

The dye compound represented by Formula C-1 may be exemplified by any one of the following compounds, but the present invention is not limited thereto.

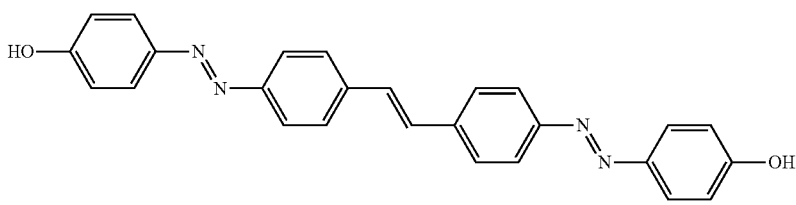

C101

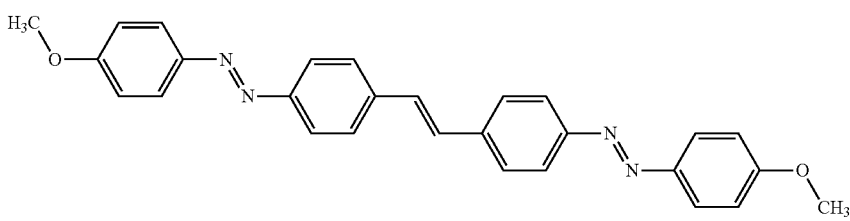

C102

-continued
C103
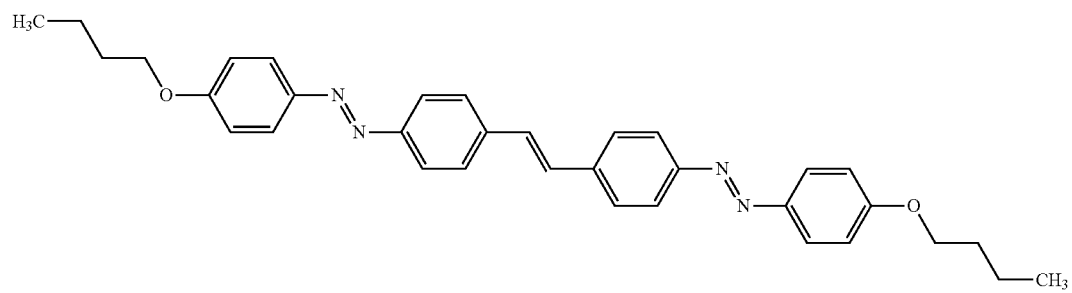
C104
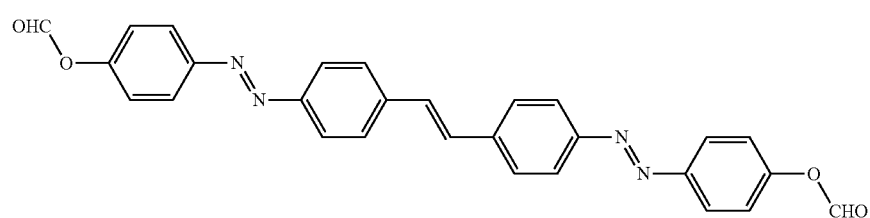
C105
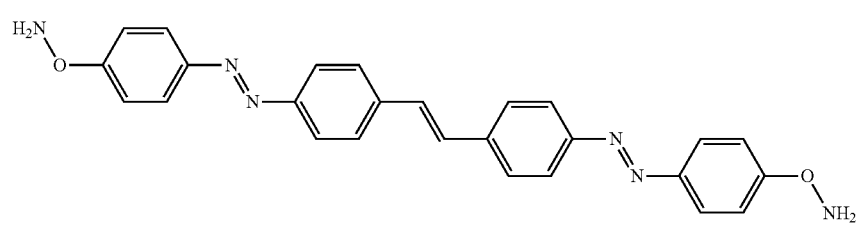
C106
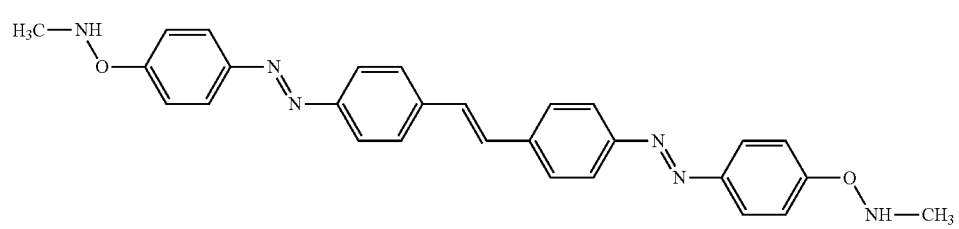
C107
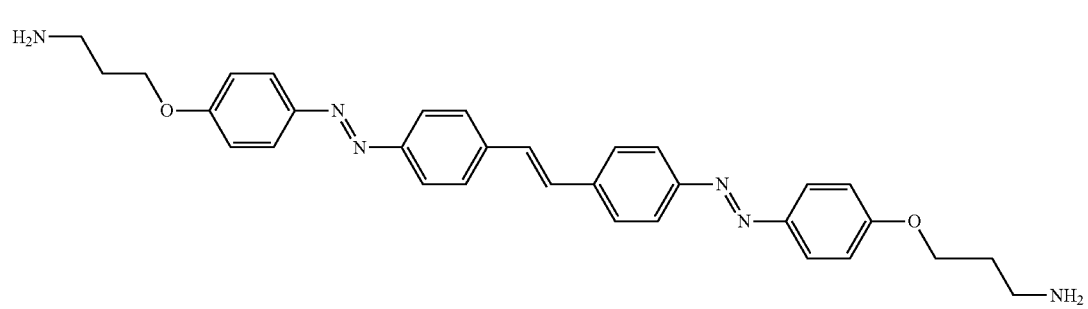
C108
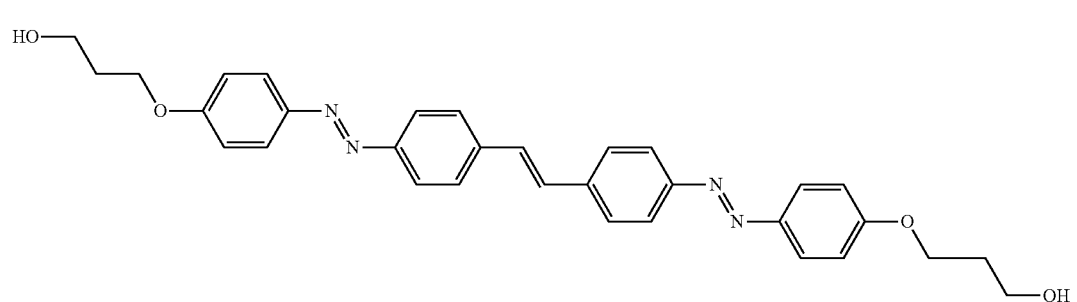

-continued
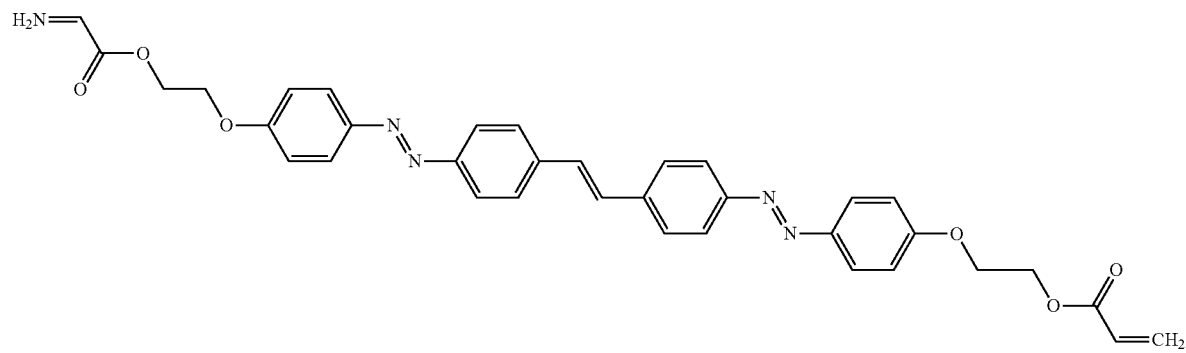
C109
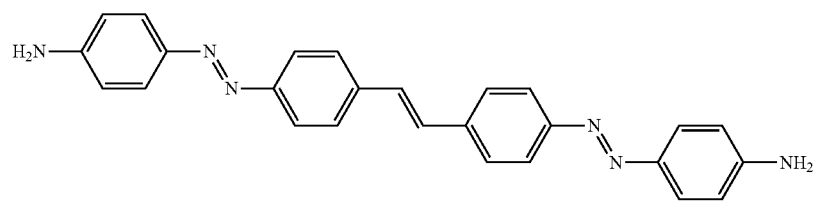
C110
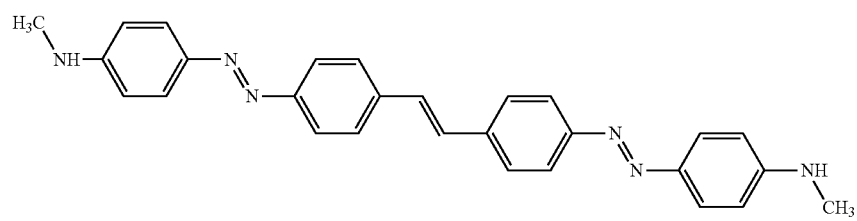
C111
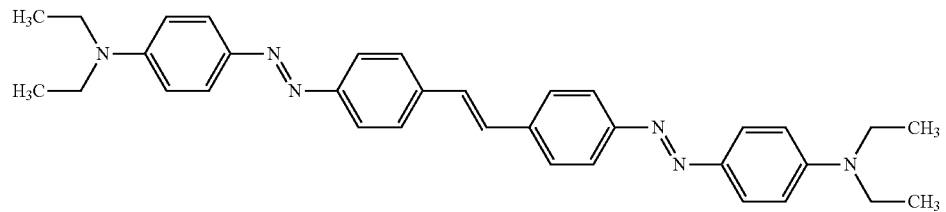
C112
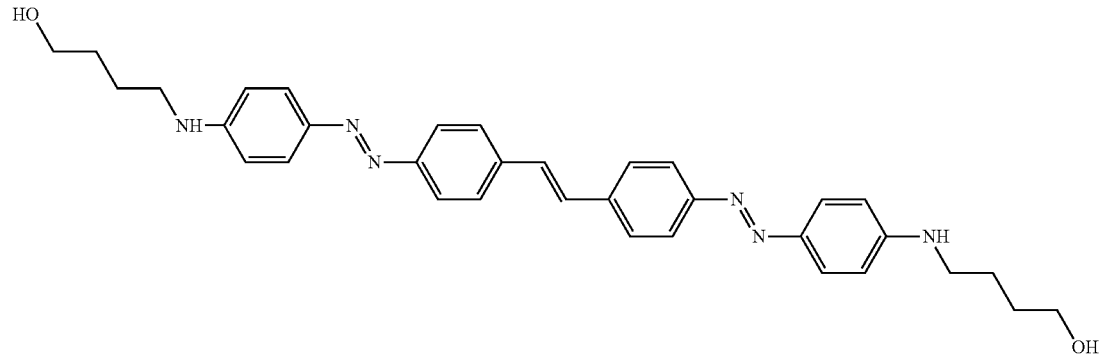
C113

-continued

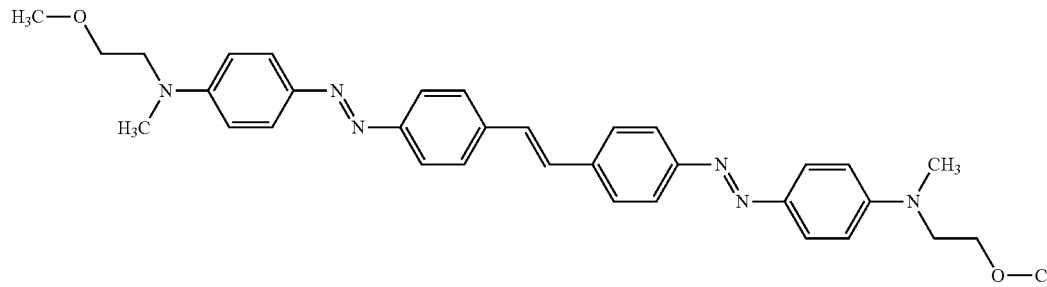
C114

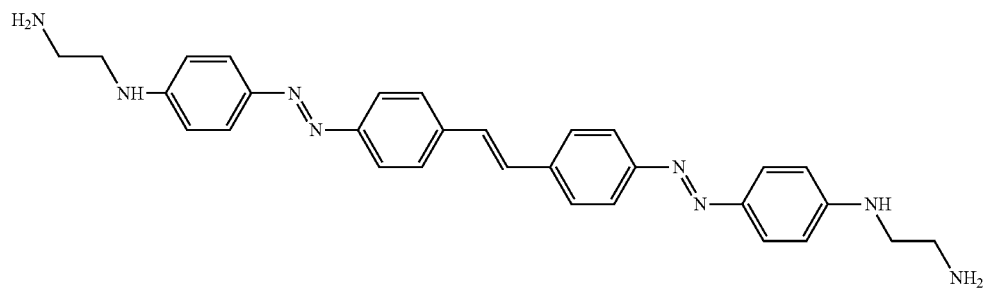
C115

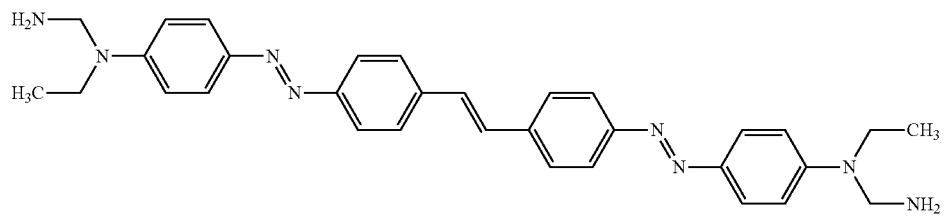
C116

Subsequently, a dye compound represented by Formula D-1 will be described.

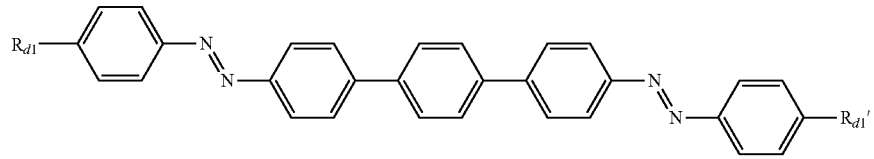

Formula D-1

In Formula D-1, $R_{d1}$ and $R_{d1}'$ are each independently

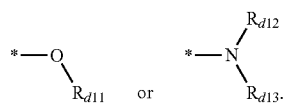

Wherein $R_{d11}$ may be a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group. $R_{d12}$ and $R_{d13}$ may be each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

In Formula D-1, substituents $R_{d1}$ and $R_{d1}'$ may be introduced at the para position of a benzene ring. The substituents $R_{d1}$ and $R_{d1}'$ bonded to the para position act as electron donors while minimizing the deterioration of linearity of the dye compound, thereby affecting the wavelength band of light absorbed by the dye compound. The terphenyl group of the mother basic skeleton of the dye compound represented by Formula D-1 may be in an unsubstituted state. For example, when a carboxyl group and/or a sulfone group, which is introduced into the terphenyl group and can be oriented in the minor axis direction of the dye compound, is excluded, it is possible to maintain the linearity of the dye compound and to impart lipid solubility to the dye compound.

In an exemplary embodiment, the dye compound represented by Formula D-1 may be a dye compound represented by Formula D-2 or Formula D-3.

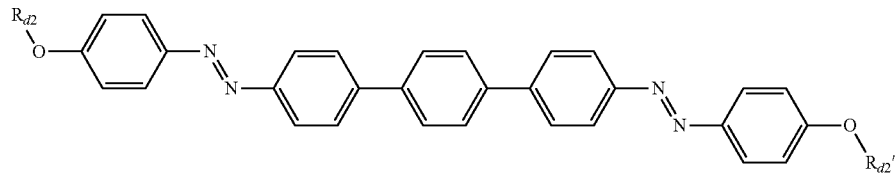

Formula D-2

In Formula D-2, $R_{d2}$ and $R_{d2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

The dye compound represented by Formula D-2 can absorb light of a wavelength band of about 400 nm to 500 nm, or about 430 nm to 470 nm, but the present invention is not limited thereto.

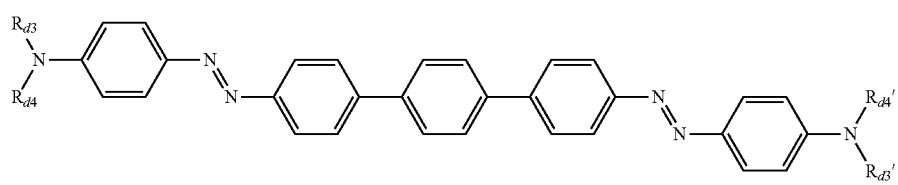

Formula D-3

In Formula D-3, $R_{d3}$, $R_{d4}$, $R_{d3}'$, and $R_{d4}'$ each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

The dye compound represented by Formula D-3 can absorb light of a wavelength band of about 500 nm to 600 nm, or about 530 nm to 570 nm, but the present invention is not limited thereto.

The dye compound represented by Formula D-1 may be exemplified by any one of the following compounds, but the present invention is not limited thereto.

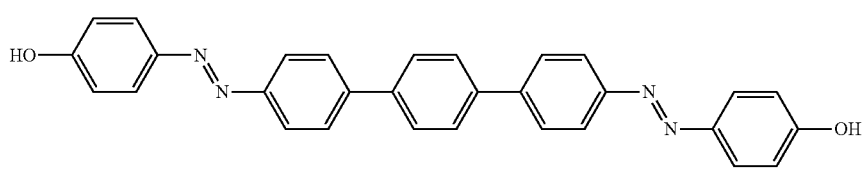

D101

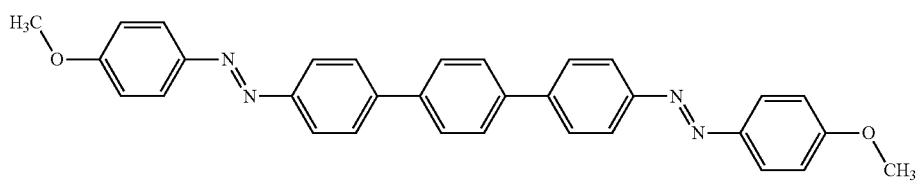

D102

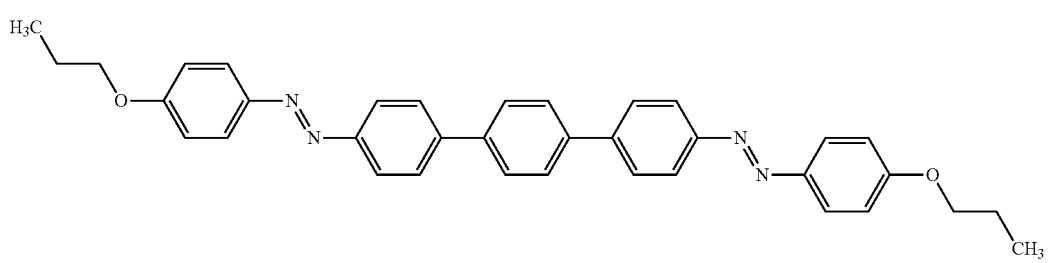

D103

-continued
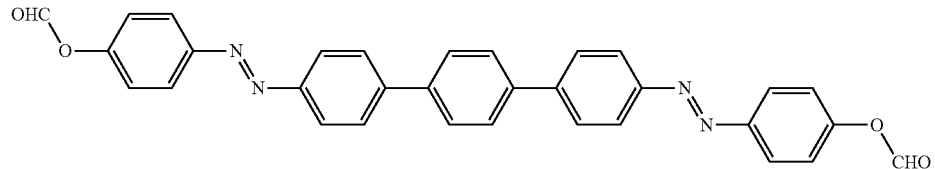
D104
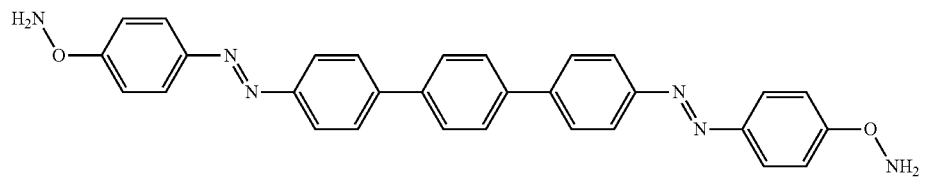
D105
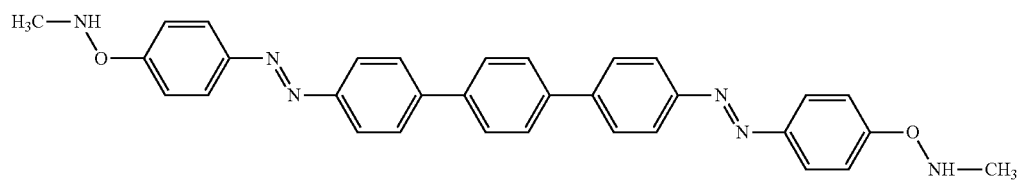
D106
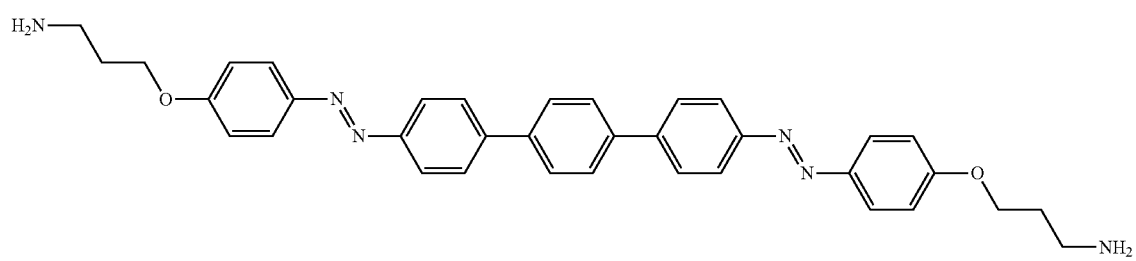
D107
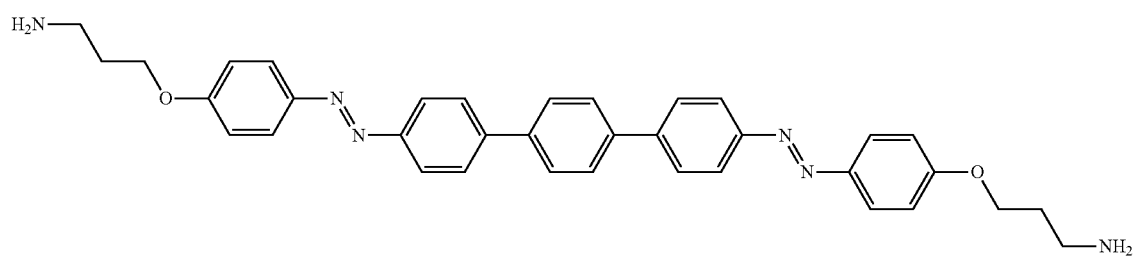
D108
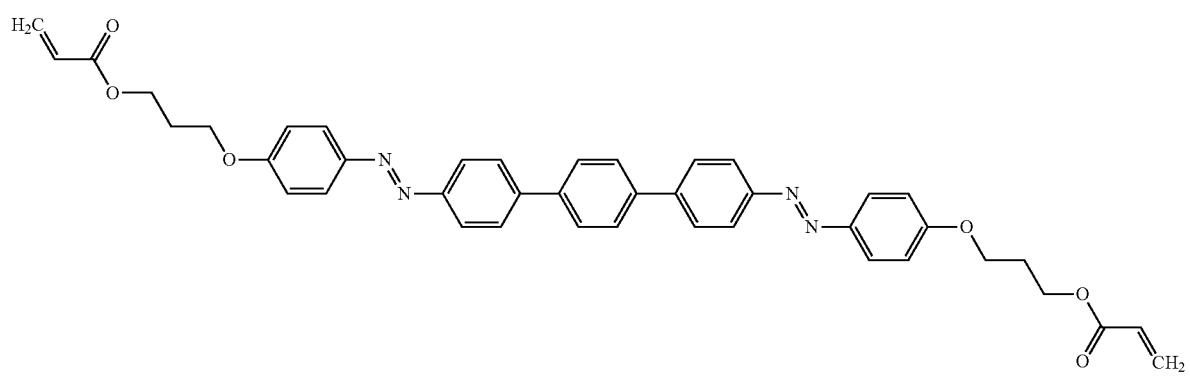
D109
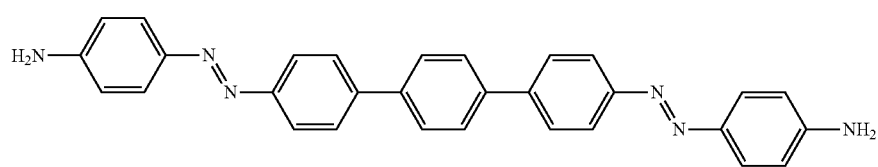
D110

-continued
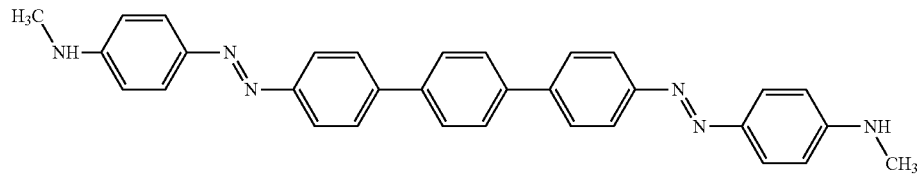
D111
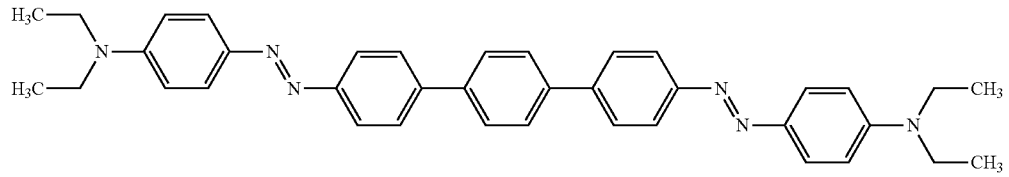
D112
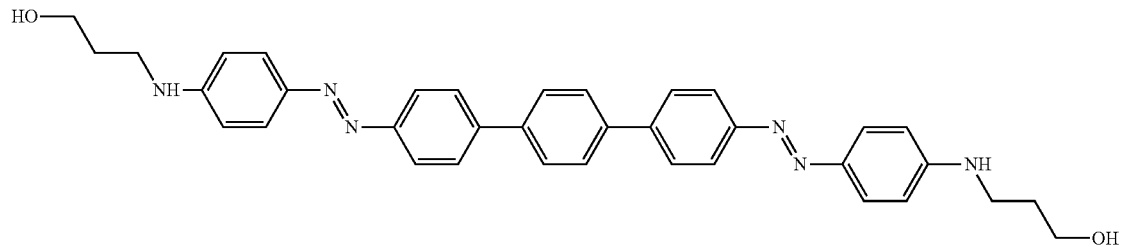
D113
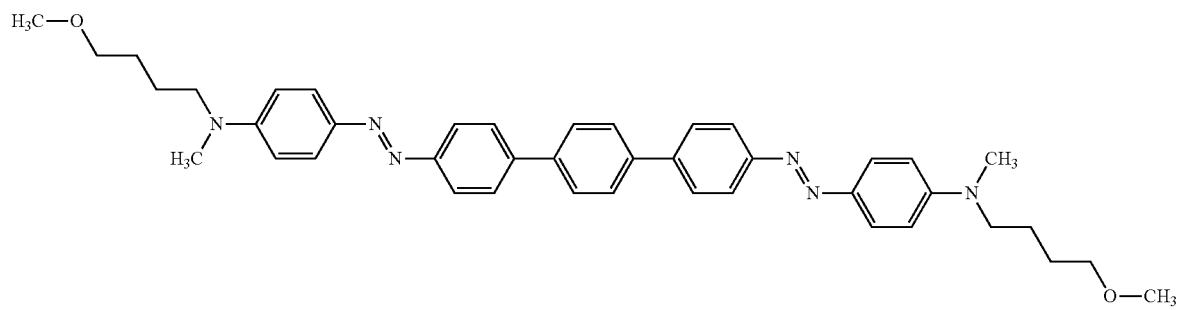
D114
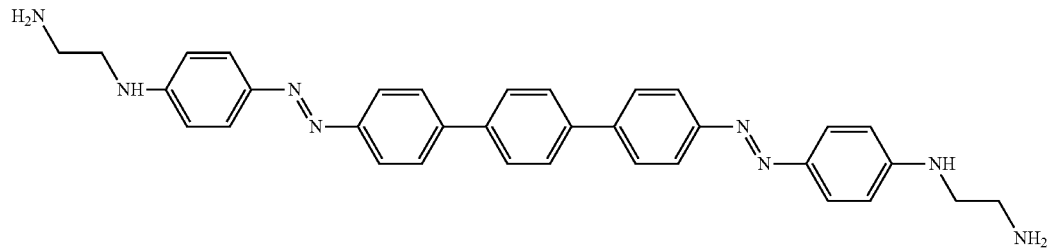
D115
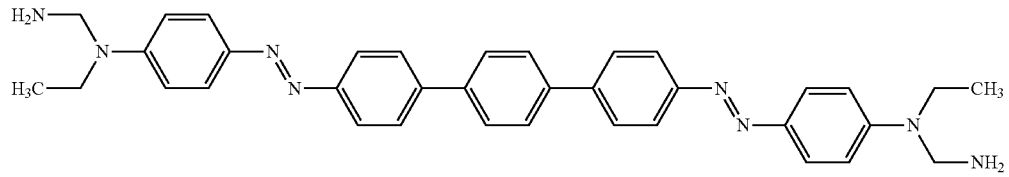
D116
Subsequently, a dye compound represented by Formula E-1 will be described.

Formula E-1

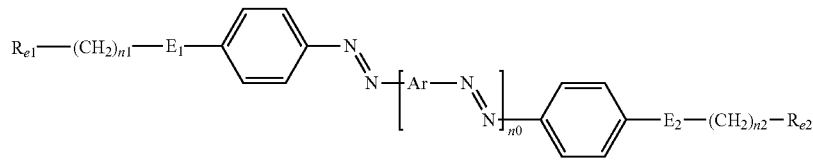

In Formula E-1, Ar is divalent ring group of 4 to 12 carbon atoms. For example, Ar may be a divalent aromatic or aliphatic group of 4, 5, 6, 7, 8, 9, 10, 11 or 12 carbon atoms, which has one ring group or two or more fused or unfused ring groups. Ar may be 1,4-phenylene, 4,4'-biphenylene, 1,4-naphthalene, 2,6-naphthalene,

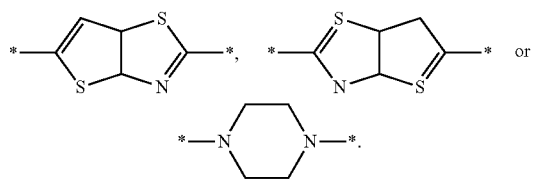

n0 may define a repetition unit. In an exemplary embodiment, n0 may be an integer of 1 to 3. Each Ar in the repeat unit defined by n0 may be the same as or different from each other. The mother basic skeleton defined by n0 and Ar can impart color developing properties to the dye compound represented by Formula E-1.

$E_1$ and $E_2$ may be each independently a single bond, *—O—*, *—(C=O)O—*, or *—O(C=O)—*. n1 and n2 may define the length of an alkylene group connecting a mother basic skeleton and a terminal group. n1 and n2 may be independently an integer of 1 to 12.

$R_{e1}$ and $R_{e2}$ may be each independently a photopolymerizable group. For example, $R_{e1}$ and $R_{e2}$ may be each independently an acryloyl group, an acrylate group, a methacryloyl group, or a methacrylate group. The terminal groups $R_{e1}$ and $R_{e2}$ may impart reactivity to the dye compound represented by Formula E-1, thereby enabling polymerization with a liquid crystalline compound. That is, the dye compound represented by Formula E-1 may be a reactive dye compound.

In an exemplary embodiment, the dye compound represented by Formula E-1 may be a dye compound represented by any one of Formulae E-2 to E-7.

Formula E-2

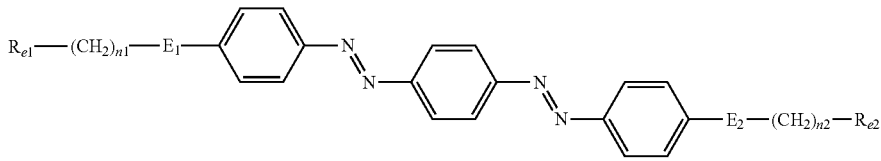

Formula E-3

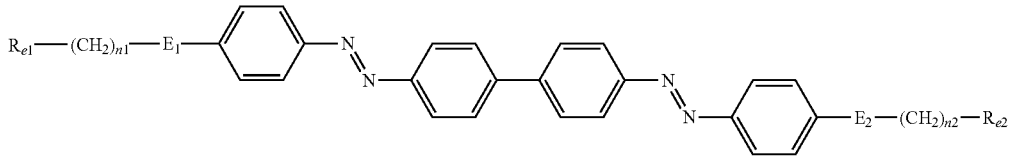

Formula E-4

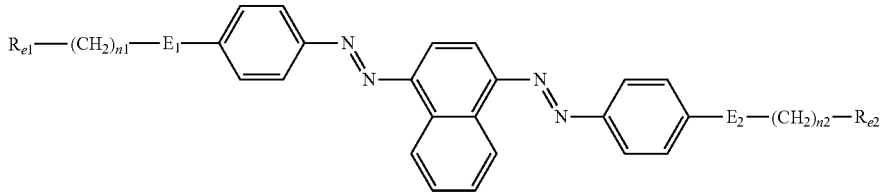

Formula E-5

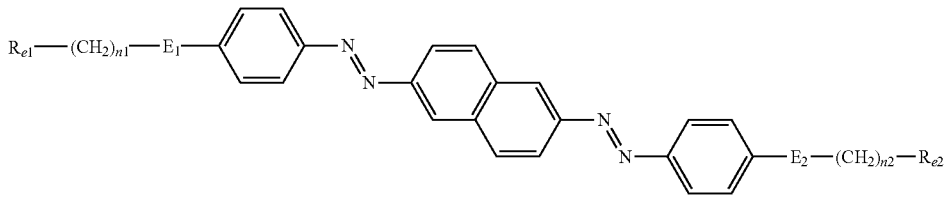

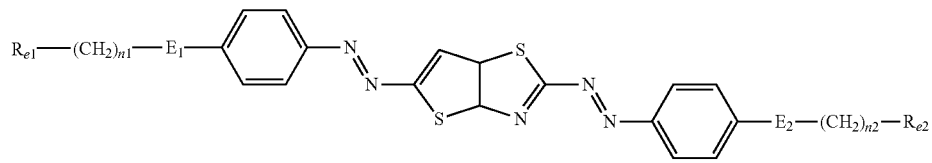

Formula E-6

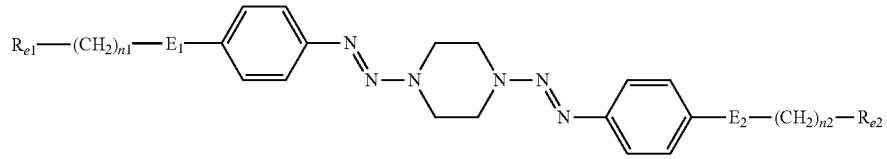

Formula E-7

In Formulae E-2 to E-7, n1, n2, $E_1$, $E_2$, $R_{e1}$, and $R_{e2}$ have been defined in Formula E-1.

As a non-limiting example, a composition including the at least one dye compound may include the aforementioned dye compound represented by Formula A-1 as a dye compound. As another example, the composition may include the aforementioned dye compound represented by Formula A-2 as a dye compound. As still another example, the composition may include the aforementioned dye compound represented by Formula A-3 as a dye compound. As still another example, the composition may include the aforementioned dye compound represented by Formula B-1 as a dye compound. As still another example, the composition may include the aforementioned dye compound represented by Formula B-2 as a dye compound. As still another example, the composition may include the aforementioned dye compound represented by Formula B-3 as a dye compound. As still another example, the composition may include the aforementioned dye compound represented by Formula B-4 as a dye compound.

In an exemplary example, the composition including the at least one dye compound may include both the dye compound represented by Formula A-1 and the dye compound represented by Formula B-2 as dye compounds. In some embodiments, the composition may further include the dye compound represented by Formula C-2 and/or the dye compound represented by Formula D-2 as a dye compound. In some embodiments, the composition may further include the dye compound represented by Formula B-3 and/or the dye compound represented by Formula B-4 as a dye compound. In some embodiments, the composition may further include the dye compound represented by Formula E-1 as a dye compound.

The dye compound represented by Formula A-1 may absorb light in a wavelength band of about 500 nm to 600 nm, and the dye compound represented by Formula B-2 may absorb light in a wavelength band of about 600 nm to 670 nm. The dye compound represented by Formula C-2 and the dye compound represented by Formula D-2 may absorb light in a wavelength band of about 400 nm to 500 nm. The dye compound represented by Formula B-3 and the dye compound represented by Formula B-4 may absorb light in a wavelength band of about 650 nm to 700 nm. However, the present invention is not limited thereto. When the composition according to this embodiment is used as a coating composition for manufacturing a polarizing element, this composition includes a dye compound having a good dichroic ratio with respect to the entire wavelength band of visible light, so that the polarized light vibrating in the absorption axis direction of the polarizing element is completely absorbed regardless of a wavelength band, thereby providing a polarizing element having excellent polarization degree.

Further, the present invention is not limited thereto. For example, when the affinity between the aforementioned dye compound represented by Formula C-2, the aforementioned dye compound represented by Formula D-2 and/or the aforementioned dye compound represented by Formula E-1 and a liquid crystalline compound to be described later is insufficient, the dispersion characteristics of the dye compounds in the liquid crystalline compound constituting a host material can be improved by using excellent affinity between the dye compound represented by Formula 1 (for example, Formula A-1, Formula B-2, Formula B-3, and Formula B-4) and affinity between the dye compound represented by Formula 1 and other dye compounds (for example, compounds represented by Formula C-2, Formula D-2 and/or Formula E-1).

In another exemplary embodiment, the composition including the at least one dye compound may include the dye compound represented by Formula B-1 as dye compounds. In some embodiments, the composition may further include the dye compound represented by Formula C-3 and/or the dye compound represented by Formula D-3 as a dye compound. In some embodiments, the composition may further include the dye compound represented by Formula C-2 and/or the dye compound represented by Formula D-2 as a dye compound. In some embodiments, the composition may further include the dye compound represented by Formula E-1 as a dye compound.

The dye compound represented by Formula B-1 may absorb light in a wavelength band of about 600 nm to 700 nm. The dye compound represented by Formula C-3 and the dye compound represented by Formula D-3 may absorb light in a wavelength band of about 500 nm to 600 nm. The dye compound represented by Formula C-2 and the dye compound represented by Formula D-2 may absorb light in a wavelength band of about 400 nm to 500 nm. However, the present invention is not limited thereto. When the composition according to this embodiment is used as a coating composition for manufacturing a polarizing element, this composition includes a dye compound having a good dichroic ratio with respect to the entire wavelength band of visible light, so that the polarized light vibrating in the absorption axis direction of the polarizing element is completely absorbed regardless of a wavelength band, thereby providing a polarizing element having excellent polarization degree. As another example, the composition includes the dye compound having an excellent dichroic ratio with respect to light of a specific wavelength band, thereby providing a polarizing element having excellent polarization degree with respect to light of a specific wavelength band.

Further, the present invention is not limited thereto. For example, when the affinity between the aforementioned dye compounds represented by Formula C-2 and Formula C-3, the aforementioned dye compounds represented by Formula D-2 and Formula D-3 and/or the aforementioned dye compound represented by Formula E-1 and a liquid crystalline compound to be described later is insufficient, the dispersion characteristics of the dye compounds in the liquid crystalline compound constituting a host material can be improved by using excellent affinity between the dye compound represented by Formula 1 (for example, Formula B-1) and the liquid crystalline compound and affinity between the dye compound represented by Formula 1 and other dye compounds (for example, Formula C-2, Formula C-3, Formula D-2, Formula D-3, and/or Formula E-1).

Meanwhile, the liquid crystalline compound may be a reactive-liquid crystalline compound.

The reactive-liquid crystalline compound according to this embodiment may be a liquid crystalline compound including a mesogen mother basic skeleton exhibiting liquid crystallinity and a photopolymerizable group and having a smectic phase. For example, the reactive-liquid crystalline compound according to this embodiment may have a smectic phase at any temperature (certain temperature) of about 0° C. to 100° C., or about 10° C. to 20° C., or about 20° C. to 30° C., or about 30° C. to 40° C., or about 40° C. to 50° C., or about 50° C. to 60° C., or about 60° C. to 70° C., or about 70° C. to 80° C., or about 80° C. to 90° C., or about 90° C. to 100° C. Since the liquid crystal compound having a smectic B phase in the smectic phase has a higher order parameter than nematic liquid crystal, smectic A liquid crystal and smectic C liquid crystal, this liquid crystal compound is advantageous in inducing anisotropic orientation.

In an exemplary embodiment, the liquid crystal compound having a smectic phase may be selected from liquid crystal compounds represented by Formula F-1.

Formula F-1

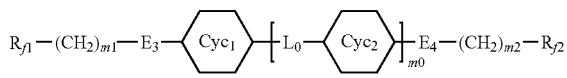

In Formula F-1, $Cyc_1$ and $Cyc_2$ are each independently a divalent ring group of 6 to 12 carbon atoms. For example, $Cyc_1$ and $Cyc_2$ may be each independently 1,4-phenylene, 1,4-cyclohexylene,

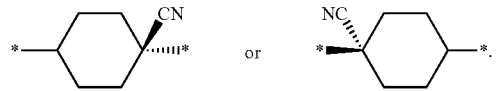

m0 may define a repetition unit of a mother basic skeleton. In an exemplary embodiment, m0 may be an integer of 1 to 3, and $L_0$ may be a single bond, *—(C=O)O—*, *—O(C=O)—*, an alkylene group of $C_{1-4}$ (*—$(CH_2)_k$—* wherein k is a natural number), *—CH=CH—*, or *—C≡C—*. $L_0$ and $Cyc_2$ in the repetition unit defined by m0 are the same as or different from each other.

The mesogen mother basic skeleton defined by m0, $Cyc_2$ and $L_0$ may impart liquid crystallinity to the compound represented by Formula F-1 to allow the liquid crystal compound to have alignment ability. Further, the dye compositions having lipid solubility according to this embodiment (for example, dye compounds represented by Formula 1, Formula C-1, Formula D-1, and Formula E-1) have excellent intermolecular interaction due to geometric molecular structure, that is, affinity, thereby assisting the orientation of the dye compound.

$E_3$ and $E_4$ may be each independently a single bond, *—O—*, *—(C=O)O—*, or *—O(C=O)—*. m1 and m2 may define the length of an alkylene group connecting a mother basic skeleton and a terminal group. m1 and m2 may be independently an integer of 0 to 12.

$R_{f1}$ and $R_{f2}$ may be each independently a hydrogen atom or a photopolymerizable group. Examples of the photopolymerizable group may include an acryloyl group, an acrylate group, a methacryloyl group, and a methacrylate group. At least one of $R_{f1}$ and $R_{f2}$ may be a photopolymerizable group. For example, at least one of $R_{f1}$ and $R_{f2}$ may be an acryloyl group, an acrylate group, a methacryloyl group, or a methacrylate group. The terminal groups $R_{f1}$ and $R_{f2}$ may impart reactivity to the liquid crystalline compound represented by Formula F-1, thereby enabling polymerization. That is, the dye compound represented by Formula E-1 may be a reactive dye compound. The polymerized liquid crystalline compound can maintain a stable alignment state.

The liquid crystalline compound represented by Formula F-1 may be a liquid crystalline compound represented by any one of Formulae F-2 to F-6.

Formula F-2

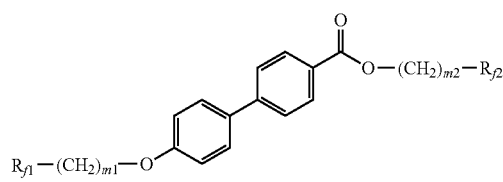

Formula F-3

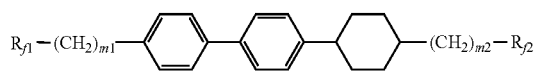

Formula F-4

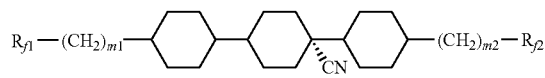

Formula F-5

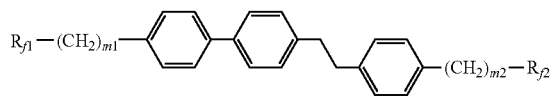

Formula F-6

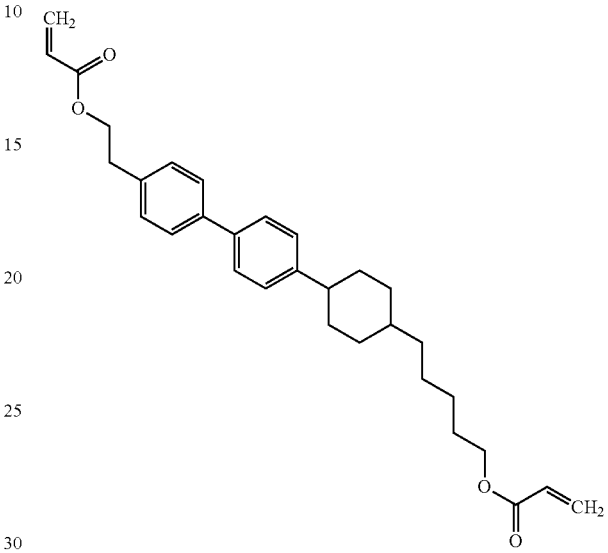

In Formulae F-2 to F-6, m1, m2, $R_{f1}$ and $R_{f2}$ have been defined in Formula 1.

The liquid crystalline compound represented by Formula F-2 may have a smectic B phase at a temperature of about 20° C. to 70° C. The liquid crystalline compound represented by Formula F-3 may have a smectic B phase at a temperature of about 35° C. to 140° C. The liquid crystalline compound represented by Formula F-4 may have a smectic B phase at a temperature of about 35° C. to 170° C. The liquid crystalline compound represented by Formula F-5 may have a smectic B phase at a temperature of about 60° C. to 100° C. The liquid crystalline compound represented by Formula F-6 may have a smectic B phase at a temperature of about 60° C. to 220° C.

The liquid crystalline compound represented by Formula F-1 may be exemplified by any one of the following compounds, but the present invention is not limited thereto.

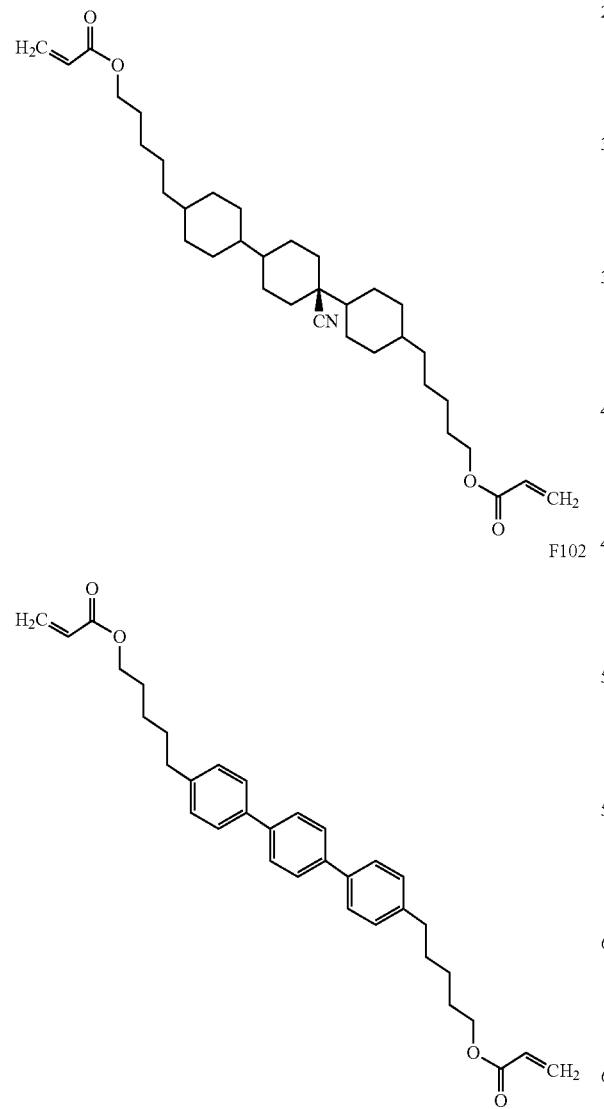

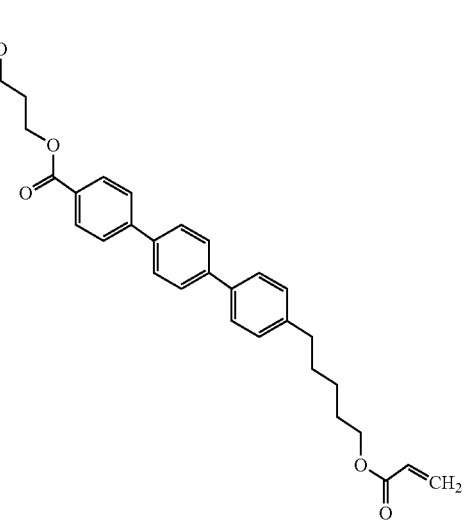

-continued
F105
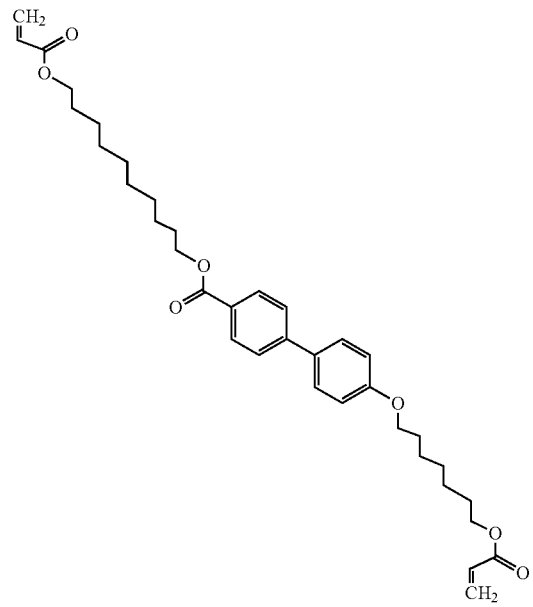
F106
F107
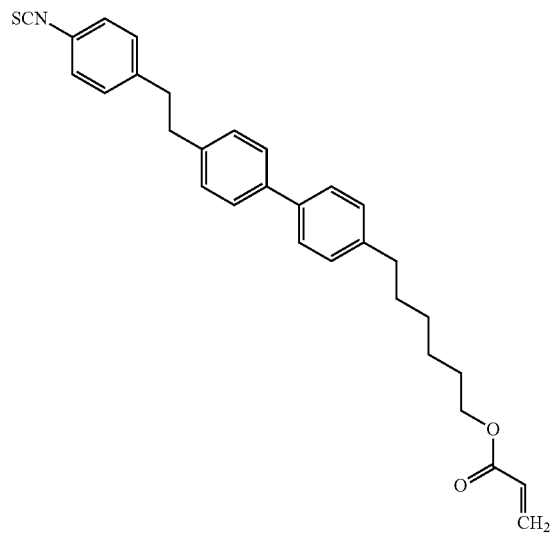
F108
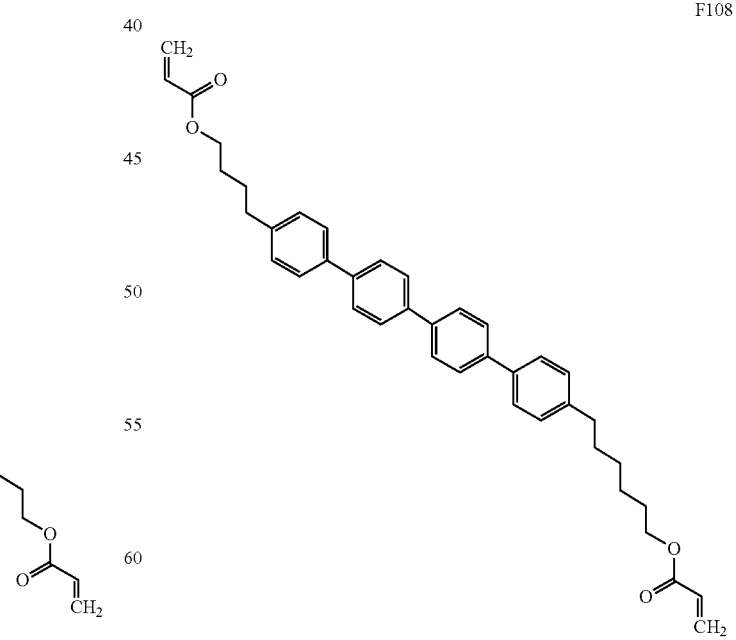

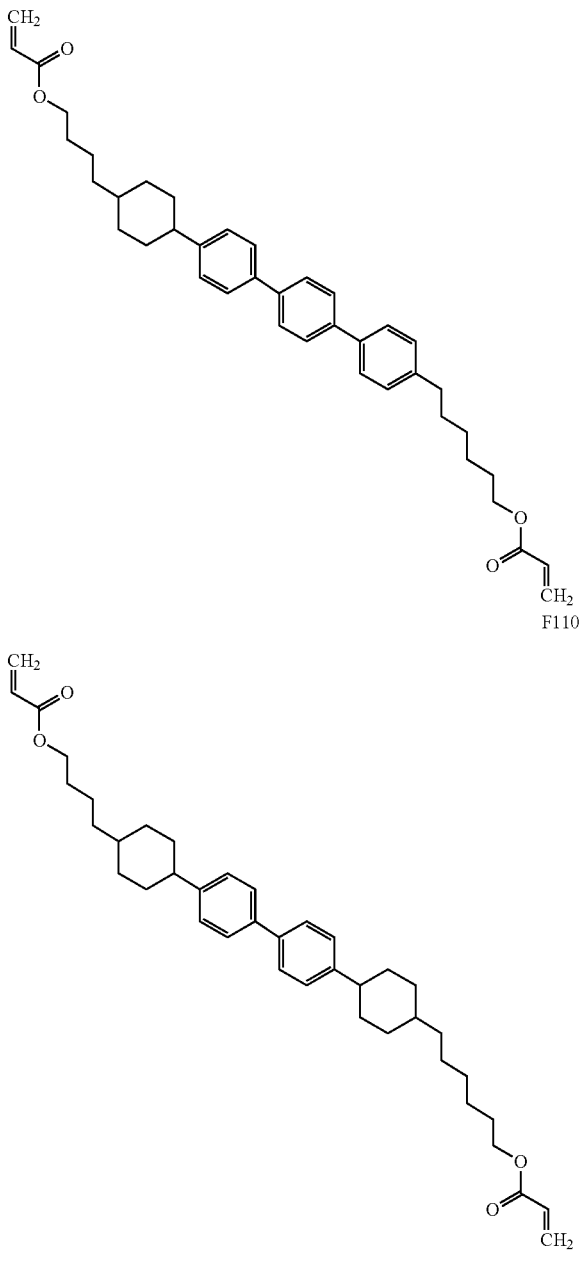

The compounds F101 to F110 may all have a smectic B phase.

In some embodiments, the composition may further include a crosslinking agent, an initiator, and a solvent.

The crosslinking agent is not particularly limited as long as it can form crosslinking so as to improve the degree of curing of a coating layer formed using the composition. For example, the crosslinking agent may include a phosphine-based initiator such as Irgacure 1173 of CIBA Inc.

The initiator is not particularly limited as long as it can initiate the polymerization of photopolymerizable groups of the aforementioned reactive-liquid crystalline compound (for example, Formula F-1) and/or a dye compound having a photoreactive group (for example, Formula E-1). For example, the initiator may be a photoinitiator that initiates polymerization by light of about 365 nm or 254 nm.

In an exemplary example, the composition according to one embodiment may include about 250 parts by weight to 1500 parts by weight of the liquid crystalline compound with respect to 100 parts by weight of the dye compound, and may further include about 50 parts by weight to 500 parts by weight of the crosslinking agent and about 10 parts by weight to 150 parts by weight of the initiator. When the liquid crystalline compound is included in an amount of 250 parts by weight or more, the liquid crystalline compound in the composition is sufficient to form a host of a smectic B phase to form a stable orientation. When the liquid crystalline compound is included in an amount of 1500 parts by weight or less, the polarized components of light vibrating in the absorption axis direction of the dye compound can be sufficiently absorbed by the alignment or orientation of the dichroic dye compound, which is a guest material, and thus a coating layer having polarization characteristics can be formed.

The solvent is not particularly limited as long as it is a solvent in which the dye compound and the liquid crystal compound can be dissolved, but examples thereof may include propylene glycol monomethyl ether acetate, methyl ethyl ketone, γ-butyrolactone, anisole, toluene, and xylene.

As a non-limiting example, the composition according to an embodiment may include about 2 wt % to 8 wt % of the dye compound, about 20 wt % to 30 wt % of the liquid crystalline compound, about 5 wt % to 10 wt % of the crosslinking agent, about 1 wt % to 3 wt % of the initiator, and residual solids and solvent, with respect to the total weight of the composition. However, the present invention is not limited thereto. The composition according to an embodiment may be in a state of maintaining a smectic B phase at a temperature of about 0° C. to 100° C.

Hereinafter, methods of preparing the above compounds according to the embodiments will be described.

EXAMPLES

Example 1: Synthesis of Diazonium Salt Solution

Example 1-1: Synthesis of Piperazine-Based Diazonium Salt Solution 2.68 g of 4,4'-(piperazine-1,4-diyl) dianiline was added to 100 ml of a 1.5 M aqueous hydrochloric acid solution, and the mixed solution was stirred at room temperature for 20 minutes. The stirred solution was cooled to 0° C. to 5° C., and was further stirred for 1 hour after the addition of 1.38 g of sodium nitrite. The stirred solution was additionally stirred for 30 minutes after the addition of 0.2 g of sulfamic acid, so as to prepare a diazonium salt solution.

Example 1-2: Synthesis of Bithiazole-Based Diazonium Salt Solution 0.99 g of 2,2'-diamino-4,4-bithiazole was added to 50 ml of a 1.5 M aqueous hydrochloric acid solution, and the mixed solution was stirred at room temperature for 20 minutes. The stirred solution was cooled to 0° C. to 5° C., and was further stirred after 1 hour after the addition of 0.69 g of sodium nitrite. The stirred solution was additionally stirred for 30 minutes after the addition of 0.1 g of sulfamic acid, so as to prepare a diazonium salt solution.

Example 1-3: Synthesis of Stilbene-Based Diazonium Salt Solution 5.6 g of 4,4'-diaminostilbene-dihydrochloride was added to 200 ml of a 0.6 M aqueous hydrochloric acid solution, and the mixed solution was stirred at room temperature for 20 minutes. The stirred solution was cooled to 0° C. to 5° C., and was further stirred after 1 hour after the addition of 2.76 g of sodium nitrite. The stirred solution was additionally stirred for 30 minutes after the addition of 0.2 g of sulfamic acid, so as to prepare a diazonium salt solution.

Example 1-4: Synthesis of Terphenyl-Based Diazonium Salt Solution 0.52 g of 4,4'-diamino-terphenyl was added to 20 ml of a 1.5 M aqueous hydrochloric acid solution, and the mixed solution was stirred at room temperature for 20 minutes. The stirred solution was cooled to 0° C. to 5° C., and was further stirred after 1 hour after the addition of 0.28 g of sodium nitrite. The stirred solution was additionally stirred for 30 minutes after the addition of 0.1 g of sulfamic acid, so as to prepare a diazonium salt solution.

Example 2: Synthesis of Piperazine-Based Dye Compound

Example 2-1: Synthesis of Compound A124

3.00 g of butyl phenyl ether was dissolved in 50 ml of ethanol, and then 150 ml of water was added thereto to prepare a coupling solution. The pH of the coupling solution was adjusted to 7 to 8, the coupling solution was cooled to 0° C. to 5° C., and then the diazonium salt solution prepared in Example 1-1 was slowly dripped to form a reaction mixture. The reaction mixture was stirred for 2 hours while maintaining the pH of the reaction mixture at 7 to 8 and maintaining the temperature thereof at 0° C. to 5° C. to form a precipitate, and then the precipitate was filtered to obtain compound A124.

Example 2-2: Synthesis of Compound A132

3.31 g of 3-diethylamiophenol was dissolved in 50 ml of ethanol, and then 100 ml of water was added thereto to prepare a coupling solution. The pH of the coupling solution was adjusted to 6 to 7, the coupling solution was cooled to 0° C. to 5° C., and then the diazonium salt solution prepared in Example 1-1 was slowly dripped to form a reaction mixture. The reaction mixture was stirred for 2 hours while maintaining the pH of the reaction mixture at 5 to 6 and maintaining the temperature thereof at 0° C. to 5° C. to form a precipitate, and then the precipitate was filtered to obtain compound A132.

Example 2-3: Synthesis of Compound A133

3.27 g of N-butyl-N-methylaniline was dissolved in 100 ml of ethanol, and then 150 ml of water was added thereto to prepare a coupling solution. The pH of the coupling solution was adjusted to 6 to 7, the coupling solution was cooled to 0° C. to 5° C., and then the diazonium salt solution prepared in Example 1-1 was slowly dripped to form a reaction mixture. The reaction mixture was stirred for 2 hours while maintaining the pH of the reaction mixture at 6 to 7 and maintaining the temperature thereof at 0° C. to 5° C. to form a precipitate, and then the precipitate was filtered to obtain compound A133.

Example 2-4: Synthesis of Compound A138

4.07 g of N-ethyl-meta-methacrylotoluidide was dissolved in 50 ml of acetone, and then 50 ml of water was added thereto to prepare a coupling solution. The pH of the coupling solution was adjusted to 6 to 7, the coupling solution was cooled to 0° C. to 5° C., and then the diazonium salt solution prepared in Example 1-1 was slowly dripped to form a reaction mixture. The reaction mixture was stirred for 2 hours while maintaining the pH of the reaction mixture at 6 to 7 and maintaining the temperature thereof at 0° C. to 5° C. to form a precipitate, and then the precipitate was filtered to obtain compound A138.

Example 3: Synthesis of Bithiazole-Based Dye Compound

Example 3-1: Synthesis of Compound B117

1.63 g of N-butyl-N-methylaniline was dissolved in 50 ml of ethanol, and then 50 ml of water was added thereto to prepare a coupling solution. The pH of the coupling solution was adjusted to 6 to 7, the coupling solution was cooled to 0° C. to 5° C., and then the diazonium salt solution prepared in Example 1-2 was slowly dripped to form a reaction mixture. The reaction mixture was stirred for 2 hours while maintaining the pH of the reaction mixture at 6 to 7 and maintaining the temperature thereof at 0° C. to 5° C. to form a precipitate, and then the precipitate was filtered to obtain compound B117.

Example 3-2: Synthesis of Compound B123

1.65 g of 3-diethylaminophenol was dissolved in 20 ml of ethanol, and then 50 ml of water was added thereto to prepare a coupling solution. The pH of the coupling solution was adjusted to 5 to 6, the coupling solution was cooled to 0° C. to 5° C., and then the diazonium salt solution prepared in Example 1-2 was slowly dripped to form a reaction mixture. The reaction mixture was stirred for 2 hours while maintaining the pH of the reaction mixture at 5 to 6 and maintaining the temperature thereof at 0° C. to 5° C. to form a precipitate, and then the precipitate was filtered to obtain compound B123.

Example 3-3: Synthesis of Compound B115

1.47 g of N-allyl-N-methylaniline was dissolved in 50 ml of acetone, and then 50 ml of water was added thereto to prepare a coupling solution. The pH of the coupling solution was adjusted to 5 to 6, the coupling solution was cooled to 0° C. to 5° C., and then the diazonium salt solution prepared in Example 1-2 was slowly dripped to form a reaction mixture. The reaction mixture was stirred for 2 hours while maintaining the pH of the reaction mixture at 5 to 6 and maintaining the temperature thereof at 0° C. to 5° C. to form a precipitate, and then the precipitate was filtered to obtain compound B115.

Example 4: Synthesis of Stilbene-Based Dye Compound

Example 4-1: Synthesis of Compound C103

6.01 g of butyl phenyl ether was dissolved in 50 ml of ethanol, and then 150 ml of water was added thereto to prepare a coupling solution. The pH of the coupling solution was adjusted to 7 to 8, the coupling solution was cooled to 0° C. to 5° C., and then the diazonium salt solution prepared in Example 1-3 was slowly dripped to form a reaction mixture. The reaction mixture was stirred for 2 hours while maintaining the pH of the reaction mixture at 7 to 8 and maintaining the temperature thereof at 0° C. to 5° C. to form a precipitate, and then the precipitate was filtered to obtain compound C103.

Example 5: Synthesis of Terphenyl-Based Dye Compound

Example 5-1: Synthesis of Compound D110

0.38 g of aniline was dissolved in 30 ml of a 0.1 M aqueous hydrochloric acid solution to prepare a coupling solution. The coupling solution was cooled to 0° C. to 5° C., the diazonium salt solution prepared in Example 1-4 was slowly dripped to form a reaction mixture, and then the pH of the reaction mixture was slowly adjusted to 4 to 5 not to increase temperature. The reaction mixture was stirred for 2 hours to form a precipitate, and then the precipitate was filtered to obtain compound D110.

Experimental Example

The maximum absorption wavelength bands of the compounds prepared in Examples 2 and 3 and the absorbance and whether having lipid solubility of the compounds in the maximum absorption wavelength bands were measured, and the results thereof are shown in Table 1 below. The maximum absorption wavelength bands and absorbance were measured using Shimadzu UV-1800 UV-vis. Spectrophotometer. Whether having lipid solubility was determined to be lipid soluble when the solubility of the compounds in MEK, PGMEA, cyclo-hexanone, or toluene was 1 wt % or more.

TABLE 1

| | Maximum absorption wavelength band (nm) | Absorbance | Whether having lipid solubility |
|---|---|---|---|
| Compound A124 | 500-600 | 30,000 | o |
| Compound A132 | 500-600 | 36,000 | o |
| Compound A133 | 500-600 | 35,000 | o |
| Compound A138 | 500-600 | 32,000 | o |
| Compound B117 | 600- | 41,000 | o |
| Compound B123 | 600- | 44,000 | o |
| Compound B127 | 600- | 41,000 | o |
| Compound C103 | 400-500 | 38,000 | o |
| Compound D110 | 500-600 | 40,000 | o |

Hereinafter, a polarizing element according to embodiments will be described with reference to the attached drawings. However, a redundant description of the substituents of Formulae denoted by the same Formulae as the above-mentioned Formulae is omitted, which will be apparent to those skilled in the art.

Figure 2:
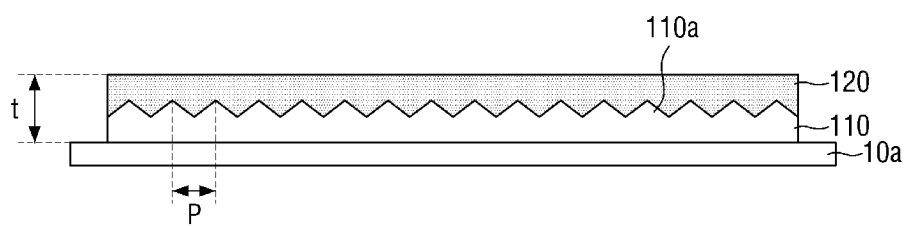
FIG. 2 is a cross-sectional view taken along the line II-II' of FIG. 1.

FIG. 1 is an exploded perspective view of a polarizing element according to an embodiment. FIG. 2 is a cross-sectional view taken along the line II-II' of FIG. 1.

Referring to FIGS. 1 and 2, the polarizing element 10 according to this embodiment may include a substrate 10a, a dye alignment layer 110, and a polarizing layer 120.

The substrate 10a provides a space in which the dye alignment layer 110 and the polarizing layer 120 can be disposed, and supports the dye alignment layer 110 and the polarizing layer 120. For example, the substrate 10a may be a light-transmitting substrate such as a synthetic resin substrate or a glass substrate. As another example, the substrate 10a may be a thin film such as an overcoat layer or an insulating layer, which is made of an organic material and/or an inorganic material. That is, the polarizing element 10 according to this embodiment may be provided in the form of a polarizing plate or a polarizing film including a separate substrate 10a, or may be disposed directly on a display device in the form of a coating layer to be integrated with a display panel.

The dye alignment layer 110 may be disposed on the substrate 10a. The dye alignment layer 110 may induce the alignment of a dye compound in the polarizing layer 120 provided thereon. For example, the dye alignment layer 110 may induce the alignment of a liquid crystalline compound in a coating composition for forming the polarizing layer 120 (for example, the composition according to the present invention). According to the alignment of the liquid crystalline compound, a dye compound having excellent physical/chemical affinity for the liquid crystalline compound may also be aligned with the same directionality as the liquid crystalline compound.

One side (upper side in the drawing) of the dye alignment layer 110, facing the polarizing layer to be described later, may have a surface shape having alignment anisotropy. For example, the alignment anisotropy may be a physical anisotropy. In an exemplary embodiment, one side (upper side in the drawing) of the dye alignment layer 110 may include a plurality of linear protrusion patterns 110a extended in a first direction X and repeated in a second direction Y intersecting the first direction X. Although FIG. 2 illustrates a case where the sectional shape of the protrusion pattern 110a is approximately triangular because the protrusion pattern 110a has inclined side walls and a peak formed by two side walls in the section taken in the second direction Y, in another embodiment, the sectional shape of the protrusion pattern 110a may be approximately rectangular because the side wall of the protrusion pattern 110a is perpendicular to the surface of the substrate 10a and the upper surface of the protrusion pattern 110a has a predetermined area. The protrusion patterns 110a of the dye alignment layer 110 may be formed by a patterning method such as nano-imprinting.

The pitch P of the protrusion patterns 110a may be about 700 nanometers (nm) or less, about 500 nm or less, or about 100 nm or less. The pitch P of the protrusion patterns 110a means a distance from the peak of a protrusion pattern 110a to the peak of the next protrusion pattern 110a among the plurality of protrusion patterns 110a repeatedly disposed along the second direction Y. When the pitch P of the protrusion patterns 110a is 700 nm or less, self-alignment of the liquid crystalline compound and the dye compound in the polarizing layer 120, to be described later, can be induced.

The material of the dye alignment layer 110 having the protrusion patterns 110a is not particularly limited as long as it is a material having excellent adhesiveness to the coating composition for forming the polarizing layer 120. For example, the dye alignment layer may be made of a metal layer such as aluminum or copper or a synthetic resin material such as polyvinyl alcohol, polyimide, polyamide, cyclo polyolefin, an epoxy resin, or a phenol resin.

The polarizing layer 120 may be disposed directly on the dye alignment layer 110. The polarizing layer 120 may contain a dichroic dye compound to have polarization ability. The polarizing layer 120 may transmit a polarized component vibrating in a direction parallel to the transmission axis, and may absorb a polarized component vibrating in a direction parallel to the absorption axis. Thus, unpolarized incident light applied to the polarizing layer 120 can be converted into light having a specific polarization state. In this specification, the "unpolarized light" means light not composed of only the polarization component in a specific direction, that is, light not polarized only in a specific direction, in other words, light composed of a randomized polarization component. The sum t of the thicknesses of the dye alignment layer 110 and the thickness of the polarizing layer 120 may be about 10 µm or less.

The polarizing layer 120 may be formed by applying and polymerizing the aforementioned composition according to any embodiment. The application method is not particularly limited, but examples thereof may include slit coating and spin coating.

The polarizing layer 120 may contain at least one dye compound. In an exemplary embodiment, the at least one dye compound may include at least one of dye compounds represented by Formula 1.

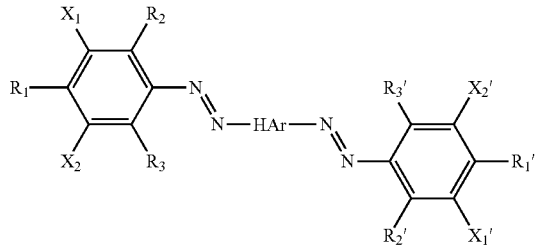

Formula 1

The dye compound represented by Formula 1 may be a dye compound represented by Formula A-1 or Formula B-1.

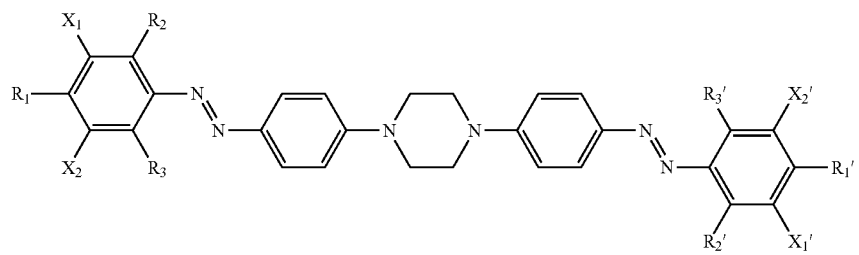

Formula A-1

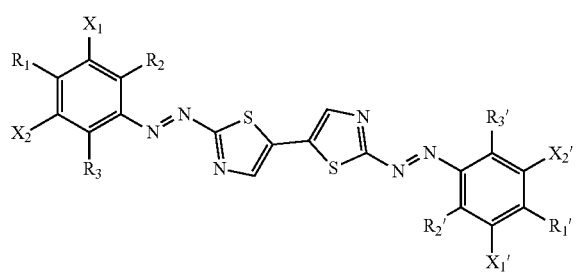

Formula B-1

The exemplary kinds of the dye compound having a more specified mother basic skeleton structure, represented by Formula A-1 or Formula B-1, have been described through Formulae A-2 and A-3 and compounds A101 to A142, and Formulae B-2 and B-3 and compound B101 to B134, and thus a detailed description thereof will be omitted.

In some embodiments, at least one dye compound of the polarizing layer 120 may further include at least one of a dye compound represented by Formula C-1, a dye compound represented by Formula D-1, and a dye compound represented by Formula E-1.

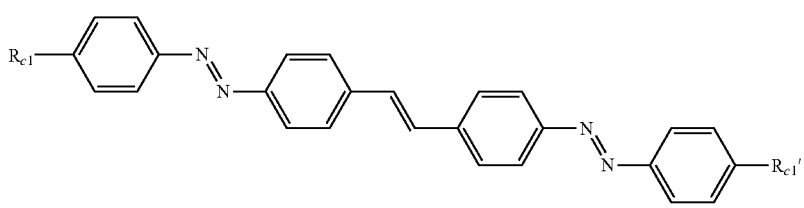

Formula C-1

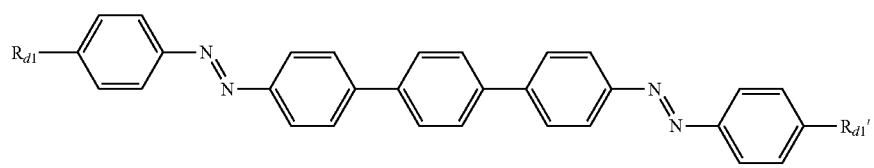

Formula D-1

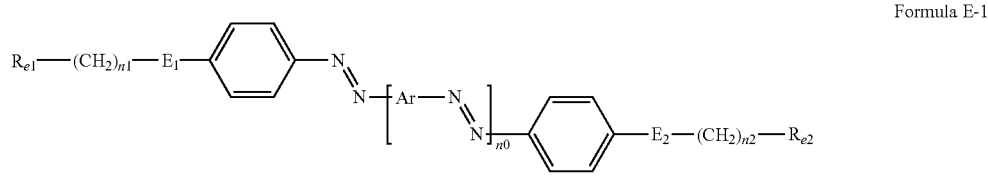

Formula E-1

In some embodiments, the polarizing layer 120 may further include at least one polymer of a reactive-liquid crystalline compound. The reactive-liquid crystalline compound may be a liquid crystalline compound having a structure represented by Formula F-1.

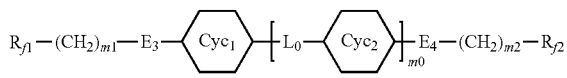

Formula F-1

In an exemplary example, the polarizing layer 120 may include both the dye compound represented by Formula A-1 and the dye compound represented by Formula B-2 as dye compounds. In some embodiments, the polarizing layer 120 may further include the dye compound represented by Formula C-2 and/or the dye compound represented by Formula D-2 as a dye compound. In some embodiments, the polarizing layer 120 may further include the dye compound represented by Formula B-3 and/or the dye compound represented by Formula B-4 as a dye compound. In some embodiments, the polarizing layer 120 may further include the dye compound represented by Formula E-1 as a dye compound. In some embodiments, the polarizing layer 120 may further include the polymer of the reactive-liquid crystalline compound having a smectic B phase represented by Formula F-1.

In another exemplary embodiment, the polarizing layer 120 may include the dye compound represented by Formula B-1 as a dye compound. In some embodiments, the polarizing layer 120 may further include the dye compound represented by Formula C-3 and/or the dye compound represented by Formula D-3 as a dye compound. In some embodiments, the polarizing layer 120 may further include the dye compound represented by Formula C-2 and/or the dye compound represented by Formula D-2 as a dye compound. In some embodiments, the polarizing layer 120 may further include the dye compound represented by Formula E-1 as a dye compound. In some embodiments, the polarizing layer 120 may further include the polymer of the reactive-liquid crystalline compound having a smectic B phase represented by Formula F-1.

Figure 3:
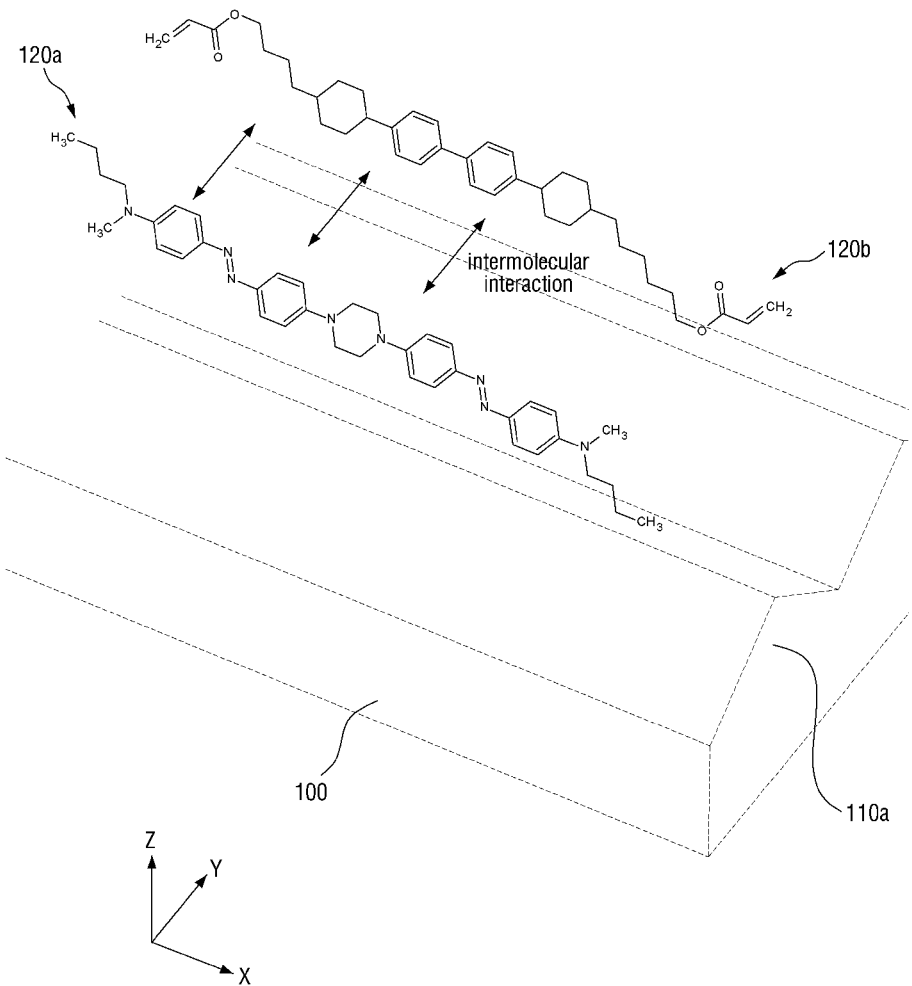
FIG. 3 is a schematic view showing the alignment of a dye compound and a liquid crystalline compound in the polarizing layer of FIG. 1.

Next, the alignment state of the dye compound and the liquid crystalline compound in the polarizing layer 120 according to this embodiment will be described in detail with reference to FIG. 3. FIG. 3 is a schematic view showing the alignment state of the dye compound and the liquid crystalline compound in the polarizing layer of FIG. 1.

Referring to FIGS. 1 to 3, the major axes of the reactive-liquid crystalline compound (or a polymer thereof) 120b and the dye compound 120a in the polarizing layer 120 may be aligned in a direction substantially parallel to the extending direction (that is, first direction X) of the protrusion pattern 110a of the dye alignment layer 110. For example, the major axis of the reactive-liquid crystalline compound 120b, which is a host material having a smectic B phase exhibiting excellent directional order degree, may be aligned in the first direction X by the protrusion pattern 110a. Although not shown in the drawing, the reactive-liquid crystalline compound in the polymerized state also has a major axis of a mesogen mother basic skeleton, aligned in the first direction (X), so that the state thereof can be stably maintained. Further, the alignment of the dye compound 120a having chemical and/or geometrical affinity to the liquid crystalline 120b in the first direction X can be induced by the liquid crystalline compound 120b. FIG. 3 illustrates a case where the aforementioned compound A133 is used as the dye compound 120a and the aforementioned compound F110 is used as the reactive-liquid crystalline compound 120b, but the present invention is not limited thereto.

The dye compound aligned in the first direction X may define the transmission axis and absorption axis of the polarizing element 10. In an exemplary embodiment where the dye compound contained in the polarizing layer 120 is a positive dichroic dye, the absorption axis of the polarizing layer 120 may be aligned in a direction approximately parallel to the first direction X, and the transmission axis thereof may be aligned in a direction approximately parallel to the second direction Y.

The polarizing element 10 according to this embodiment may have excellent polarization degree even without complicated processes such as stretching/pressure processes, may be provided in the form of a polarizing plate or a polarizing film by including a separate substrate, or may be integrated with a display panel of a display device by providing the dye alignment layer 110 and the polarizing layer 120 in the form of a coating layer during a process of manufacturing a display device.

Further, since the dye compound according to the present invention has high linearity and an excellent dichroic ratio, the polarizing layer 120 having sufficient polarization degree can be formed even by a non-stretching process. Further, since the dye compound itself has high physical/chemical stability, it is possible to minimize the problem that the polarization characteristics are deteriorated by heat or moisture.

Further, the present invention is not limited thereto. For example, when the affinity between the aforementioned dye compound represented by Formula C-1, the aforementioned dye compound represented by Formula D-1 and/or the aforementioned dye compound represented by Formula E-1 and the liquid crystalline compound is insufficient, the dispersion characteristics of the dye compounds in the liquid crystalline compound constituting a host material can be improved by using excellent affinity between the dye compound represented by Formula 1 and the liquid crystalline compound (for example, the compound represented by Formula F-1) and affinity between the dye compound represented by Formula 1 and other dye compounds (for example, the compounds represented by Formula C-1, Formula D-1, and/or Formula E-1).

Hereinafter, a polarizing element according to another embodiment of the present invention will be described.

Figure 4:
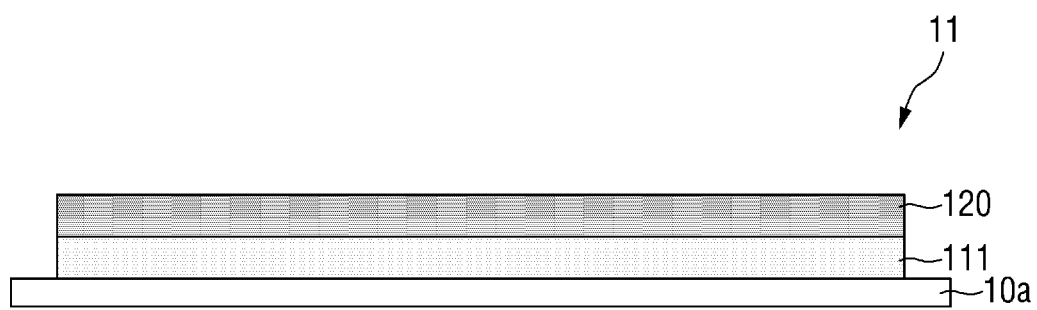
FIG. 4 is a cross-sectional view of a polarizing element according to another embodiment.

FIG. 4 is a cross-sectional view of a polarizing element according to another embodiment of the present invention.

Referring to FIG. 4, the polarizing element 11 according to this embodiment is different from the polarizing element 10 according to the embodiment of FIG. 1 in that a dye alignment layer 111 is made of an organic material, and alignment anisotropy is imparted to the dye alignment layer 111 through rubbing alignment treatment or photo alignment treatment.

In an exemplary embodiment, the dye alignment layer 111 may be an alignment film having a photoreactive group in a repetition unit. The alignment film may be a polymer film containing polyamic acid having a photoreactive group in a repetition unit, a polymer obtained by partially imidizing the polyamic acid having a photoreactive group in a repetition unit, or a polyimide obtained by cyclodehydrating the polyamic acid having a photoreactive group in a repetition unit, as a copolymer of a dianhydride compound and a diamine compound. The photoreactive group can be isomerized or decomposed by reacting with light. The dye alignment layer 111 may be formed by applying a composition including the polymer material, irradiating the composition with polarized light to impart alignment ability to the composition, and then curing the composition.

In this case, one side (upper side in the drawing) of the alignment layer 111, facing the polarizing layer 120, may be imparted with alignment anisotropy through the anisotropy exhibited by the main chain of a polymer chain in the dye alignment layer 111, even though protrusion patterns having a size of a micron level are not formed.

Thus, the major axes of the polymer of the reactive-liquid crystalline compound and the dye compound in the polarizing layer 120 may be aligned in one direction. For example, the major axes of the polymer of the reactive-liquid crystalline compound and the dye compound may be approximately parallel to the surface of the substrate 10a, and may be aligned toward the one direction. The dye compound aligned in the one direction may define the transmission axis and absorption axis of the polarizing element 11.

Hereinafter, display devices according to embodiments of the present invention will be described.

Figure 5:
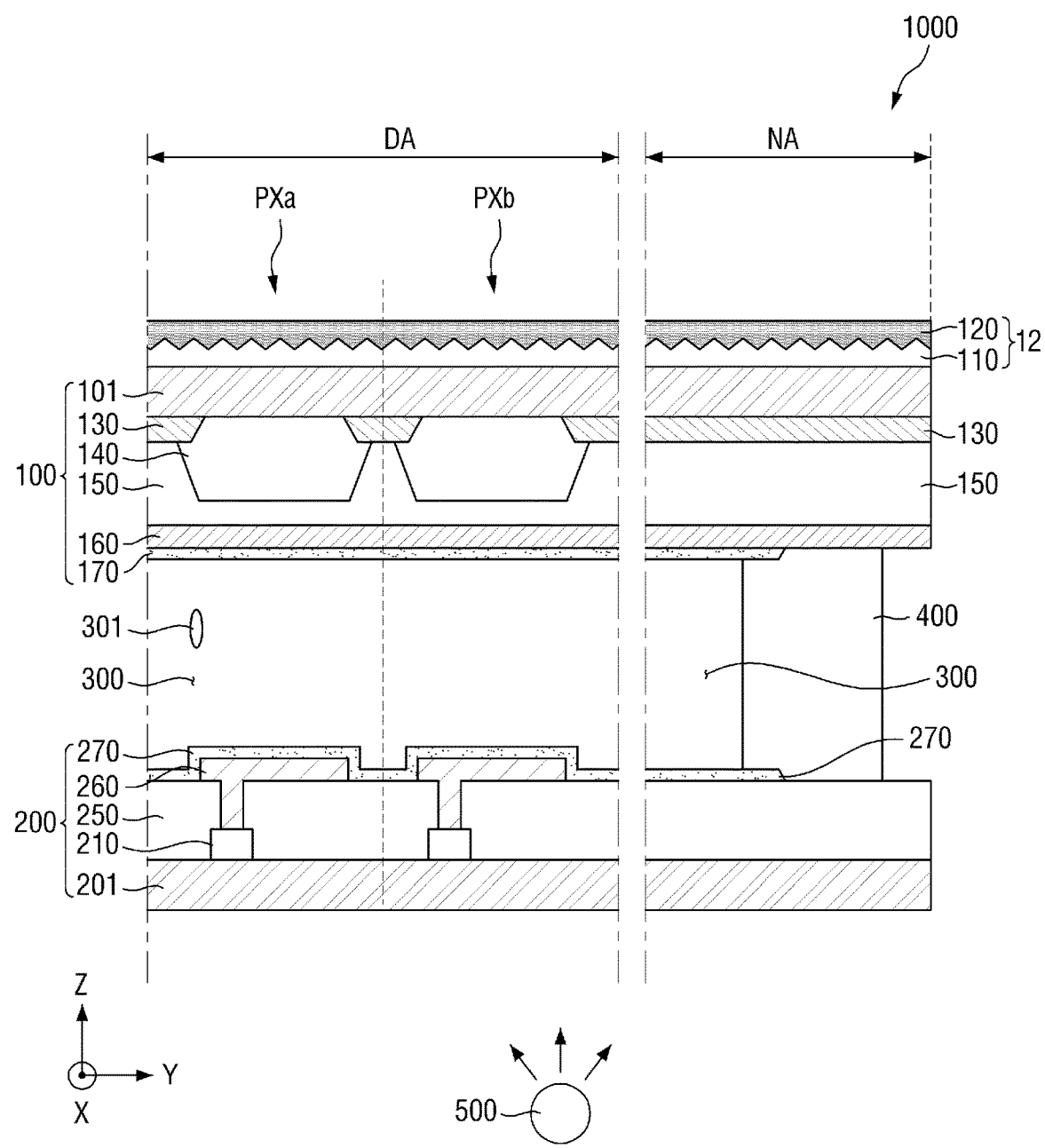
FIG. 5 is a cross-sectional view of a display device according to an embodiment.

FIG. 5 is a cross-sectional view of a display device according to an embodiment of the present invention.

Referring to FIG. 5, the display device 1000 according to this embodiment may include a light source 500 and a display panel disposed over the light source 500, and may further include a polarizing element 12 disposed on the display panel.

A display area DA and a non-display area NA located around the display area DA may be defined in the display panel. The display area DA is an area contributing to image display, and the non-display area is an area not contributing to image display.

A plurality of pixels PXa and PXb arranged in a substantially matrix form in a plane may be defined in the display area DA. In this specification, the term "pixel" means a single area in which the display area DA is divided and defined for color display at a plan view, and one pixel may be a minimum unit that expresses another color capable of being distinguished from other pixels. That is, each of the pixels PXa and PXb can uniquely express one of basic colors in order to implement color display. Examples of the basic colors include red, green, and blue.

The display panel may include a first display substrate 100, a second display substrate 200 spaced apart from the first display substrate 100 and facing the first display substrate 100, a liquid crystal layer 300 interposed between the first display substrate 100 and the second display substrate 200, and a sealing member 400 sealing the liquid crystal layer 300 by attaching the first display substrate 100 and the second display substrate 200.

The first display substrate 100 may be an upper substrate located at a side opposite to the light source 500 with respect to the liquid crystal layer 300. The first display substrate 100 may include a first base substrate 101 and a color control pattern layer 140, and may further include a common electrode 160.

The first base substrate 101 may be a transparent insulating layer. For example, the first base substrate 101 may be made of a glass material, a quartz material, or a light-transmitting plastic material. In some embodiments, the first base substrate 101 may have flexibility, and the display device 1000 may be a curved display device. The first base substrate 101 may have one side (lower side in the drawing) facing the second display substrate 200 and the other side (upper side in the drawing).

A light-blocking member 130 may be disposed on one side (lower side in the drawing) of the first base substrate 101. In the display area DA, the light-blocking member 130 is disposed at the boundary between adjacent pixels PXa and PXb in an approximately rectangular grid form on a plane. The light-blocking member 130 may block the transmission of light to prevent the defective color mixing between the adjacent pixels. Further, the light-blocking member 130 may be disposed in the non-display area NA to prevent the light provided from the light source 500 from transmitting the non-display area NA of the display panel.

The color control pattern layer 140 may be disposed on the light-blocking member 130. The color control pattern layer 140 may convert the color of transmitted light into a color different from that of incident light. That is, the light after passing through the color control pattern layer 140 can be converted into light of a specific wavelength band. The color control pattern layer 140 expressing a different color for each pixel may be disposed within a light path from the light source 500 to a viewer (not shown) to allow the respective pixels PXa and PXb to express different colors from each other. In an exemplary embodiment, the color control pattern layer 140 may be a wavelength shift pattern layer containing a material shifting the peak wavelength of incident light to a specific peak wavelength, for example, a quantum dot material or a phosphor material. In another exemplary embodiment, the color control pattern layer 140 may be a color filter that transmits light of a specific wavelength band of incident light and absorbs light of another specific wavelength band thereof to selectively transmit only light of a certain wavelength band.

An overcoating layer 150 may be disposed on the color control pattern layer 140. The overcoating layer 150 may planarize the components stacked on the first base substrate 101 by compensating for the unevenness of these components. The overcoating layer 150 may be made of an organic material. The overcoating layer 150 may be disposed without distinction of the pixels PXa and PXb.

A common electrode 160 may be disposed on the overcoating layer 150. The common electrode 160 may be disposed without distinction of the pixels PXa and PXb, and a common voltage is applied to the common electrode 160. The common electrode 160 may control the arrangement of liquid crystals 301 in the corresponding pixel by forming an electric field in the liquid crystal layer 300 together with a pixel electrode 260 to be described later. The common electrode 160 may be a transparent electrode made of a transparent conductive material. Examples of the material for forming the transparent electrode include ITO (indium tin oxide) and IZO (indium zinc oxide). In some embodiments, the common electrode 160 may be disposed over the display area DA and the non-display area NA.

A first liquid crystal alignment layer 170 may be disposed on the common electrode 160. The first liquid crystal alignment layer 170 can induce the initial alignment of liquid crystals 301 in the adjacent liquid crystal layer 300. In this specification, the term "initial alignment of liquid crystals" refers to the arrangement of liquid crystals in a state in which no electric field is formed in the liquid crystal layer. The first liquid crystal alignment layer 170 may be made of a polymer having an imide group in the repetition unit of a main chain, that is, a polyimide-based material. The first liquid crystal alignment layer 170 may be partially located in the non-display area NA. In this case, the first liquid crystal alignment layer 170 may be in contact with the sealing member 400, but the present invention is not limited thereto.

Next, the second display substrate 200 will be described. The second display substrate 200 may be a lower substrate located at a side of the light source 500 with respect to the liquid crystal layer 300. The second display substrate 200 may include a second base substrate 201 and a switching element 210, and may further include a pixel electrode 260.

The second base substrate 201, similarly to the first base substrate 101, may be a transparent insulating substrate. The second base substrate 201 may include one side (upper side in the drawing) facing the first display substrate 100 and the other side (lower side in the drawing).

Switching elements 210 may be disposed on one side (upper side in the drawing) of the second base substrate 201. The switching elements 210 may be disposed for each of the pixels PXa and PXb, and may transmit or block a driving signal to a pixel electrode to be described later. In an exemplary embodiment, each of the switching elements 210 may be a bottom type transistor including a gate electrode, an active layer disposed on the gate electrode, and source and drain electrodes spaced apart from each other on the active layer. The active layer may contain amorphous silicon or an oxide semiconductor.

An intermediate layer 250 may be disposed on the switching element 210. The intermediate layer 250 may electrically insulate an upper structure thereon and a lower structure thereunder from each other, and may planarize the components stacked on the second base substrate 201 by compensating for the unevenness of these components. The intermediate layer 250 may include one or more layers. For example, the intermediate layer 250 may be a laminated structure including a layer made of an organic material and a layer made of an inorganic material. Examples of the inorganic material include silicon nitride ($SiN_x$), silicon oxide ($SiO_x$), silicon nitroxide ($SiN_xO_y$, x>y), and silicon oxynitride ($SiO_xN_y$, x>y).

A pixel electrode 260 may be disposed on the intermediate layer 250. The pixel electrode 260 may be disposed for each of the pixels PXa and PXb, and thus driving signals independent from each other may be applied to the pixel electrode 260. The pixel electrode 260 may control the arrangement of liquid crystals 301 in the corresponding pixel by forming an electric field in the liquid crystal layer 300 together with the common electrode 160. The pixel electrode 260, similarly to the common electrode 160, may be a transparent electrode made of a transparent conductive material. The pixel electrode 260 may be electrically connected to the drain electrode of the switching element 210 through a contact hole formed in the intermediate layer 250. Although not shown in the drawing, the pixel electrode 260 may have a fine slit.

A second liquid crystal alignment layer 270 may be disposed on the pixel electrode 260. The second liquid crystal alignment layer 270 can induce the initial alignment of liquid crystals 301 in the adjacent liquid crystal layer 300. The second liquid crystal alignment layer 270, similarly to the first liquid crystal alignment layer 170, may be made of a polyimide-based material. The second liquid crystal alignment layer 270 may be partially located in the non-display area NA. In this case, the second liquid crystal alignment layer 270 may be in contact with the sealing member 400, but the present invention is not limited thereto.

Next, the liquid crystal layer 300 will be described. The liquid crystal layer 300 includes a plurality of initially aligned liquid crystals 301. In an exemplary embodiment, the liquid crystal 301 has negative dielectric anisotropy, and its major axis may be vertically aligned in the initial alignment state. In this case, the first liquid crystal alignment layer 170 and the second liquid crystal alignment layer 270 may be vertical alignment-inducing layers each having a vertical alignment group together with an imide group in the repetition unit. When an electric field is formed between the pixel electrode 260 and the common electrode 160, the liquid crystals 301 may be tilted or rotated in a specific direction to change the polarization state of light passing through the liquid crystal layer 300. In another exemplary embodiment, the liquid crystal 301 has positive dielectric anisotropy, and its major axis may be horizontally aligned in the initial alignment state.

The sealing member 400 may be disposed in the non-display area NA to attach the first display substrate 100 and the second display substrate 200 together. The sealing member 400 may be disposed in an approximately rectangular band shape in a plan view to seal the liquid crystal layer 300 disposed in the inner space thereof. The sealing member 400 may be, for example, a sealant. The sealing member 400 may be combined with the first display substrate 100 and the second display substrate 200 to prevent the leakage of the liquid crystals 301 and prevent moisture or impurities from penetrating from the outside. Although FIG. 5 illustrates a case where the sealing member 400 is in contact with the first liquid crystal alignment layer 170 and the common electrode 160 of the first display substrate 100 and is in contact with the intermediate layer 250 and the second liquid crystal alignment layer 270 of the second display substrate 200, the present invention is not limited thereto. The sealing member 400 may also seal the liquid crystal layer 300 in a different form from that shown in the drawing.

The light source 500 may be disposed under the display panel. Specifically, the light source 500 may be disposed over the other side (lower side in the drawing) of the second base substrate 210 to provide light toward the display panel. In an exemplary embodiment where a wavelength shift pattern layer is used as the color control pattern layer 140, the light source 500 may provide blue light having a peak wavelength in the range of about 430 nm to 470 nm, or may provide light of an ultraviolet wavelength band. In another exemplary embodiment where a color filter is used as the color control pattern layer 140, the light source 500 may provide white light, but the present invention is not limited thereto. Although not shown in the drawing, at least one optical sheet may be disposed between the display panel and the light source 500. The optical sheet may include at least one of a prism sheet, a diffusion sheet, a lenticular lens sheet, and a micro lens sheet. The optical sheet can improve the display quality of the display device 1000 by modulating the optical characteristics of the light provided from the light source 500 and traveling toward the display panel.

A polarizing element 12 may be disposed on the display panel. In an exemplary embodiment, the polarizing element 12 may be disposed on the other side (upper side in the drawing) of the first base substrate 101. In another embodiment, the polarizing element 12 may be disposed on the other side (lower side in the drawing) of the second base substrate 201. The polarizing element 12 may overlap the display area DA and the non-display area NA of the display panel.

The polarizing element 12 may include a dye alignment layer 110 and a polarizing layer 120. In an exemplary embodiment, the dye alignment layer 110 may be disposed directly on the first base substrate 101. The dye alignment layer 110 may induce the alignment of the dye compound in the polarizing layer 120.

One side (upper side in the drawing) of the dye alignment layer 110, facing the polarizing layer, may have a surface shape having alignment anisotropy. For example, the alignment anisotropy may be physical anisotropy. The one side of the dye alignment layer 110 may include a plurality of linear protrusion patterns 110a extended in the first direction X and repeated in the second direction Y. Since the dye alignment layer including the protrusion patterns 110a has been described with reference to FIG. 1 and the like, a detailed description thereof will be omitted. The dye alignment layer 110 may be formed by directly applying or depositing a material for forming a dye alignment layer and then patterning the applied or deposited material, but the present invention is not limited thereto.

The polarizing layer 120 may be disposed directly on the dye alignment layer 110. The polarizing layer 120 may contain a dichroic dye compound to have polarization ability. The polarizing layer 120 may be formed by directly applying, aligning and then polymerizing the aforementioned composition according to any embodiment. In this case, the polarizing layer 120 may be the same as the polarizing layer according to the embodiment of FIG. 1 and the like. For example, the polarizing layer 120 may contain at least one of dye compounds represented by Formula 1.

Formula 1

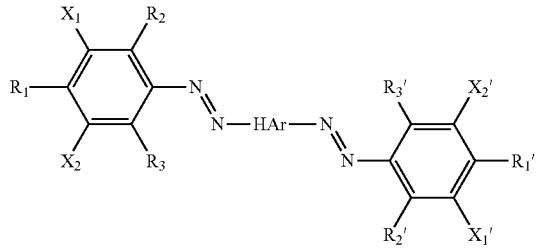

Since the structures of the mother basic skeleton of the dye compound having the structure represented by Formula 1 and the kinds of exemplary compounds have been described above, a detailed description thereof will be omitted.

In some embodiments, the polarizing layer 120 may further contain at least one of a dye compound represented by Formula C-1, a dye compound represented by Formula D-1, and a dye compound represented by Formula E-1.

Formula C-1

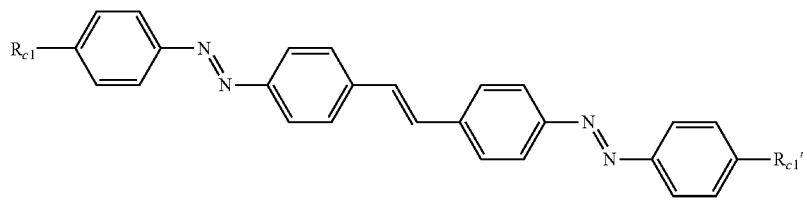

Formula D-1

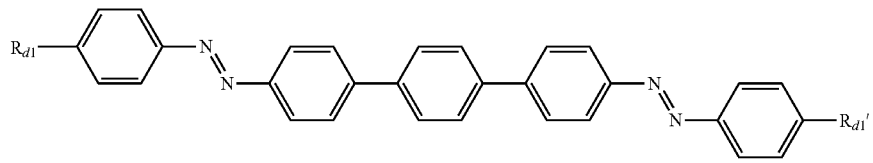

Formula E-1

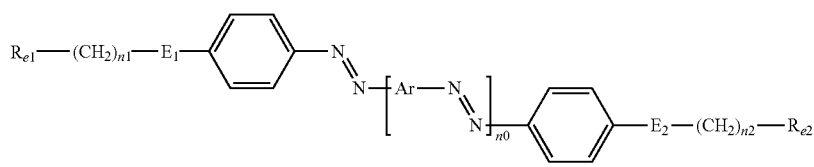

In some embodiments, the polarizing layer 120 may further contain at least one polymer of a reactive-liquid crystalline compound. The reactive-liquid crystalline compound may be a liquid crystalline compound having a structure represented by Formula F-1.

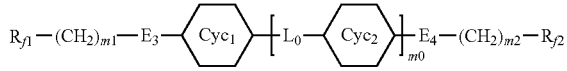

Formula F-1

The major axes of the aforementioned dye compounds in the polarizing layer 120 may be aligned in one direction. For example, the major axes of the dye compounds may be approximately parallel to the surface of the first base substrate 101, and may be aligned toward the first direction X. The alignment direction of the dye compounds may define the transmission axis and absorption axis of the polarizing element 12.

Since the dye alignment layer 110 and the polarizing layer 120 have been described in detail with reference to FIG. 1 and the like, a redundant description will be omitted.

The polarizing element 12 including the dye alignment layer 110 and the polarizing layer 120 may perform a shutter function of adjusting the amount of light provided from the light source 500 is together with the liquid crystal layer 300 and another polarizing element (not shown) disposed between the liquid crystal layer 300 and the light source 500. Thus, the display device 1000 can realize image display.

The display device 1000 according to this embodiment may include the polarizing element 12 integrated with the display panel. That is, the polarizing element 12 may be coupled with the first base substrate 101 of the display panel without interposing a separate adhesive layer or the like, so that the configuration of the polarizing element 12 can be simplified. In addition, the durability of the polarizing element 12 is improved, and thus the durability and reliability of the display device 1000 can be improved.

Hereinafter, display devices according to other embodiments of the present invention will be described.

Figure 6:
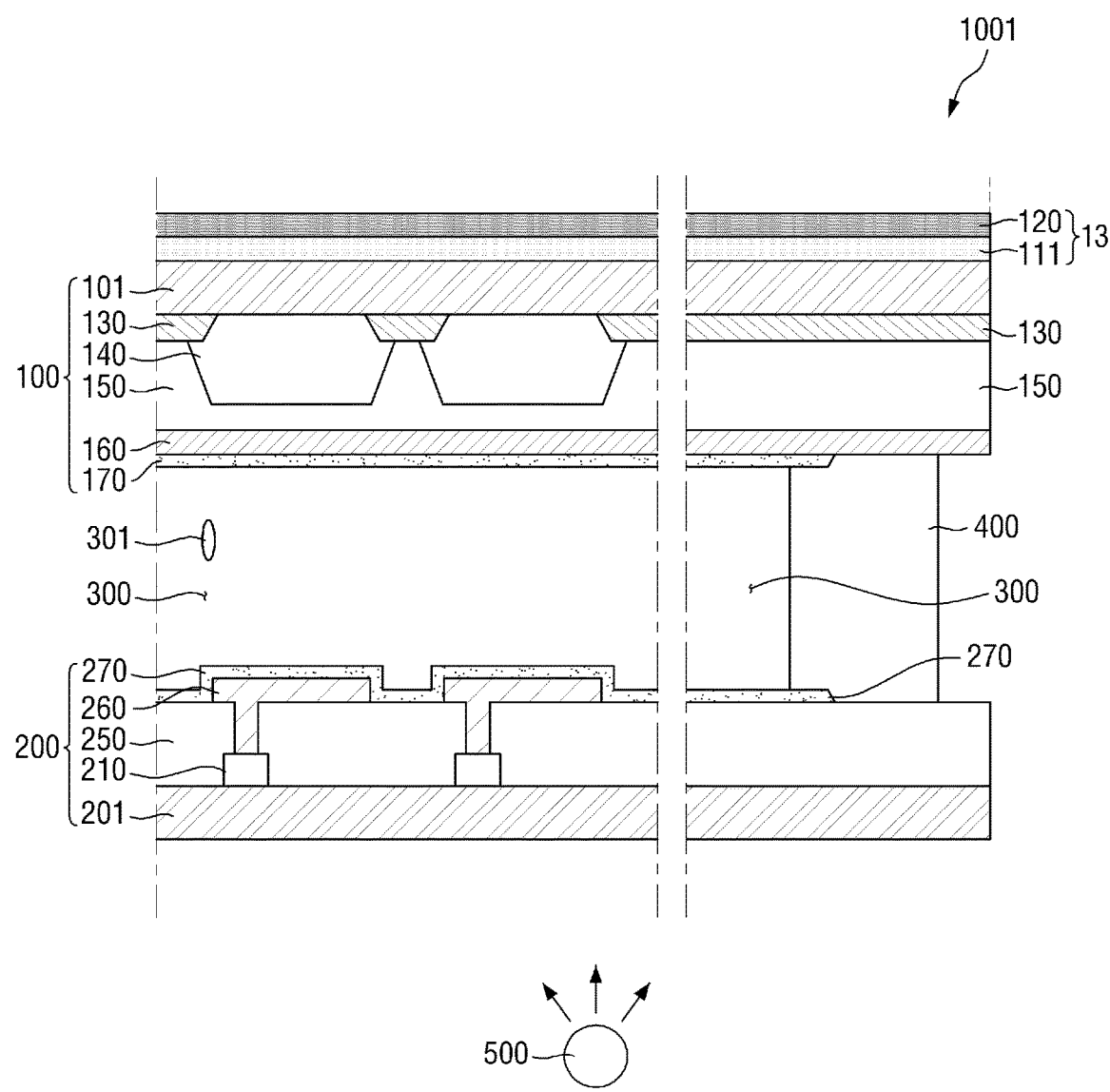
FIG. 6 is a cross-sectional view of a display device according to another embodiment.

FIG. 6 is a cross-sectional view of a display device according to another embodiment of the present invention.

Referring to FIG. 6, the display device 1001 according to this embodiment is different from the display device 1000 according to the embodiment of FIG. 5 in that the dye alignment layer according to the embodiment of FIG. 4 is applied to a polarizing element 13.

The polarizing element 13 may include a dye alignment layer 111 and a polarizing layer 120. In an exemplary embodiment, the dye alignment layer 111 may be disposed directly on the first base substrate 101. The dye alignment layer 111 can induce the alignment of the dye compound in the polarizing layer 120.

The dye alignment layer 111 may contain a polyimide-based material having a photoreactive group in the repetition unit. Since the dye alignment layer 111 containing a polyimide-based material has been described with reference to FIG. 4 and the like, a detailed description thereof will be omitted. The dye alignment layer 111 may be formed by directly applying a composition including a polyimide-based material onto the first base substrate 101 and then alignment-treating and curing the applied composition. The alignment treatment may include rubbing alignment treatment or photo alignment treatment, but the present invention is not limited thereto.

The major axes of the polymer of the reactive-liquid crystalline compound and the dye compound in the polarizing layer 120 may be aligned in one direction by the alignment anisotropy of the dye alignment layer 111. For example, the major axes of the polymer of the reactive-liquid crystalline compound and the dye compound may be approximately parallel to the surface of the first base substrate 101, and may be aligned toward the one direction. The dye compound aligned in the one direction may define the transmission axis and absorption axis of the polarizing element 13.

Figure 7:
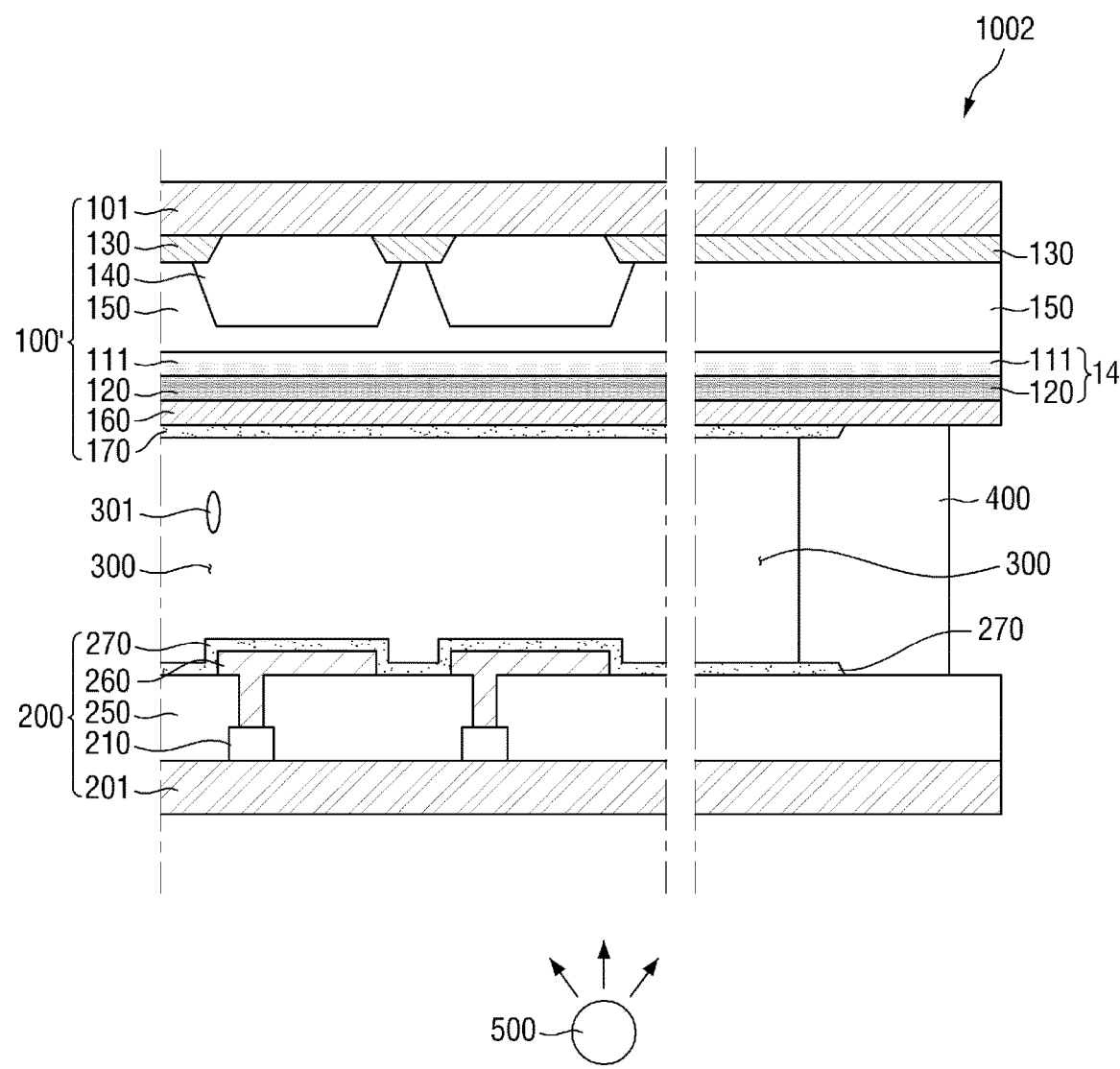
FIG. 7 is a cross-sectional view of a display device according to still another embodiment.

FIG. 7 is a cross-sectional view of a display device according to still another embodiment of the present invention.

Referring to FIG. 7, the display device 1002 according to this embodiment is different from the display device 1001 according to the embodiment of FIG. 6 in that a polarizing element 14 is disposed between the first base substrate 101 and the liquid crystal layer 300.

A first display substrate 100' may include a first base substrate 101, a color control pattern layer 140 disposed on side (lower side in the drawing) of the first base substrate 101, facing a second display substrate 200, an overcoating layer 150 disposed on the color control pattern layer 140, a common electrode 160 disposed on the overcoating layer 150, and a first liquid crystal alignment layer 170 disposed on the common electrode 160, and may further include a polarizing element 14 disposed between the overcoating layer 150 and the common electrode 160.

In an exemplary embodiment, the dye alignment layer 111 may be disposed directly on the overcoating layer 150. The dye alignment layer 111 may be formed by directly applying a composition including a polyimide-based material onto the overcoating layer 150 and then alignment-treating and curing the applied composition, but the present invention is not limited thereto. In another exemplary embodiment, this dye alignment layer 111 may be the dye alignment layer according to the embodiment of FIG. 1.

The polarizing layer 120 may be disposed directly on the dye alignment layer 111. The polarizing layer 120 may be formed by directly applying a composition for forming a polarizing layer onto the dye alignment layer 111 and then aligning and polymerizing the applied composition. The common electrode 160 may be disposed directly on the polarizing layer 120. Since the polarizing layer 120 has been described with reference to FIGS. 1 to 6, a detailed description thereof will be omitted.

The display device 1002 according to this embodiment may include the polarizing element 14 integrated with the display panel. Specifically, the polarizing element 14 may be disposed between the first base substrate 101 and the second base substrate 201 to suppress the denaturation of the polarizing element 14 due to moisture or heat. Thus, the deterioration of the polarization characteristics of the polarizing element 14 can be minimized, and the durability and reliability of the display device 1002 can be improved.

Figure 8:
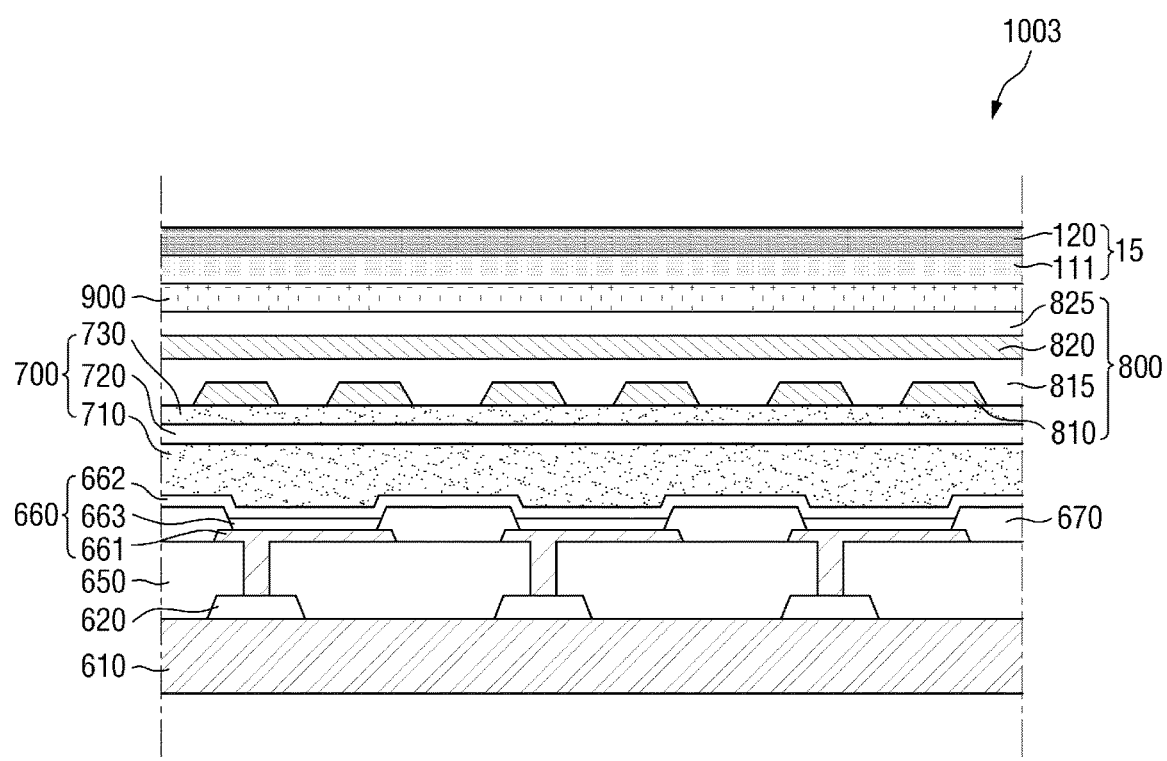
FIG. 8 is a cross-sectional view of a display device according to still another embodiment.

FIG. 8 is a cross-sectional view of a display device according to still another embodiment of the present invention.

Referring to FIG. 8, the display device 1003 according to this embodiment may include a base substrate 610, an organic light-emitting element 660 disposed over one side of the base substrate 610, and an encapsulation member 700 disposed on the organic light-emitting element 660 to seal the organic light-emitting element 660, and may further include a touch unit 800 disposed on the encapsulation member 700 and a polarizing element 15 disposed on the touch unit 800.

The base substrate 610 may be a transparent or opaque insulating substrate. For example, the base substrate 610 may be made of a glass material, a quartz material, or a flexible plastic material such as polyimide.

A driving element 620 may be disposed on the base substrate 610. The driving element 620 may be disposed for each pixel to control the flow of voltage or current for driving the organic light-emitting element 660 in a specific pixel. In an exemplary embodiment, the driving element 620 may be a top gate type transistor including an active layer having a source region, a drain region and a channel region, a gate electrode disposed on the channel region of the active layer, a source electrode electrically connected with the source region of the active layer, and a drain electrode electrically connected with the drain region of the active layer. The active layer may contain polycrystalline silicon or may contain monocrystalline silicon. The gate electrode may be electrically connected with an output terminal of a switching element (not shown) controlling ON/OFF of a specific pixel.

An intermediate layer 650 may be disposed on the driving element 620. The intermediate layer 650 may electrically insulate an upper structure thereon and a lower structure thereunder from each other, and may planarize the components stacked on the base substrate 610 by compensating for the unevenness of these components. The intermediate layer 650 may be made of an organic material. For example, the intermediate layer 650 may made of an organic material such as an acrylic resin, an epoxy resin, a polyimide resin, or a polyester resin.

The organic light-emitting element 660 may be disposed on the intermediate layer 650. The organic light-emitting elements 660 arranged for each of the plurality of pixels may emit light of different colors or emit light of the same color. The organic light-emitting element 660 may include a first electrode 661 disposed on the intermediate layer 650, an organic light-emitting layer 663 disposed on the first electrode 661, and a second electrode 662 disposed on the organic light-emitting layer 663.

The first electrode 661 may be an anode electrode having a relatively larger work function than the second electrode 662. The first electrode 661 may be a transparent electrode, an opaque electrode, or a laminated structure of a transparent electrode and an opaque electrode. Examples of the material for forming the transparent electrode may include indium tin oxide (ITO), indium zinc oxide (IZO), zinc oxide, and indium oxide, and examples of the material for forming the opaque electrode may include lithium (Li), aluminum (Al), magnesium (Mg), silver (Ag), nickel (Ni), and chromium (Cr). The first electrode 661 is disposed for each pixel, and driving signals independent from each other may be applied the first electrode 661. The first electrode 661 may be electrically connected to the drain electrode of the driving element 620 through a contact hole formed in the intermediate layer 650.

The second electrode 662 may be a cathode electrode having a relatively smaller work function than the first electrode 661. The second electrode 662 may drive the organic light-emitting element 660 together with the first electrode 661 facing the second electrode 662 with the organic light-emitting layer 663 therebetween. The second electrode 662, similarly to the first electrode 661, may be a transparent electrode, an opaque electrode, or a laminated structure of a transparent electrode and an opaque electrode. The second electrode 662 may be disposed substantially over the entire surface of the base substrate 610 without distinction of the pixels.

The organic light-emitting layer 663 may be interposed between the first electrode 661 and the second electrode 662. The organic light-emitting layer 663 may generate light by recombining holes and electrons transferred from the first electrode 661 and the second electrode 662. For example, the holes and the electrons are recombined to form excitons, and light may be emitted while the excitons are shifted from the excited state to the ground state.

Although not shown in the drawing, in some embodiments, the organic light-emitting element 660 may further include functional layers, such a hole injection layer and a hole transport layer interposed between the first electrode 661 and the organic light-emitting layer 663 and/or an electron injection layer and an electron transport layer interposed between the second electrode 662 and the organic light-emitting layer 663.

Meanwhile, a pixel defining film 670 may be disposed between the first electrode 661 and the intermediate layer 650. The pixel defining film 670 may serve to separate the pixels. The pixel defining film 670 may partially overlap the first electrode 661, and may be disposed to expose at least a part of the first electrode 661. That is, at the plan view, the pixel defining film 670 may be configured in the form of a substantially lattice having an opening exposing the first electrode 661. The aforementioned organic light-emitting layer 663 may be disposed in the opening. The pixel defining film may be made of an organic material such as a polyacrylic resin or a polyimide resin.

The encapsulation member 700 may be disposed on the organic light-emitting element 660. In an exemplary embodiment, the encapsulation member 700 may be a thin film sealing member. The encapsulation member 700 may be disposed to cover the organic light emitting element 660 to seal the organic light-emitting element 660. The encapsulation member 700 can prevent the organic light-emitting layer 663 from being denatured by the penetration of moisture and the like from the outside.

In an exemplary embodiment, the encapsulation member 700 may include one or more inorganic layers and one or more organic layers alternately arranged with respect to one another. For example, the encapsulation member 700 may have a three-layer laminated structure including a first inorganic encapsulation layer 710 disposed on the second electrode 662, an organic encapsulation layer 720 disposed on the first inorganic encapsulation layer 710, and a second inorganic encapsulation layer 730 disposed on the organic encapsulation layer 720.

Each of the first inorganic encapsulation layer 710 and the second inorganic encapsulation layer 730 may be made of an inorganic material such as silicon nitride ($SiN_x$), silicon oxide ($SiO_x$), silicon nitroxide ($SiN_xO_y$, xy), or silicon oxynitride ($SiO_xN_y$, xy). The first inorganic encapsulation layer 710 and the second inorganic encapsulation layer 730 may be formed by a chemical vapor deposition method, but the present invention is not limited thereto.

The organic encapsulation layer 720 may contain an organic material. The organic encapsulation layer 720 may be formed by directly applying a coating composition including an organic material onto the first inorganic encapsulation layer 710 and curing the coating composition.

Although FIG. 8 illustrates a case where the encapsulation member 700 has a three-layer laminated structure, the encapsulation member 700 may have a single-layer structure, a two-layer laminated structure, or a four-layer laminated structure. Further, unlike the case where the uppermost layer of the encapsulation member 700 is made of an inorganic material, the uppermost layer of the encapsulation member 700 may be an organic layer made of an organic material.

The touch unit 800 may be disposed on the encapsulation member 700. The touch unit 800 may serve to detect the touch by a part of a body of a user or a stylus pen. The touch unit 800 may include a first touch electrode 810 extending in the first direction 810 and a second touch electrode 820 disposed over the first touch electrode 810 and extending in the second direction Y intersecting the first direction X.

In an exemplary embodiment, the first touch electrode 810 may be disposed directly on the encapsulation member 700. FIG. 8 illustrates a case where the uppermost layer of the encapsulation member 700, being in direct contact with the first touch electrode 810, is an inorganic layer made of an inorganic material. However, in another exemplary embodiment, the uppermost layer of the encapsulation member 700, being in direct contact with the first touch electrode 810, may an organic layer made of an organic material. The plurality of the first touch electrodes 810 may extend in the first direction X, and may be spaced apart from each other in the second direction Y. The first touch electrode 810 may transmit the detected touch signal in the first direction X. FIG. 8 illustrates a case where two first touch electrodes 810 are disposed in one pixel, but the present invention is not limited thereto. A first insulating layer 815 may be disposed directly on the first touch electrode 810 to insulate the first touch electrode 810 and the second touch electrode 820 from each other.

The second touch electrode 820 may be disposed directly on the first insulating layer 815. The second touch electrode 820 may be disposed to be insulated from the first touch electrode 810. The plurality of the second touch electrodes 820 may extend in the second direction Y, and may be spaced apart from each other in the first direction X. The second touch electrode 820 may transmit the detected touch signal in the second direction Y. A second insulating layer 825 may be disposed directly on the second touch electrode 820 to cover the second touch electrode 820. The second insulating layer 825 may be an organic layer made of an organic material, an inorganic layer made of an inorganic material, or a laminated structure of at least one organic layer and at least one inorganic layer.

A phase retardation layer 900 may be disposed on the second insulating layer 825. The phase retardation layer 900 may be configured to convert linearly polarized light into circularly polarized light or elliptically polarized light or to convert circularly polarized or elliptically polarized light into a linearly polarized light by retarding the phase of any one of mutually orthogonal components of incident light. In an exemplary embodiment, the phase retardation layer 900 may retard the phase of incident light by about λ/4.

The phase retardation layer 900 may be made of a birefringent polyether sulfone-based, cellulose ester-based, or cycloolefin-based material, or may be made of a birefringent liquid crystal material. In an exemplary embodiment, the phase retardation layer 900 may be disposed directly on the second insulating layer 825. The phase retardation layer 900 may be formed by directly applying a coating composition including the bifringent material onto the second insulating layer 825 and curing the coating composition, but the present invention is not limited thereto. In another exemplary embodiment, the phase retardation layer 900 may be configured in the form of a stretched film, and may be in contact with the second insulating layer 825 or spaced apart from the second insulating layer 825 through an adhesive layer (not shown).

The polarizing element 15 may be disposed on the phase retardation layer 900. The polarizing element 15 may include a dye alignment layer 111 and a polarizing layer 120. In an exemplary embodiment, the dye alignment layer 111 may be disposed directly on the phase retardation layer 900. The dye alignment layer 111 may be formed by directly applying a composition including a polyimide-based material onto the phase retardation layer 900 and then alignment-treating and curing the applied composition, but the present invention is not limited thereto. In another exemplary embodiment, this dye alignment layer may be the dye alignment layer according to the embodiment of FIG. 1.

The polarizing layer 120 may be disposed directly on the dye alignment layer 111. The polarizing layer 120 may be formed by directly applying a composition for forming a polarizing layer onto the dye alignment layer 111 and then aligning and polymerizing the applied composition. Since the polarizing layer 120 has been described with reference to FIGS. 1 to 7, a detailed description thereof will be omitted.

The polarizing element 15 may convert unpolarized incident light into circularly polarized light or elliptically polarized light together with the phase retardation layer 900. Thus, the reflection of external light due to a metal layer in the display device 1003 can be suppressed, and the display quality of the display device 1003 can be improved.

The display device 1003 according to this embodiment may include the polarization element 15 integrated with the display panel. For example, the polarizing element 15 may be combined with the phase retardation layer 900 without interposing a separate adhesive layer or the like. In this way, the configuration of the display device 1003 can be simplified. Further, it is possible to provide the display device 1003 capable of suppressing the reflection of external light without complicated processes such as stretching/pressure processes.

Hereinafter, methods of manufacturing a display device according to embodiments of the present invention will be described.

FIGS. 9 to 12 are cross-sectional views showing a method of manufacturing a display device according to an embodiment of the present invention.

Figure 9:
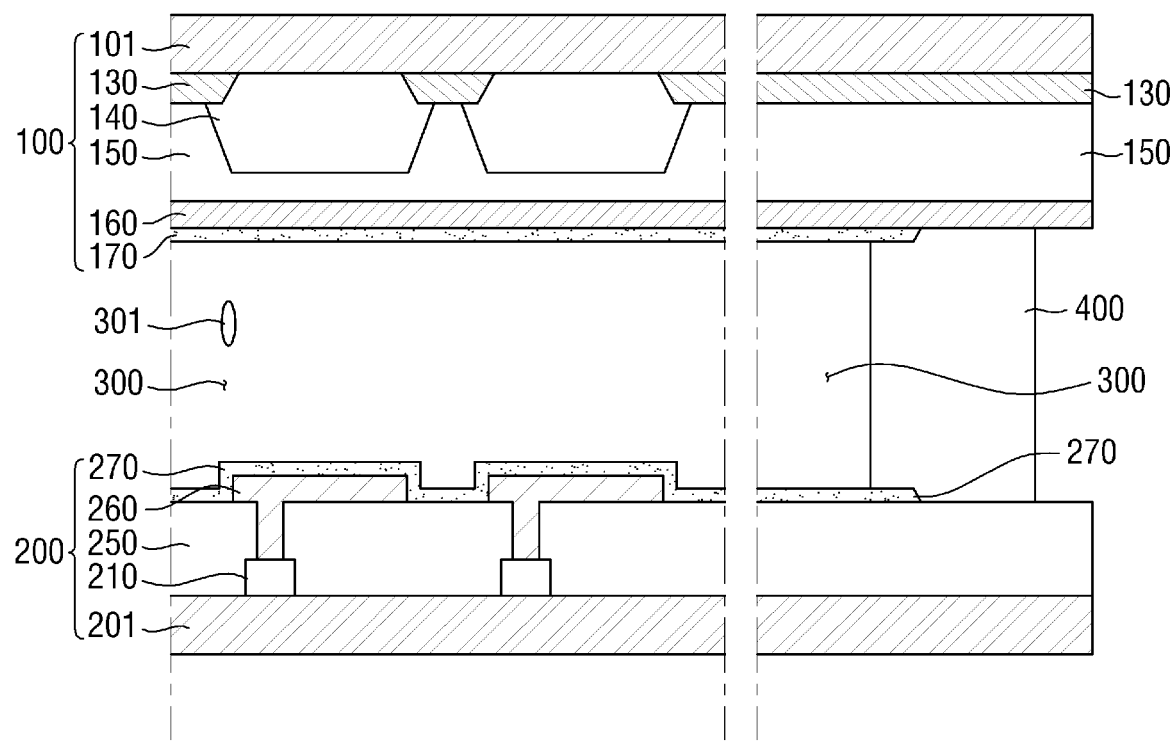
FIGS. 9 to 12 are cross-sectional views showing a method of manufacturing a display device according to an embodiment.

First, referring to FIG. 9, a display panel including a first display substrate 100, a second display substrate 200 facing the first display substrate 100, a liquid crystal layer 300 interposed between the first display substrate 100 and the second display substrate 200, and a sealing member 400 sealing the liquid crystal layer 300 by attaching the first display substrate 100 and the second display substrate 200 together, is prepared. The first display substrate 100 may be an upper substrate including a color control pattern layer 140, and the second display substrate 200 may be a lower substrate including a switching element 210. Since the first display substrate 100, the second display substrate 200, the liquid crystal layer 300, and the sealing member 400 have been described with reference to FIG. 5 and the like, a detailed description thereof will be omitted.

Figure 10:
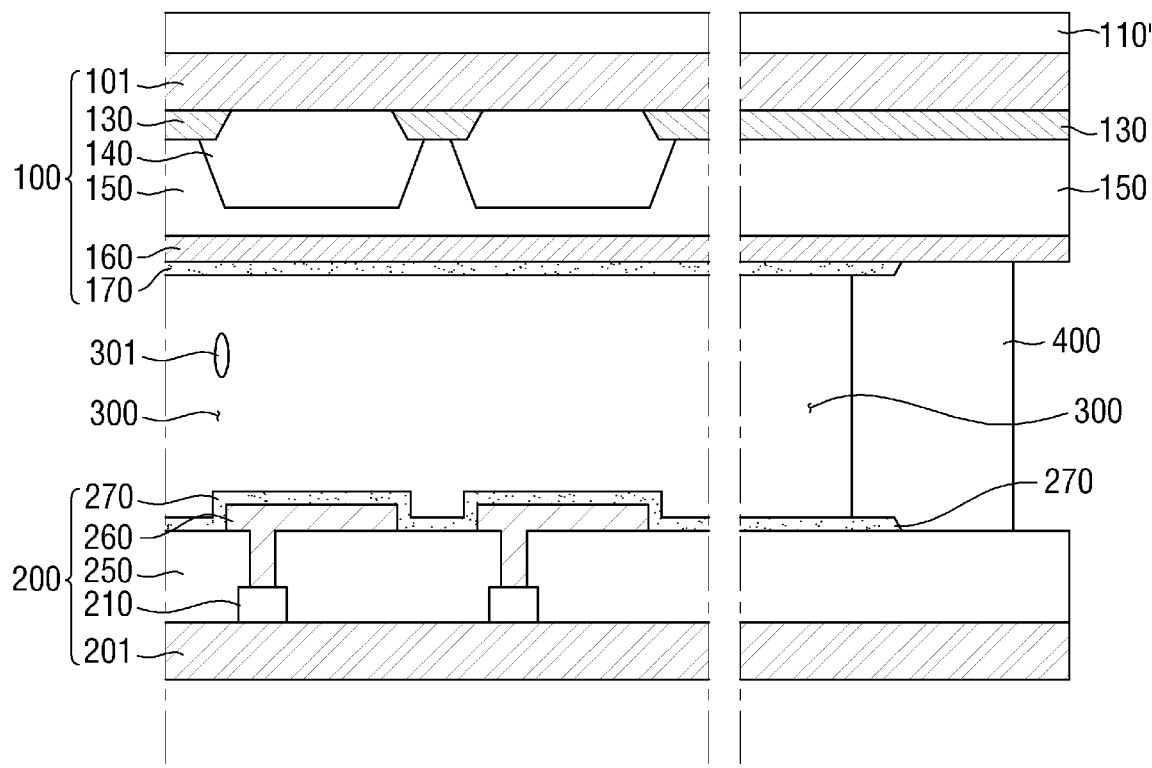

Subsequently, referring to FIG. 10, a first material layer 110' is formed on a first base substrate 101 of the first display substrate 100. In an exemplary embodiment, the step of forming the first material layer 110' may be a step of depositing a metal material such as aluminum or copper or applying and curing a composition including polyvinyl alcohol, polyimide, polyamide, cyclopolyolefin, an epoxy resin, or a phenol resin.

Figure 11:
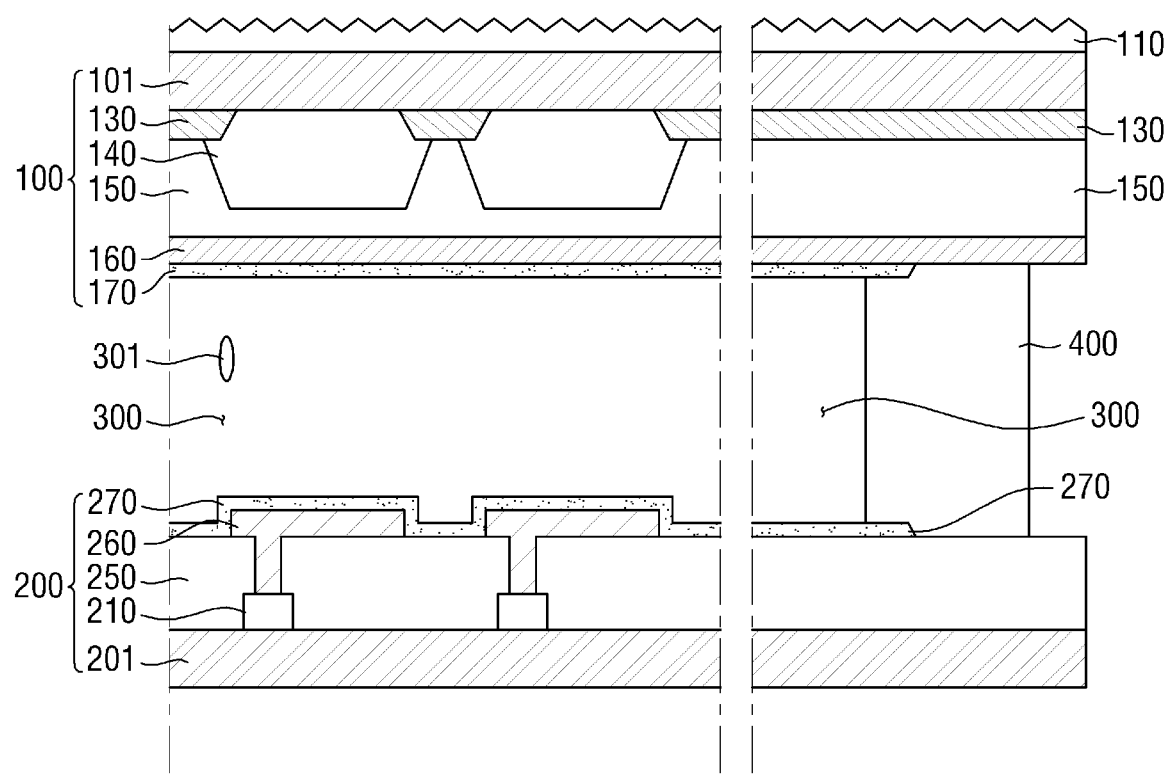

Subsequently, referring to FIG. 11, the first material layer 110' is patterned to form a dye alignment layer 110 having a surface shape having alignment anisotropy. The step of forming the dye alignment layer 110 may include a step of forming a plurality of linear protrusion patterns 110a extended in one direction and repeated in another direction intersecting the one direction. Since the protrusion patterns 110a have been described with reference to FIG. 1 and the like, a detailed description thereof will be omitted. The step of forming the protrusion patterns 110a may be performed by an etching process or by a patterning method such as nano-imprinting.

Figure 12:
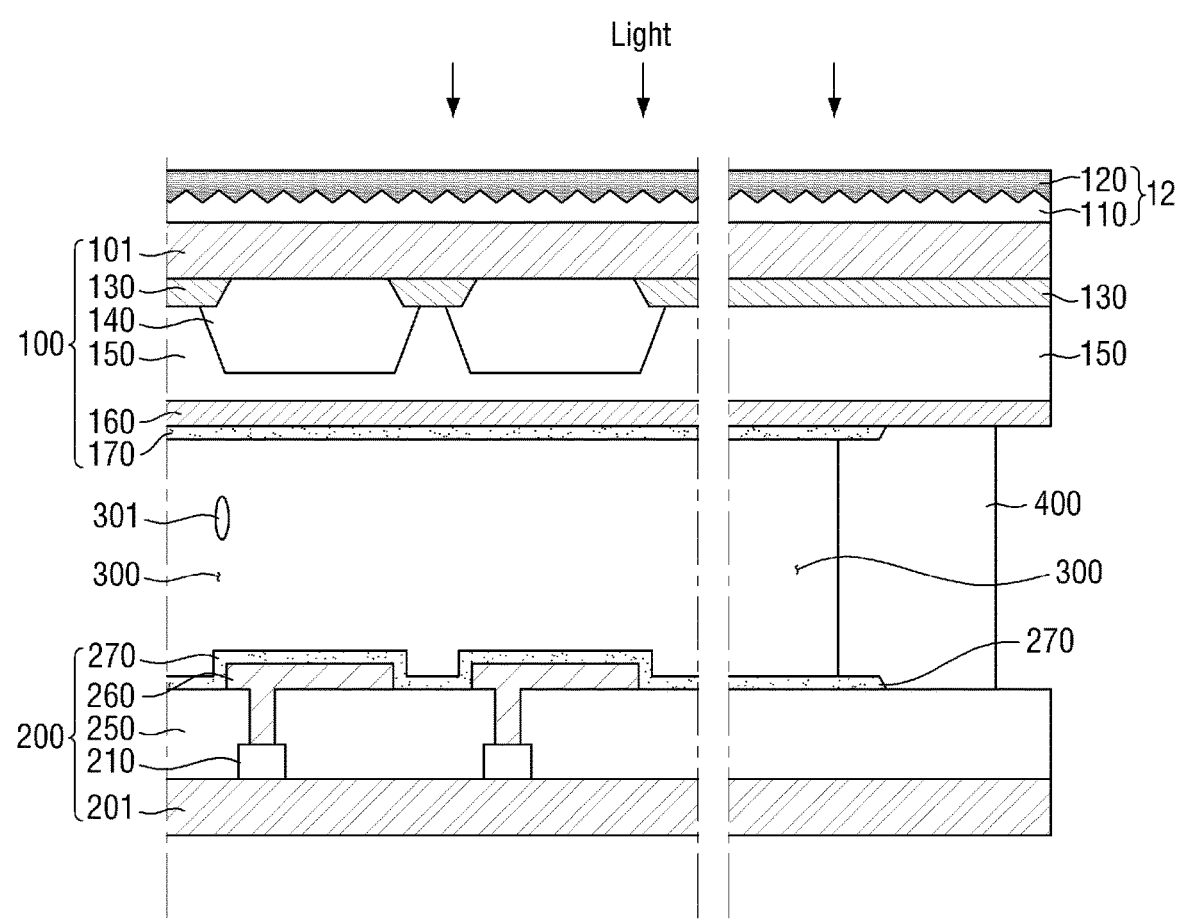

Subsequently, referring to FIG. 12, a polarizing layer 120 is formed on the dye alignment layer 110. In an exemplary embodiment, the step of forming the polarizing layer 120 may include a step of directly applying a composition for forming a polarizing layer onto the dye alignment layer 110 and a step of irradiating the applied composition with light to polymerize the composition.

The composition for forming a polarizing layer may be the aforementioned composition according to any embodiment. For example, the composition for forming a polarizing layer may include at least one of dye compounds represented by Formula 1.

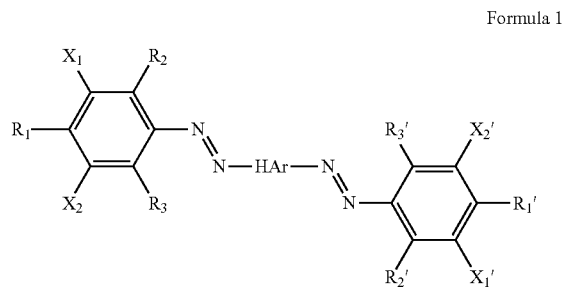

Formula 1

In some embodiments, the composition for forming a polarizing layer may further include at least one of the aforementioned dye compound represented by Formula C-1, the aforementioned dye compound represented by Formula D-1, the aforementioned dye compound represented by Formula E-1, and the aforementioned reactive-liquid crystalline compound. The reactive-liquid crystalline compound may be a liquid crystalline compound having the aforementioned structure represented by Formula F-1.

Since the composition for forming a polarizing layer have been described in detail above, a redundant description thereof will be omitted.

In an exemplary embodiment, the composition for forming a polarizing layer may include both the aforementioned dye compound represented by Formula A-1 and the aforementioned dye compound represented by Formula B-2, and may further include the aforementioned dye compound represented by Formula C-2 and/or the aforementioned dye compound represented by Formula D-2. The composition for forming a polarizing layer may further include the aforementioned dye compound represented by Formula B-3 and/or the aforementioned dye compound represented by Formula B-4. The composition for forming a polarizing layer may further include the aforementioned dye compound represented by Formula E-1. The composition for forming a polarizing layer may further include the aforementioned liquid crystalline compound having a smectic B phase represented by Formula F-1.

In another embodiment, the composition for forming a polarizing layer may include the aforementioned dye compound represented by Formula B-1, and may further include the aforementioned dye compound represented by Formula C-3 and/or the aforementioned dye compound represented by Formula D-3. The composition for forming a polarizing layer may further include the aforementioned dye compound represented by Formula C-2 and/or the aforementioned dye compound represented by Formula D-2. The composition for forming a polarizing layer may further include the aforementioned dye compound represented by Formula E-1. The composition for forming a polarizing layer may further include the aforementioned liquid crystalline compound having a smectic B phase represented by Formula F-1.

The step of irradiating the composition with light to polymerize the composition may be a step of irradiating the applied composition with light of an ultraviolet wavelength band to form the coated polarizing layer 120. The ultraviolet light may be light having a peak wavelength of 365 nm or 254 nm, but the present invention is not limited thereto. In the step of irradiating the composition with light to polymerize the composition, the photopolymerizable group (for example, $R_{f1}$ and/or $R_{f2}$ of Formula F-1) of the reactive-liquid crystalline compound in the applied composition may be polymerized to form a polymer of the reactive-liquid crystalline compound.

Hereinafter, methods of manufacturing a display device according to embodiments of the present invention will be described.

Figure 13:
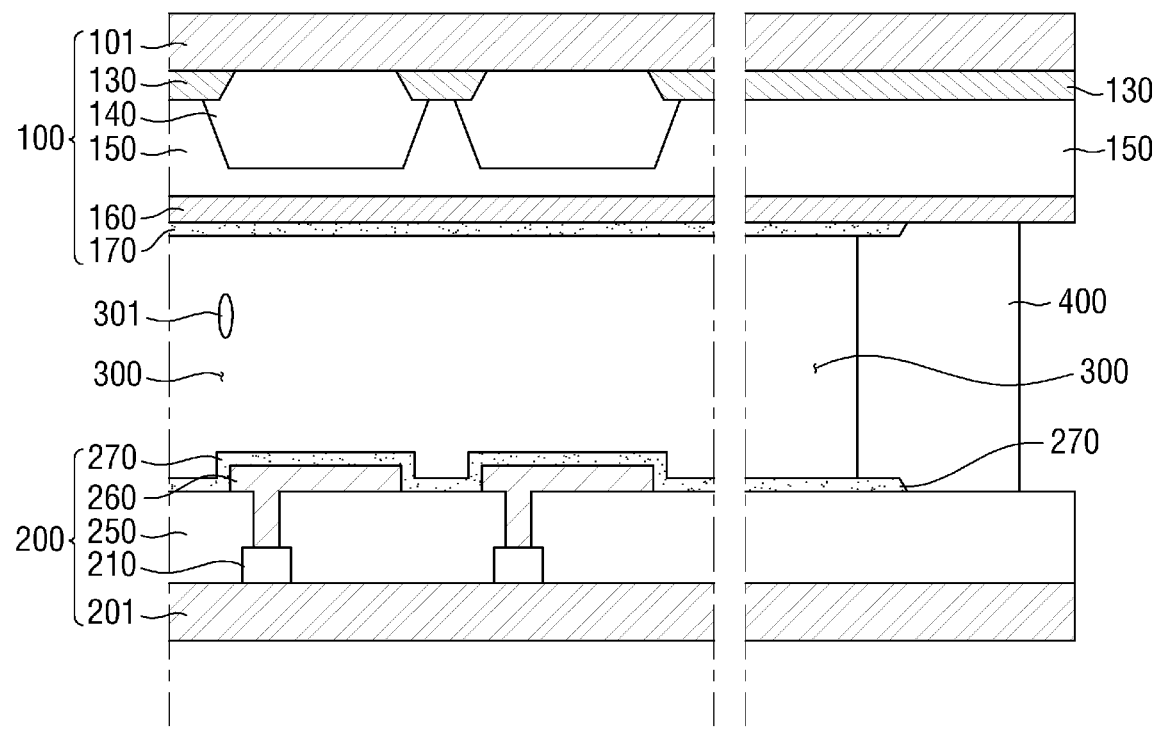
FIGS. 13 to 15 are cross-sectional views showing a method of manufacturing a display device according to another embodiment.
Figure 14:
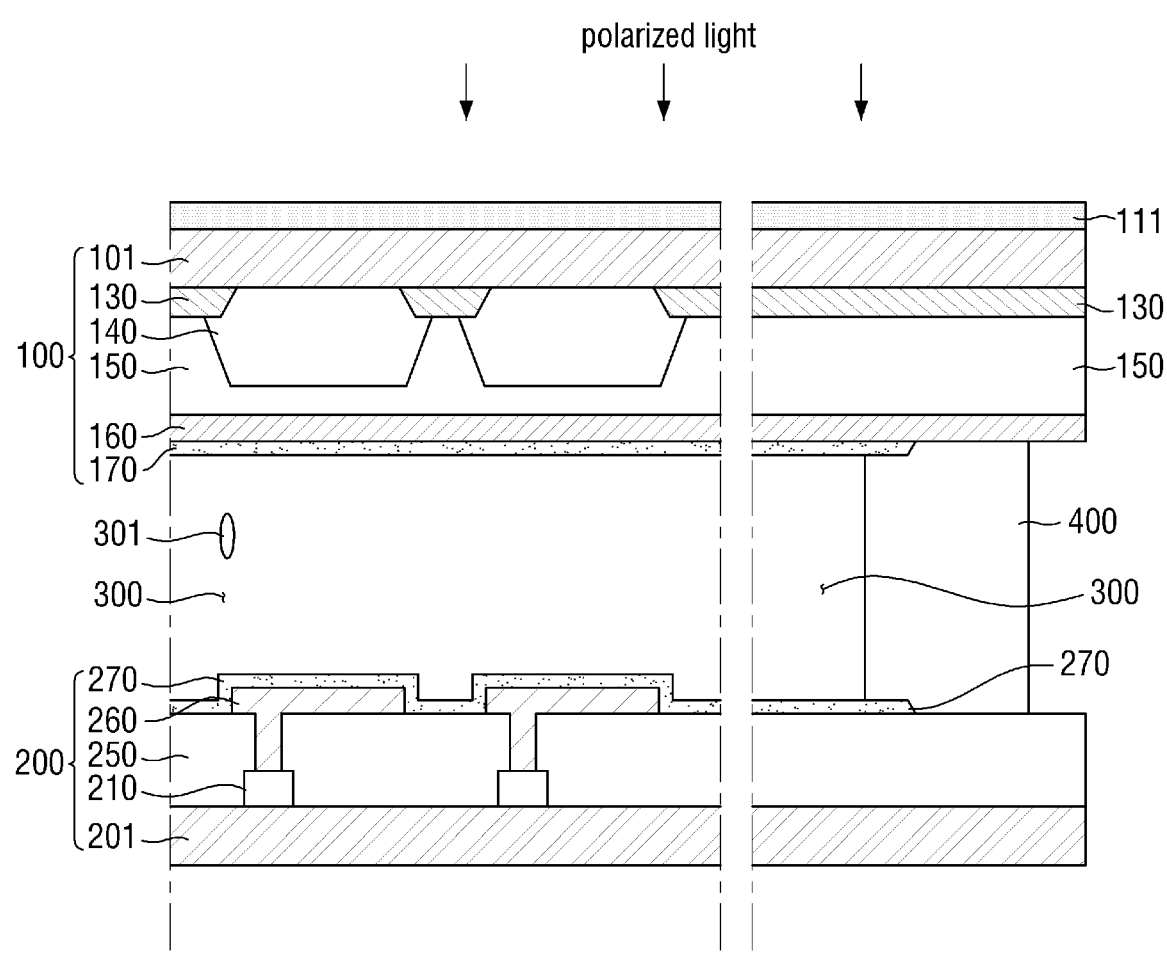
Figure 15:
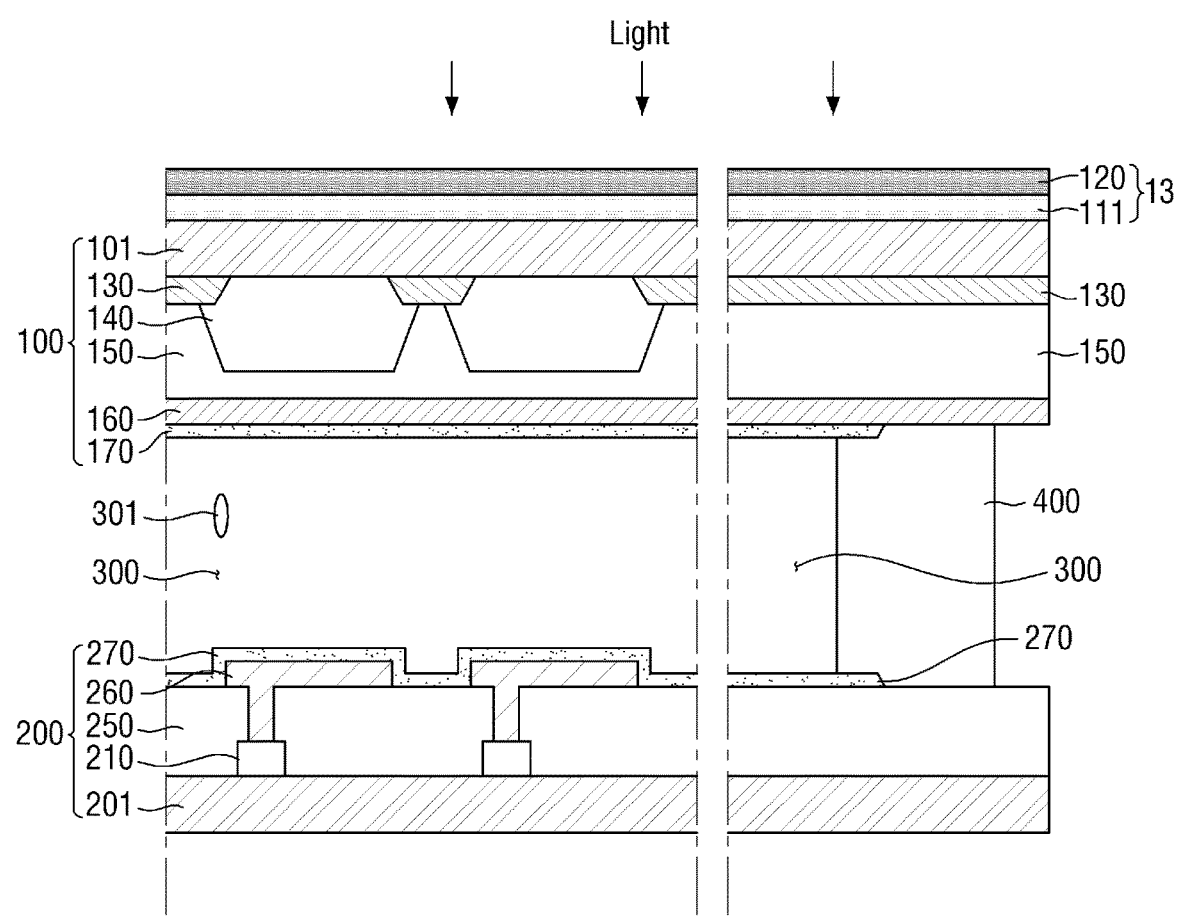

FIGS. 13 to 15 are cross-sectional views showing a method of manufacturing a display device according to another embodiment of the present invention.

First, referring to FIG. 13, a display panel including a first display substrate 100, a second display substrate 200 facing the first display substrate 100, a liquid crystal layer 300 interposed between the first display substrate 100 and the second display substrate 200, and a sealing member 400 sealing the liquid crystal layer 300 by attaching the first display substrate 100 and the second display substrate 200 together is prepared.

Subsequently, referring to FIG. 14, a dye alignment layer 111 formed on a first base substrate 101 of the first display substrate 100. In an exemplary embodiment, the step of forming the dye alignment layer 111 may include: a step of directly applying a coating composition including a polyimide-based material having a photoreactive group in a repetition unit onto one side of the first base substrate 101; a step of irradiating the applied coating composition with polarized light to impart alignment anisotropy; and a step of curing the coating composition imparted with the alignment anisotropy.

In the step of irradiating the applied coating composition with polarized light, the polyimide-based polymer having a photoreactive group reacts with polarized light to be isomerized or decomposed, thereby imparting anisotropy. However, the present invention is not limited thereto. The step of curing the coating composition may be performed at about 180° C. to 210° C. for about 20 to 30 minutes.

Further, in the step of irradiating the applied coating composition with polarized light, the polarization direction of the irradiated light (polarized light) may be approximately perpendicular to the direction (that is, the absorption axis direction) in which the dye compound in the polarizing layer 120 to be described later is intended to be aligned. In other words, the polarization direction of the irradiated light may be approximately parallel to the transmission axis direction of the polarizing element 13, but the present invention is not limited thereto.

Subsequently, referring to FIG. 15, a polarizing layer 120 is formed on the dye alignment layer 111. Since the step of forming the polarizing layer 120 has been described with reference to FIG. 12 and the like, a redundant description will be omitted.

FIGS. 16 to 19 are cross-sectional views showing a method of manufacturing a display device according to still another embodiment of the present invention.

Figure 16:
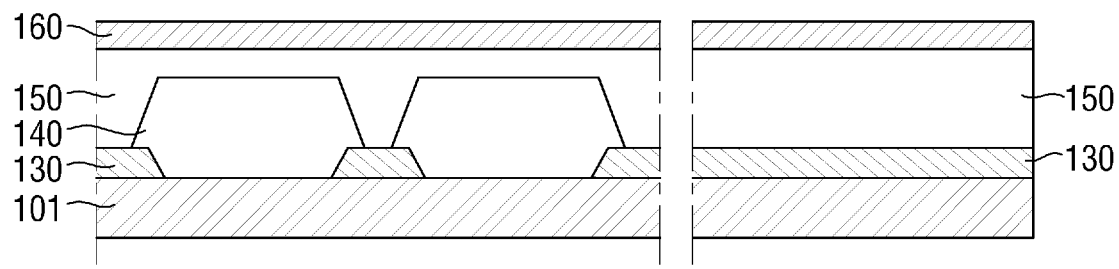
FIGS. 16 to 19 are cross-sectional views showing a method of manufacturing a display device according to still another embodiment.

First, referring to FIG. 16, a first base substrate 101, a light-blocking member 130 disposed on the first base substrate 101, a color control pattern layer 140 disposed on the light-blocking member 130, an overcoating layer 150 disposed on the color control pattern layer 140, and a common electrode 160 disposed on the overcoating layer 150 are prepared. The first base substrate 101 has one side on which the light-blocking member 130 is disposed and the other side thereof.

Figure 17:
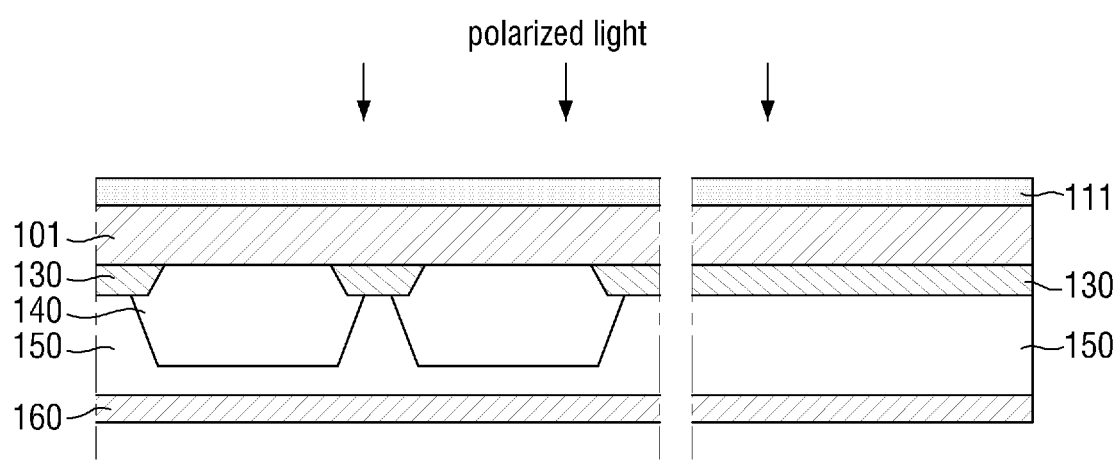

Subsequently, referring to FIG. 17, a dye alignment layer 111 is formed on the other side of the first base substrate 101. In an exemplary embodiment, the step of forming the dye alignment layer 111 may include: a step of directly applying a coating composition including a polyimide-based material having a photoreactive group in a repetition unit onto the first base substrate 101; a step of irradiating the applied coating composition with polarized light to impart alignment anisotropy; and a step of curing the coating composition imparted with the alignment anisotropy. Since the step of irradiating the applied coating composition with polarized light and the step of curing the coating composition have been described with reference to FIG. 14 and the like, a redundant description will be omitted.

Figure 18:
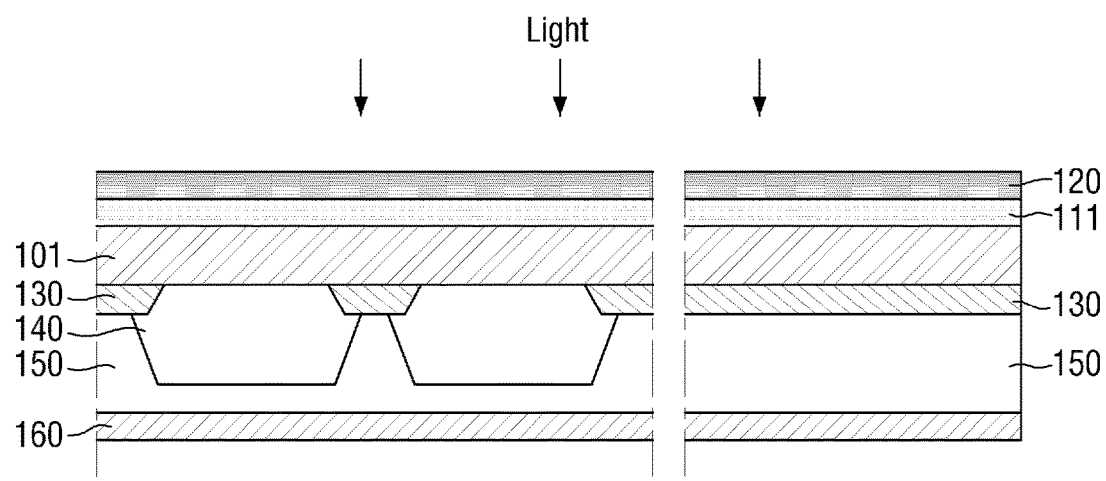

Subsequently, referring to FIG. 18, a polarizing layer 120 is formed on the dye alignment layer 111. In an exemplary embodiment, the step of forming the polarizing layer 120 may include a step of directly applying a composition for forming a polarizing layer, the composition including at least one of the aforementioned dye compounds represented by Formula 1, onto the dye alignment layer 111 and a step of irradiating the applied composition with light to polymerize the composition. Since the composition for forming a polarizing layer and the step of irradiating the applied composition with light has been described with reference to FIG. 15 and the like, a redundant description will be omitted.

Figure 19:
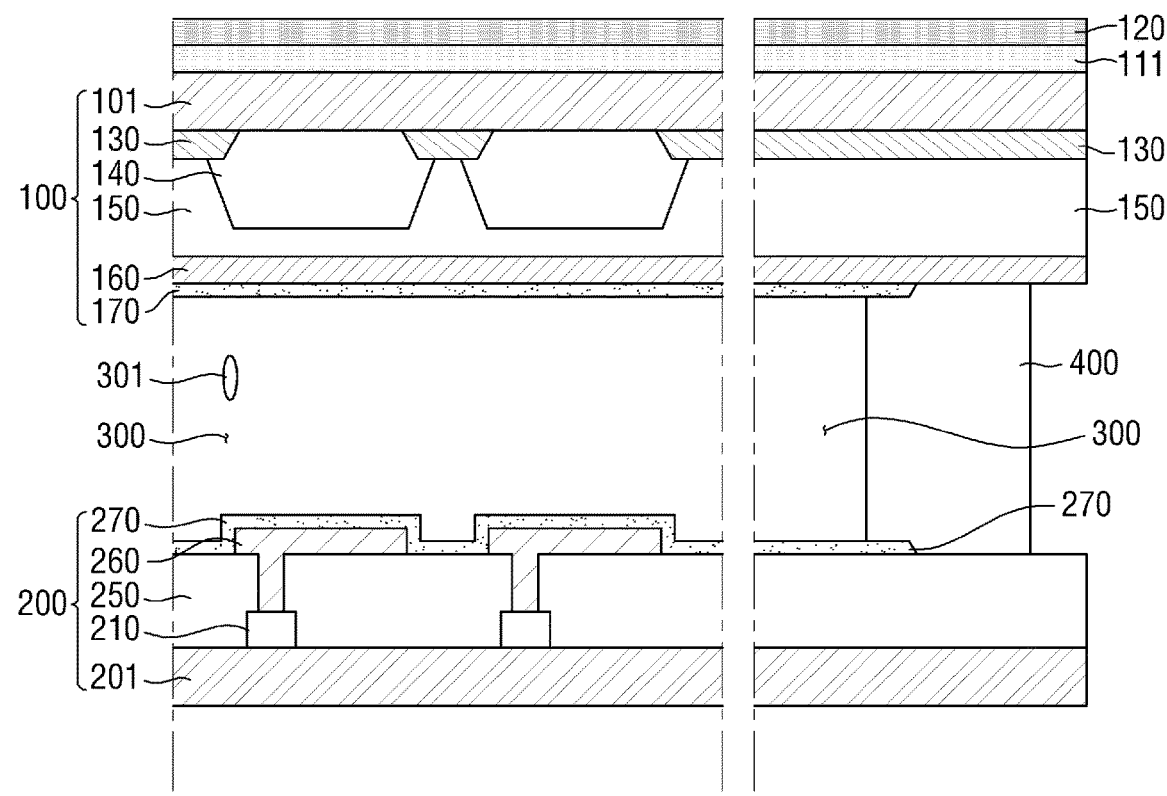

Subsequently, referring to FIG. 19, a first liquid crystal alignment layer 170 is formed on the common electrode 160, a liquid crystal layer 300 is interposed between a first display substrate 100 and a second display substrate 200 including a switching element 210, and the liquid crystal layer 300 is sealed by a sealing member 400.

FIGS. 20 to 24 are cross-sectional views showing a method of manufacturing a display device according to still another embodiment of the present invention.

Figure 20:
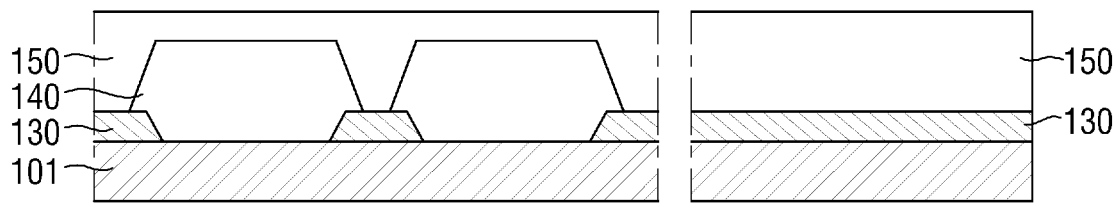
FIGS. 20 to 24 are cross-sectional views showing a method of manufacturing a display device according to still another embodiment.

First, referring to FIG. 20, a first base substrate 101, a light-blocking member 130 disposed on the first base substrate 101, a color control pattern layer 140 disposed on the light-blocking member 130, and an overcoating layer 150 disposed on the color control pattern layer 140 are prepared.

Figure 21:
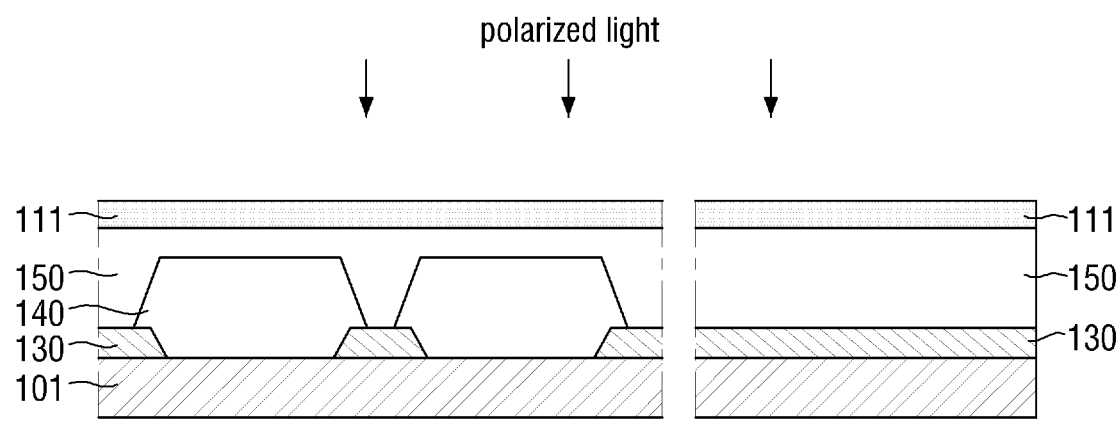

Subsequently, referring to FIG. 21, a dye alignment layer 111 is formed on the overcoating layer 150. In an exemplary embodiment, the step of forming the dye alignment layer 111 may include: a step of directly applying a coating composition including a polyimide-based material having a photoreactive group in a repetition unit onto the overcoating layer 150; a step of irradiating the applied coating composition with polarized light to impart alignment anisotropy; and a step of curing the coating composition imparted with the alignment anisotropy. Since the step of irradiating the applied coating composition with polarized light and the step of curing the coating composition have been described with reference to FIG. 14 and the like, a redundant description will be omitted.

Figure 22:
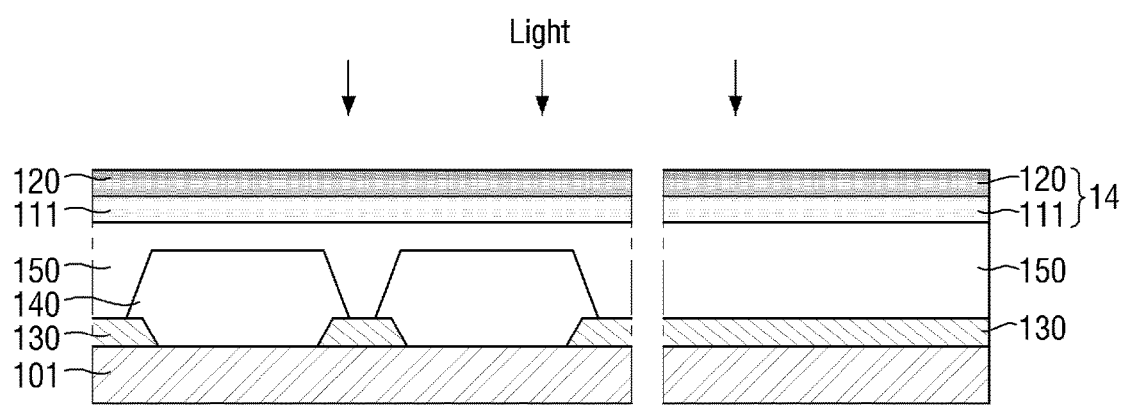

Subsequently, referring to FIG. 22, a polarizing layer 120 is formed on the dye alignment layer 111. In an exemplary embodiment, the step of forming the polarizing layer 120 may include a step of directly applying a composition for forming a polarizing layer, the composition including at least one of the aforementioned dye compounds represented by Formula 1, onto the dye alignment layer 111 and a step of irradiating the applied composition with light to polymerize the composition. Since the composition for forming a polarizing layer and the step of irradiating the applied composition with light has been described with reference to FIG. 15 and the like, a redundant description will be omitted.

Figure 23:
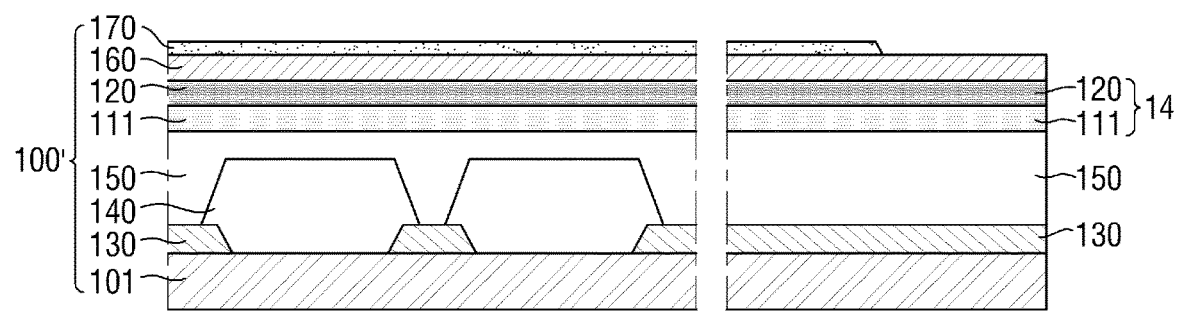

Subsequently, referring to FIG. 23, a common electrode 160 and a first liquid crystal alignment layer 170 are sequentially formed on the polarizing layer 120 to prepare a first display substrate 100'.

Figure 24:
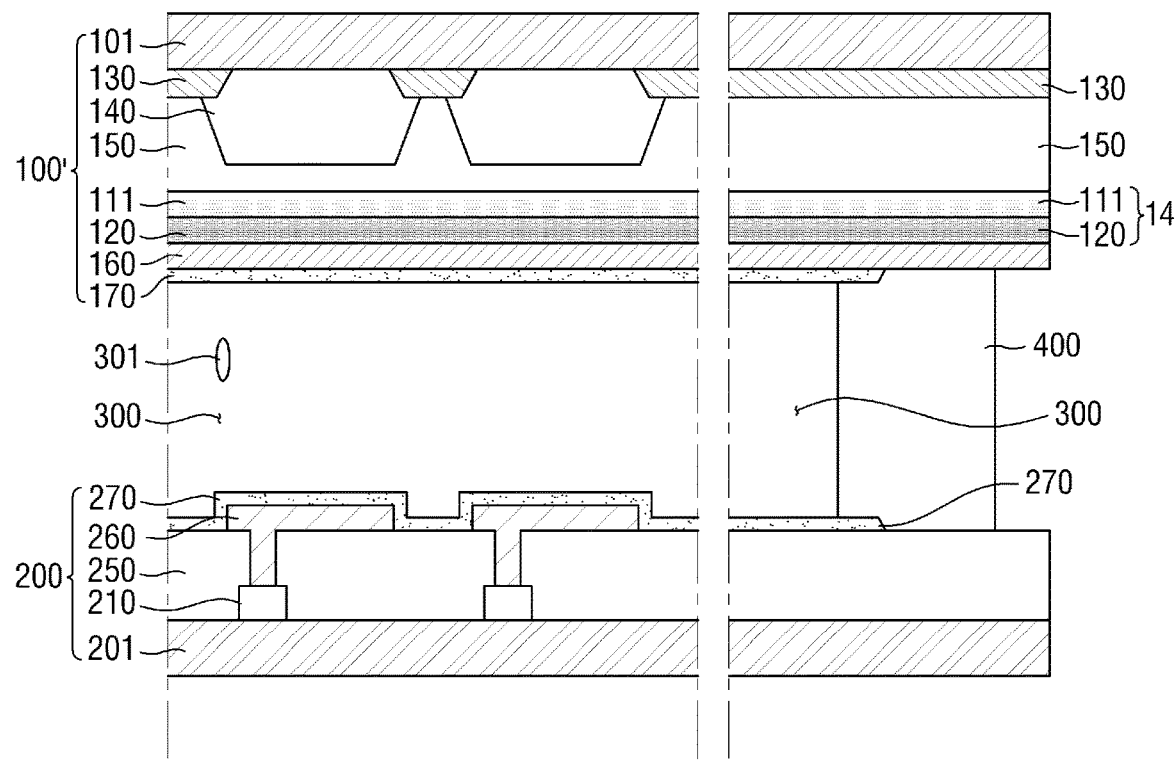

Subsequently, referring to FIG. 24, a liquid crystal layer 300 is interposed between the first display substrate 100' including a polarizing element 14 and a second display substrate 200 including a switching element 210, and the liquid crystal layer 300 is sealed by a sealing member 400.

FIGS. 25 to 30 are cross-sectional views showing a method of manufacturing a display device according to still another embodiment of the present invention.

Figure 25:
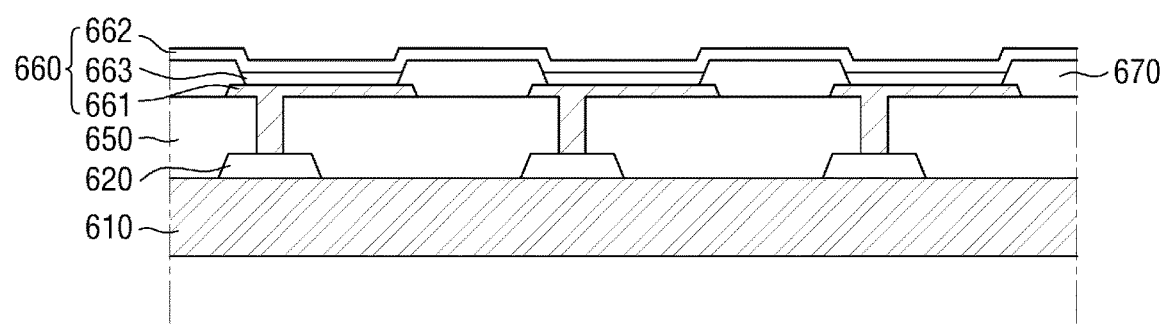
FIGS. 25 to 30 are cross-sectional views showing a method of manufacturing a display device according to still another embodiment.

First, referring to FIG. 25, a base substrate 610, a driving element 620 disposed on the base substrate 610, an intermediate layer 650 disposed on the driving element 620, and a pixel defining film 670 and an organic light-emitting element 660 disposed on the intermediate layer 650 are prepared.

Figure 26:
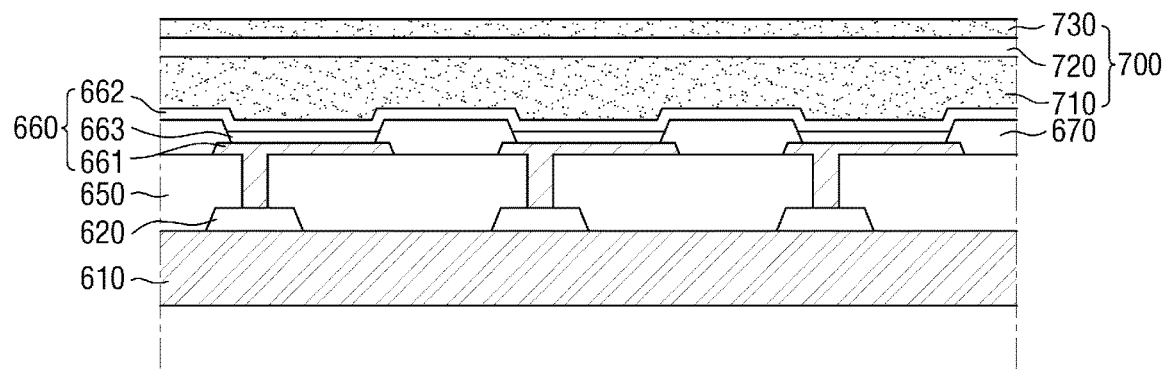

Subsequently, referring to FIG. 26, an encapsulation member 700 is formed on the organic light-emitting element 660. In an exemplary embodiment, the step of forming the encapsulation member 700 may include: a step of directly depositing an inorganic material on a second electrode 662 to form a first inorganic encapsulation layer 710; a step of directly applying a coating composition including an organic material onto the first inorganic encapsulation layer 710 and curing the applied coating composition to form an organic encapsulation layer 720; and a step of directly depositing an inorganic material on the organic encapsulation layer 720 to form a second inorganic encapsulation layer 730.

Figure 27:
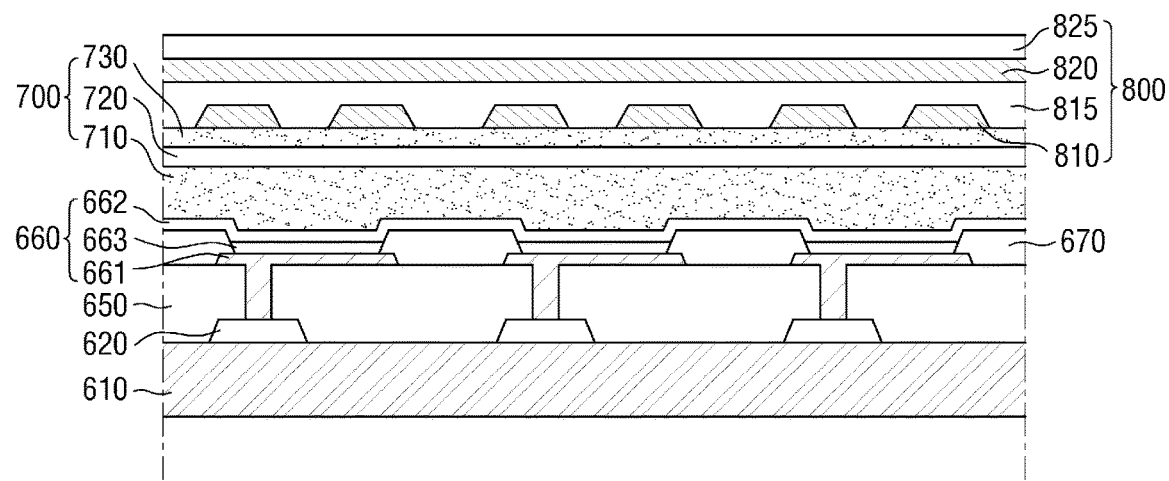

Subsequently, referring to FIG. 27, a touch unit 800 is formed on the encapsulation member 700. In an exemplary embodiment, the step of forming the touch unit 800 may include: a step of directly depositing a conductive material on the encapsulation member 700 and patterning the deposited conductive material to form a first touch electrode 810; a step of directly forming a first insulating layer 815 on the first touch electrode 810; a step of directly depositing a conductive material on the first insulating layer 815 and patterning the deposited conductive material to form a second touch electrode 820; and a step of directly forming a second insulating layer 825 on the second touch electrode 820.

Figure 28:
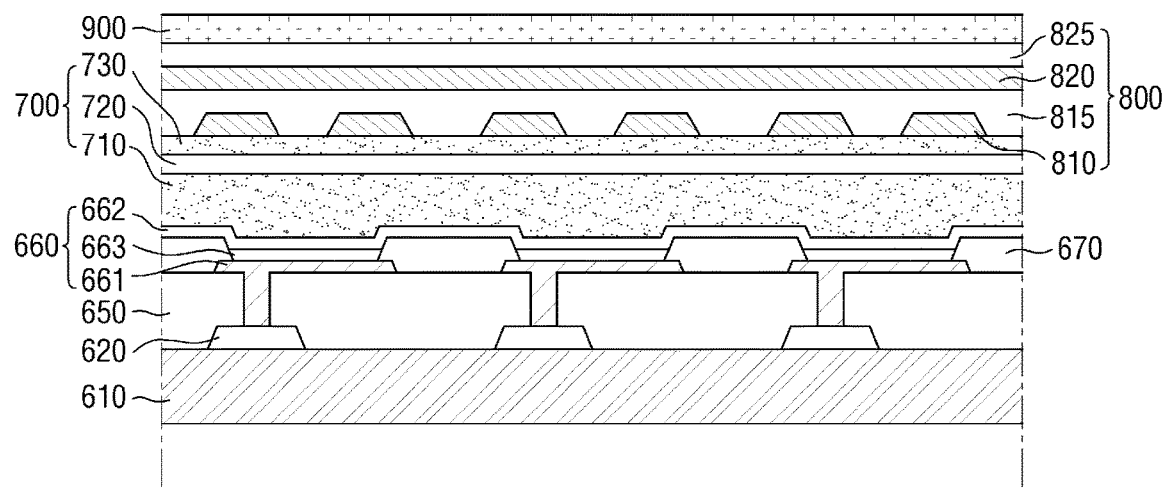

Subsequently, referring to FIG. 28, a phase retardation layer 900 is formed on the touch unit 800. In an exemplary embodiment, the step of forming the phase retardation layer 900 may include: a step of directly applying a coating composition including a birefringent material onto the touch unit 800; and a step of curing the applied coating composition. Since the phase retardation layer 900 has been described with reference to FIG. 8, a detailed description thereof will be omitted. In another exemplary embodiment, the step of forming the phase retardation layer 900 may be a step of interposing an adhesive layer (not shown) between the phase retardation layer 900 and the touch unit 800 to attach the phase retardation layer 900 to the touch unit 800.

Figure 29:
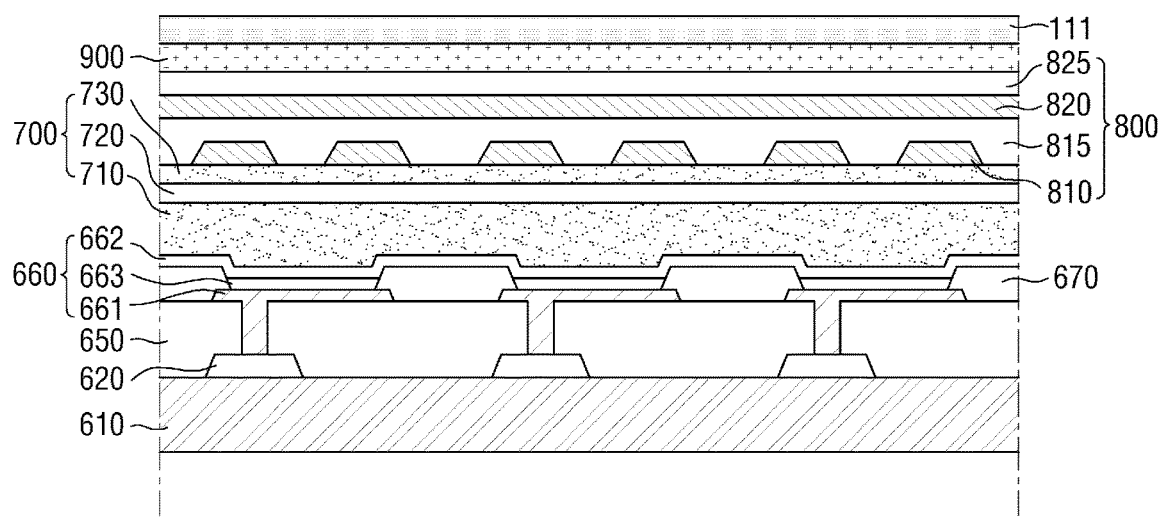

Subsequently, referring to FIG. 29, a dye alignment layer 111 is formed on the phase retardation layer 900. In an exemplary embodiment, the step of forming the dye alignment layer 111 may include: a step of directly applying a coating composition including a polyimide-based material having a photoreactive group in a repetition unit onto the phase retardation layer 900; a step of irradiating the applied coating composition with polarized light to impart alignment anisotropy; and a step of curing the coating composition imparted with the alignment anisotropy. Since the step of irradiating the applied coating composition with polarized light and the step of curing the coating composition have been described with reference to FIG. 14 and the like, a redundant description will be omitted.

Figure 30:
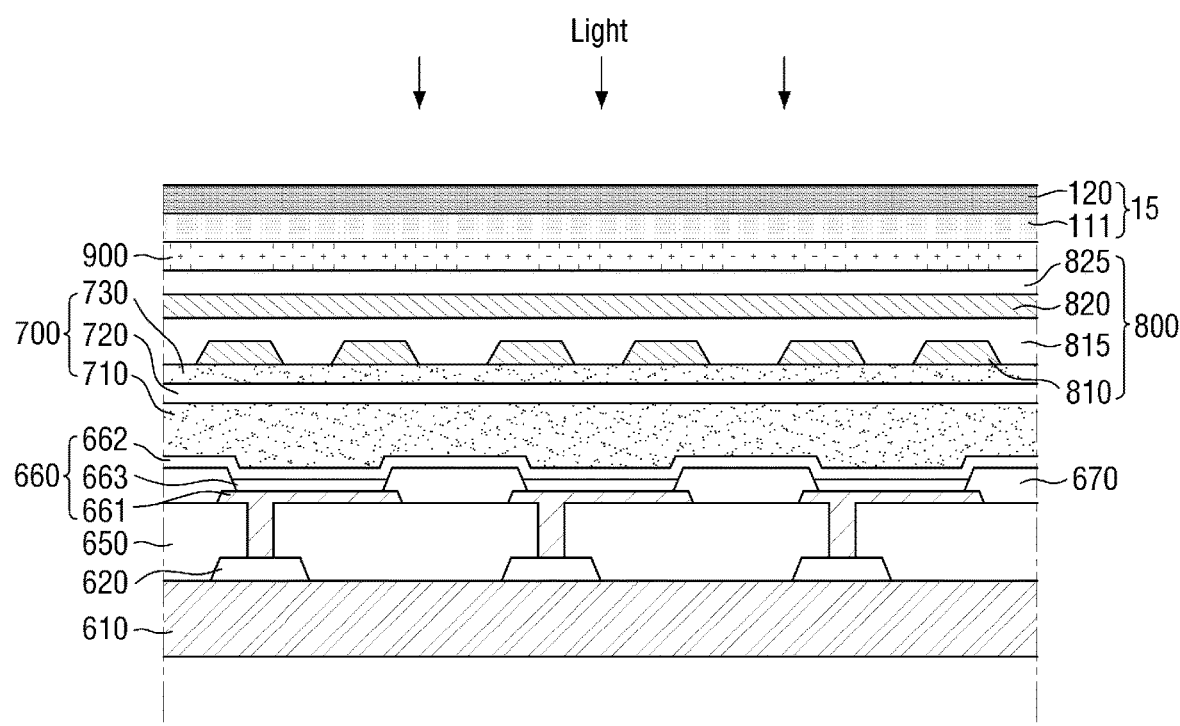

Subsequently, referring to FIG. 30, a polarizing layer 120 is formed on the dye alignment layer 111. In an exemplary embodiment, the step of forming the polarizing layer 120 may include a step of directly applying a composition for forming a polarizing layer, the composition including at least one of the aforementioned dye compounds represented by Formula 1, onto the dye alignment layer 111 and a step of irradiating the applied composition with light to polymerize the composition. Since the composition for forming a polarizing layer and the step of irradiating the applied composition with light has been described with reference to FIG. 15 and the like, a redundant description will be omitted.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A dye compound, represented by Formula 1:

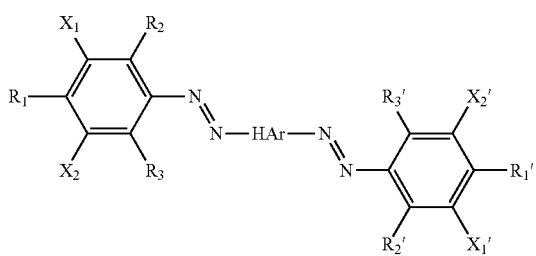

(1)

wherein in Formula 1,
HAr is

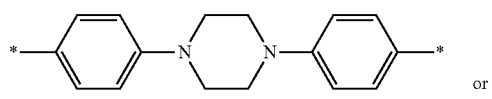

or

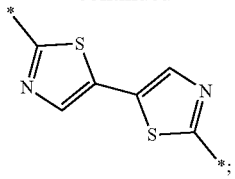

$R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

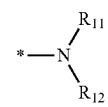

wherein $R_{11}$ and $R_{12}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{13}$, wherein n is an integer of 1 to 20, and $R_{13}$ is a halogen atom, a hydroxyl group, an amine group, an acryloyl group, an acrylate group, a methacryloyl group, or a methacrylate group, or *—$(CH_2)_n$—$R_{14}$, wherein n is an integer of 1 to 20, and $R_{14}$ is a halogen atom, a hydroxyl group, an amine group, an acryloyl group, an acrylate group, a methacryloyl group, or a methacrylate group, or each of $R_1$ and $R_1'$ forms an aromatic ring together with any one of adjacent $X_1$, $X_2$, $X_1'$, and $X_2'$;

$R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

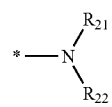

wherein $R_{21}$ and $R_{22}$ are each independently a hydrogen atom, an alkyl group of $C_{1-5}$, an alkoxy group of $C_{1-5}$, an alkylalcohol group of $C_{1-5}$, or alkylamino group of $C_{1-5}$, *—$(CH_2)_n$—$R_{23}$, wherein n is an integer of 1 to 5, and $R_{23}$ is a halogen atom, a hydroxyl group, an amine group, an acryloyl group, an acrylate group, a methacryloyl group, or a methacrylate group, or *—$(CH_2)_n$—$R_{24}$, wherein n is an integer of 1 to 5, and $R_{24}$ is a halogen atom, a hydroxyl group, amine group, an acryloyl group, an acrylate group, a methacryloyl group, or a methacrylate group, or each of $R_2$, $R_3$, $R_2'$ and $R_3'$ forms an aromatic ring together with any one of adjacent $X_1$, $X_2$, $X_1'$, and $X_2'$; and $X_1$, $X_2$, $X_1'$, and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$, or each of $X_1$, $X_2$, $X_1'$, and $X_2'$ forms an aromatic ring together with any one of adjacent $R_1$, $R_2$, $R_3$, $R_1'$, $R_2'$, and $R_3'$.

2. The dye compound of claim 1,
wherein the compound represented by Formula 1 is a compound represented by Formula A-2 or Formula B-2:

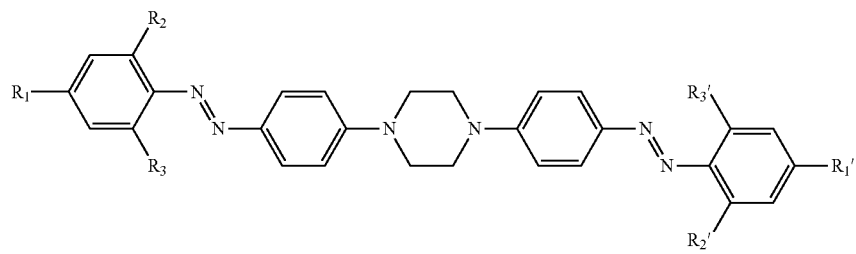

(A-2)

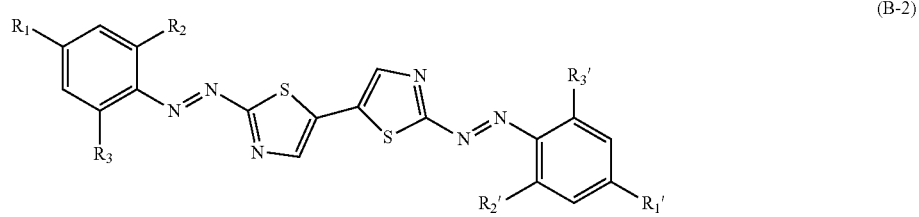

(B-2)

wherein in Formulae A-2 and B-2, $R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

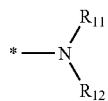

wherein $R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{13}$, wherein n is an integer of 1 to 20, and $R_{13}$ is a halogen atom, a hydroxyl group, an amine group, an acryloyl group, an acrylate group, a methacryloyl group, or a methacrylate group, or *—$(CH_2)_n$—$R_{14}$, wherein n is an integer of 1 to 20, and $R_{14}$ is a halogen atom, a hydroxyl group, an amine group, an acryloyl group, an acrylate group, a methacryloyl group, or a methacrylate group; and $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

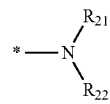

wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$, *—$(CH_2)_n$—$R_{23}$, wherein n is an integer of 1 to 5, and $R_{23}$ is a halogen atom, a hydroxyl group, an amine group, an acryloyl group, an acrylate group, a methacryloyl group, or a methacrylate group, or *—$(CH_2)_n$—$R_{24}$, wherein n is an integer of 1 to 5, and $R_{24}$ is a halogen atom, a hydroxyl group, an amine group, an acryloyl group, an acrylate group, a methacryloyl group, or a methacrylate group.

3. The dye compound of claim 2,
wherein, in Formulae A-2 and B-2, the number of carbon atoms of $R_1$ is more than the number of carbon atoms of $R_2$ and $R_3$,
the number of carbon atoms of $R_1'$ is more than the number of carbon atoms of $R_2'$ and $R_3'$,
at least one of $R_2$ and $R_3$ is a hydrogen atom, and
at least one of $R_2'$ and $R_3'$ is a hydrogen atom.

4. The dye compound of claim 1,
wherein the compound represented by Formula 1 is a compound represented by Formula A-3, Formula B-3, or Formula B-4:

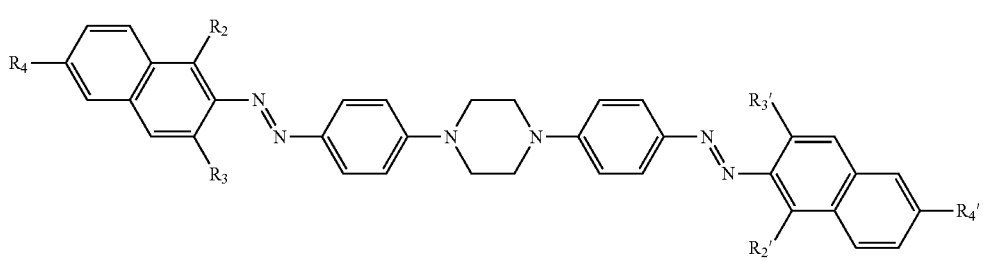

(A-3)

-continued

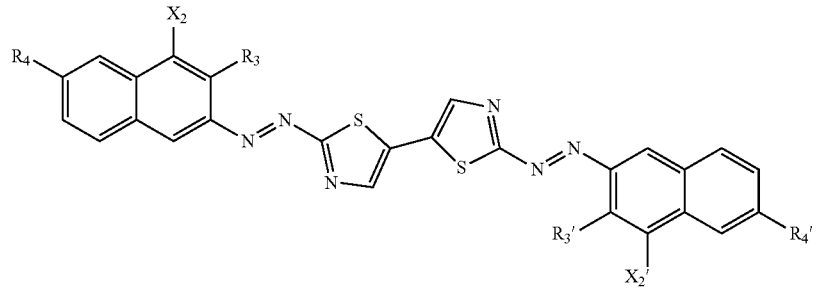

(B-3)

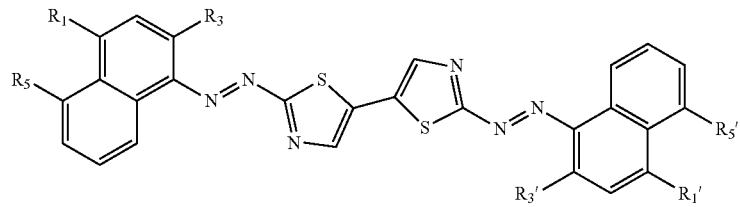

(B-4)

wherein in Formulae A-3, B-3, and B-4, $R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

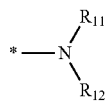

wherein $R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{13}$, wherein n is an integer of 1 to 20, and $R_{13}$ is a halogen atom, a hydroxyl group, an amine group, an acryloyl group, an acrylate group, a methacryloyl group, or a methacrylate group, *—$(CH_2)_n$—$R_{14}$, wherein n is an integer of 1 to 20, and $R_{14}$ is a halogen atom, a hydroxyl group, an amine group, an acryloyl group, an acrylate group, a methacryloyl group, or a methacrylate group;

$R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

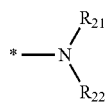

wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$, *—$(CH_2)_n$—$R_{23}$, wherein n is an integer of 1 to 5, and $R_{23}$ is a halogen atom, a hydroxyl group, an amine group, an acryloyl group, an acrylate group, a methacryloyl group, or a methacrylate group, or *—$(CH_2)_n$—$R_{24}$, wherein n is an integer of 1 to 5, and $R_{24}$ is a halogen atom, a hydroxyl group, an amine group, an acryloyl group, an acrylate group, a methacryloyl group, or a methacrylate group;

$X_2$ and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$;

$R_4$ and $R_4'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

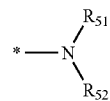

wherein $R_{41}$ and $R_{42}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{43}$, wherein n is an integer of 1 to 20, and $R_{43}$ is a halogen atom, a hydroxyl group, an amine group, an acryloyl group, an acrylate group, a methacryloyl group, or a methacrylate group, or *—$(CH_2)_n$—$R_{44}$, wherein n is an integer of 1 to 20, and $R_{44}$ is a halogen atom, a hydroxyl group, an amine group, an acryloyl group, an acrylate group, a methacryloyl group, or a methacrylate group; and $R_5$ and $R_5'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

*—N(R_{51})(R_{52})

wherein $R_{51}$ and $R_{52}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{53}$, wherein n is an integer of 1 to 20, and $R_{53}$ is a halogen atom, a hydroxyl group, an amine group, an acryloyl group, an acrylate group, a methacryloyl group, or a methacrylate group, or *—$(CH_2)_n$—$R_{54}$, wherein n is an integer of 1 to 20, and $R_{54}$ is a halogen atom, a hydroxyl group, an amine group, an acryloyl group, an acrylate group, a methacryloyl group, or a methacrylate group.

5. A composition, comprising:
a liquid crystalline compound; and
a dye compound,
wherein the dye compound is represented by Formula 1:

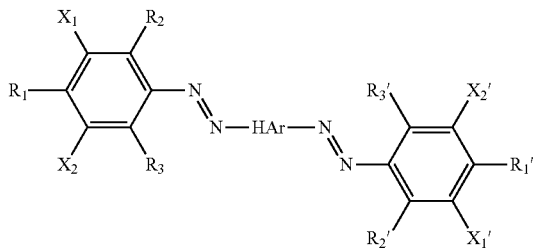

(1)

wherein in Formula (1),
HAr is or

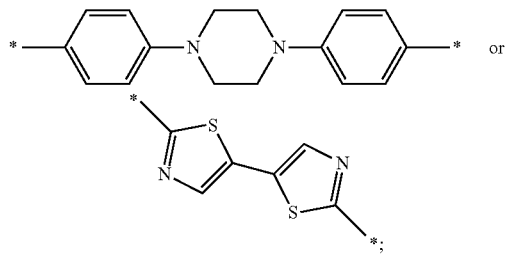

$R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

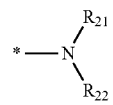

wherein $R_{11}$ and $R_{12}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{13}$, wherein n is an integer of 1 to 20, and $R_{13}$ is a halogen atom, a hydroxyl group, an amine group, an acryloyl group, an acrylate group, a methacryloyl group, or a methacrylate group, or *—$(CH_2)_n$—$R_{14}$, wherein n is an integer of 1 to 20, and $R_{14}$ is a halogen atom, a hydroxyl group, an amine group, an acryloyl group, an acrylate group, a methacryloyl group, or a methacrylate group, or each of $R_1$ and $R_1'$ forms an aromatic ring together with any one of adjacent $X_1$, $X_2$, $X_1'$, and $X_2'$;

$R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$, $$*-N\begin{matrix}R_{21}\\R_{22}\end{matrix}$$

wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$, *—$(CH_2)_n$—$R_{23}$, wherein n is an integer of 1 to 5, and $R_{23}$ is a halogen atom, a hydroxyl group, an amine group, an acryloyl group, an acrylate group, a methacryloyl group, or a methacrylate group, or *—$(CH_2)_n$—$R_{24}$, wherein n is an integer of 1 to 5, and $R_{24}$ is a halogen atom, a hydroxyl group, an amine group, an acryloyl group, an acrylate group, a methacryloyl group, or a methacrylate group, or each of $R_2$, $R_3$, $R_2'$ and $R_3'$ forms an aromatic ring together with any one of adjacent $X_1$, $X_2$, $X_1'$, and $X_2'$; and $X_1$, $X_2$, $X_1'$, and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$, or each of $X_1$, $X_2$, $X_1'$, and $X_2'$ forms an aromatic ring together with any one of adjacent $R_1$, $R_2$, $R_3$, $R_1'$, $R_2'$, and $R_3'$.

6. The composition of claim 5,
wherein the dye compound includes a compound represented by Formula A-1 and a compound represented by Formula B-2:

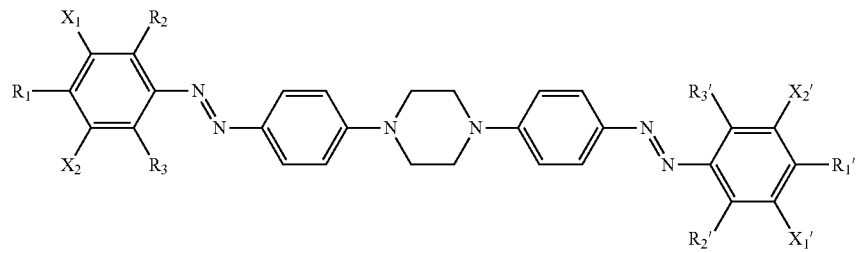

(A-1)

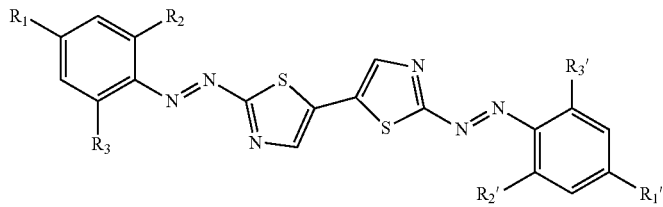

(B-2)

wherein in Formula A-1, $R_1$, $R_2$, $R_3$, $R_1'$, $R_2'$, $R_3'$, $X_1$, $X_2$, $X_1'$, and $X_2'$ have been defined in Formula 1, respectively, and in Formula B-2, $R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

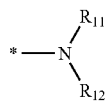

(wherein $R_{11}$ and $R_{12}$ are each independently a hydrogen atom, an alkyl group of $C_{1-10}$, an alkoxy group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{13}$, wherein n is an integer of 1 to 20, and $R_{13}$ is a halogen atom, a hydroxyl group, an amine group, an acryloyl group, an acrylate group, a methacryloyl group, or a methacrylate group, or *—$(CH_2)_n$—$R_{14}$, wherein n is an integer of 1 to 20, and $R_{14}$ is a halogen atom, a hydroxyl group, an amine group, an acryloyl group, an acrylate group, a methacryloyl group, or a methacrylate group); and $R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

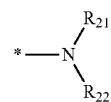

wherein $R_{21}$ and $R_{22}$ are each independently a hydrogen atom, an alkyl group of $C_{1-5}$, an alkoxy group of $C_{1-5}$, an alkylalcohol group of $C_{1-5}$, or an alkylamino group of $C_{1-5}$, *—$(CH_2)_n$—$R_{23}$, wherein n is an integer of 1 to 5, and $R_{23}$ is a halogen atom, a hydroxyl group, an amine group, an acryloyl group, an acrylate group, a methacryloyl group, or a methacrylate group, or *—$(CH_2)_n$—$R_{24}$, wherein n is an integer of 1 to 5, and $R_{24}$ is a halogen atom, a hydroxyl group, an amine group, an acryloyl group, an acrylate group, a methacryloyl group, or a methacrylate group.

7. The composition of claim 6,
   wherein the dye compound further includes a compound represented by Formula C-2 or a compound represented by Formula D-2:

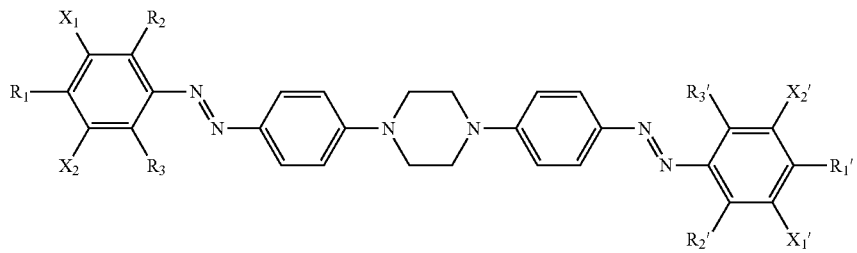

(C-2)

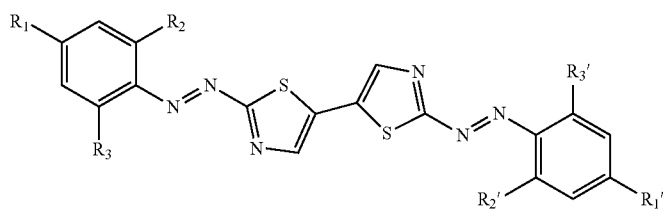

(D-2)

wherein in Formula C-2, $R_{c2}$ and $R_{c2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group, and in Formula D-2, $R_{d2}$ and $R_{d2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

8. The composition of claim 7, wherein the dye compound further includes a compound represented by Formula B-3 or a compound represented by Formula B-4:

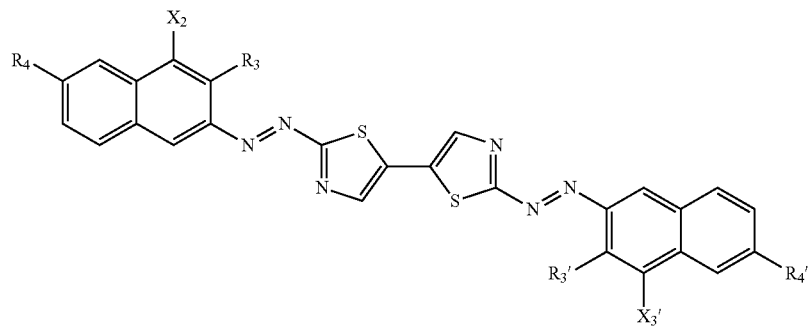

(B-3)

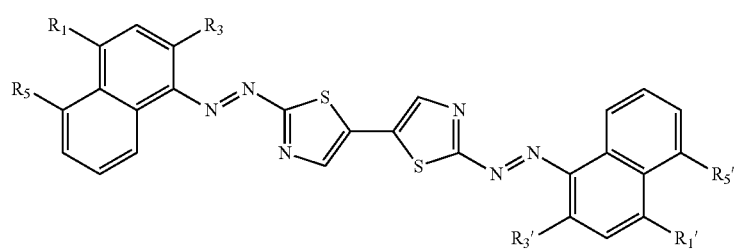

(B-4)

wherein in Formulae B-3 and B-4, $R_1$, $R_3$, $R_1'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

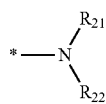

wherein $R_{21}$ and $R_{22}$ are each independently a hydrogen atom, an alkyl group of $C_{1-5}$, an alkoxy group of $C_{1-5}$, an alkylalcohol group of $C_{1-5}$, or alkylamino group of $C_{1-5}$, *—$(CH_2)_n$—$R_{23}$, wherein n is an integer of 1 to 5, and $R_{23}$ is a halogen atom, a hydroxyl group, an amine group, an acryloyl group, an acrylate group, a methacryloyl group, or a methacrylate group, or *—$(CH_2)_n$—$R_{24}$, wherein n is an integer of 1 to 5, and $R_{24}$ is a halogen atom, a hydroxyl group, an amine group, an acryloyl group, an acrylate group, a methacryloyl group, or a methacrylate group;

$X_2$ and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$;

$R_4$ and $R_4'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

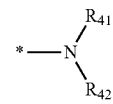

wherein $R_{41}$ and $R_{42}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{43}$, wherein n is an integer of 1 to 20, and $R_{43}$ is a halogen atom, a hydroxyl group, an amine group, an acryloyl group, an acrylate group, a methacryloyl group, or a methacrylate group, or *—$(CH_2)_n$—$R_{44}$, wherein n is an integer of 1 to 20, and $R_{44}$ is a halogen atom, a hydroxyl group, an amine group, an acryloyl group, an acrylate group, a methacryloyl group, or a methacrylate group; and $R_5$ and $R_5'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

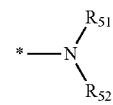

wherein $R_{51}$ and $R_{52}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{53}$, wherein n is an integer of 1 to 20, and $R_{53}$ is a halogen atom, a hydroxyl group, an amine group, an acryloyl group, an acrylate group, a methacryloyl group, or a methacrylate group, or *—$(CH_2)_n$—$R_{54}$, wherein n is an integer of 1 to 20, and $R_{54}$ is a halogen atom, a hydroxyl group, an amine group, an acryloyl group, an acrylate group, a methacryloyl group, or a methacrylate group.

9. The composition of claim 8,
wherein the liquid crystalline compound has a smectic phase, and
the liquid crystalline compound includes a compound represented by Formula F-1:

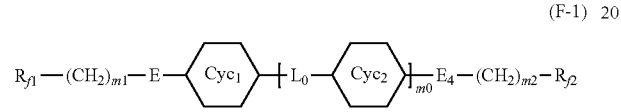

(F-1)

wherein in Formula F-1,
$Cyc_1$ and $Cyc_2$ are each independently 1,4-phenylene, 1,4-cyclohexylene,

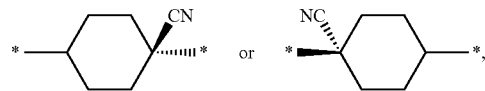

m0 is an integer of 1 to 3,
$L_0$ is a single bond, *—(C=O)O—, —*O(C=O)—, an alkylene group of $C_{1-4}$ (*—$(CH_2)_k$—* wherein k is a natural number), *—CH=CH—*, or *—C≡C—*,
$L_0$ and $Cyc_2$ in a repetition unit defined by m0 are the same as or different from each other,
$E_3$ and $E_4$ are each independently a single bond, *—O—*, *—(C=O)O—*, or *—O(C=O)—*,
m1 and m2 are independently an integer of 0 to 12, and
$R_{f1}$ and $R_{f2}$ are each independently a hydrogen atom, an acryloyl group, an acrylate group, a methacryloyl group, or a methacrylate group, and at least one of $R_{f1}$ and $R_{f2}$ is an acryloyl group, an acrylate group, a methacryloyl group, or a methacrylate group.

10. The composition of claim 9,
wherein the dye compound further includes a compound represented by Formula E-1:

wherein in Formula E-1,
Ar is 1,4-phenylene, 4,4'-biphenylene, 1,4-naphthalene, 2,6-naphthalene,

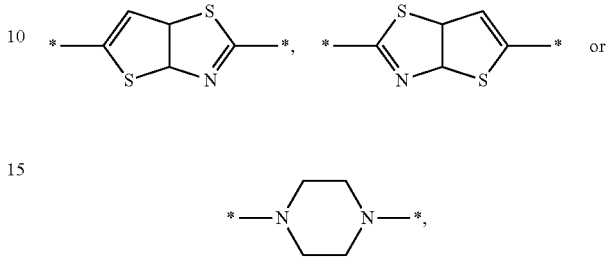

n0 is an integer of 1 to 3,
each Ar in a repeat unit defined by n0 are the same as or different from each other,
$E_1$ and $E_2$ are each independently a single bond, *—O—*, *—(C=O)O—*, or *—O(C=O)—*,
n1 and n2 are independently an integer of 1 to 12, and
$R_{e1}$ and $R_{e2}$ are each independently an acryloyl group, an acrylate group, a methacryloyl group, or a methacrylate group.

11. The composition of claim 10, further comprising:
a crosslinking agent; and
an initiator,
wherein the composition includes 250 to 1500 parts by weight of the liquid crystalline compound, 50 to 500 parts by weight of the crosslinking agent, and 10 to 150 parts by weight of the initiator, with respect to 100 parts by weight of the dye compound.

12. The composition of claim 11,
wherein the composition has a smectic phase at a certain temperature range of 0° C. to 100° C.

13. The composition of claim 5,
wherein the compound represented by Formula 1 is represented by Formula B-1, and
the dye compound further includes a compound represented by Formula C-3 or a compound represented by Formula D-3:

(E-1)

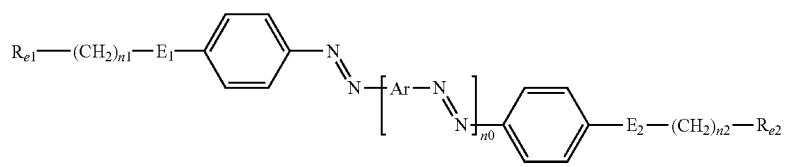

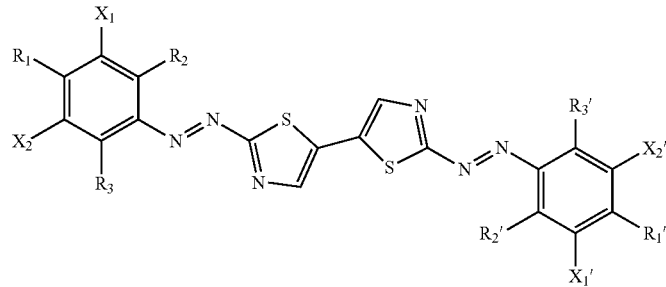

(B-1)

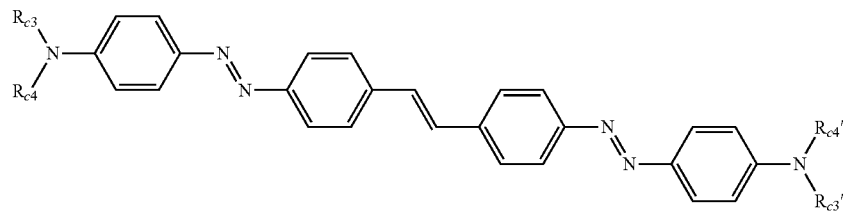

(C-3)

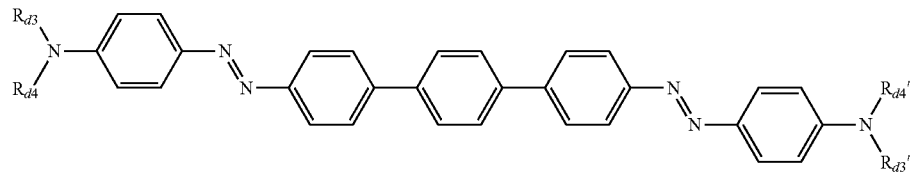

(D-3)

wherein in Formula B-1, $R_1$, $R_2$, $R_3$, $R_1'$, $R_2'$, $R_3'$, $X_1$, $X_2$, $X_1'$, and $X_2'$ have been defined in Formula 1, in Formula C-3, $R_{c3}$, $R_{c4}$, $R_{c3}'$, and $R_{c4}'$ each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group, and in Formula D-3, $R_{d3}$, $R_{d4}$, $R_{d3}'$ and $R_{d4}'$ each independently a hydrogen atom, an alkyl group of $C_{1-20}$, an alkoxy group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

14. The composition of claim 13, wherein the dye compound further include a compound represented by Formula C-2 or a compound represented by Formula D-2:

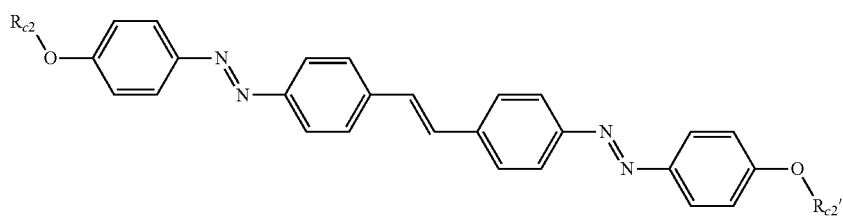

(C-2)

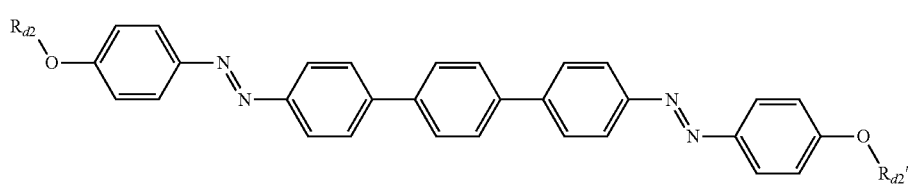

(D-2)

wherein in Formula C-2, $R_{c2}$ and $R_{c2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group, and in Formula D-3, $R_{d2}$ and $R_{d2}'$ each independently a hydrogen atom, an alkyl group of $C_{1-20}$, an alkylalcohol group of $C_{1-20}$, an alkylamino group of $C_{1-20}$, an alkylcarbonyl group of $C_{1-20}$, an acryloyl group, an acrylate group, a methacryloyl group, or a methacrylate group.

15. A display device, comprising:
a polarizing layer containing a dye compound represented by Formula 1:

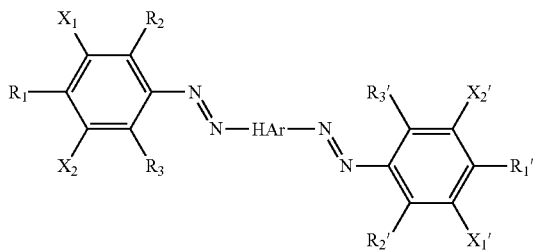

(1)

wherein in Formula (1),
HAr is

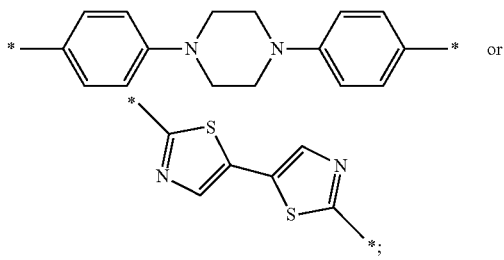

$R_1$ and $R_1'$ are each independently a hydrogen atom, a halogen atom, a carboxyl group, an aldehyde group, a hydroxyl group, a cyano group, a nitro group, an alkyl group of $C_{1-20}$, an alkoxy group of $C_{1-20}$,

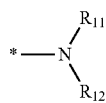

wherein $R_{11}$ and $R_{12}$ are each independently a hydrogen atom, an alkyl group of $C_{1-10}$, an alkoxy group of $C_{1-10}$, an alkylalcohol group of $C_{1-10}$, an alkylamino group of $C_{1-10}$, an allyl group of $C_{3-20}$, an acryloyl group, an acrylate group, a methacryloyl group, or a methacrylate group, *—$(CH_2)_n$—$R_{13}$, wherein n is an integer of 1 to 20, and $R_{13}$ is a halogen atom, a hydroxyl group, an amine group, an acryloyl group, an acrylate group, a methacryloyl group, or a methacrylate group, or *—$(CH_2)_n$—$R_{14}$, wherein n is an integer of 1 to 20, and $R_{14}$ is a halogen atom, a hydroxyl group, an amine group, an acryloyl group, an acrylate group, a methacryloyl group, or a methacrylate group, or each of $R_1$ and $R_1'$ forms an aromatic ring together with any one of adjacent $X_1$, $X_2$, $X_1'$, and $X_2'$;

$R_2$, $R_3$, $R_2'$, and $R_3'$ are each independently a hydrogen atom, a halogen atom, an aldehyde group, a hydroxyl group, a cyano group, a nitro group, an alkyl group of $C_{1-5}$, an alkoxy group of $C_{1-5}$,

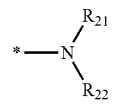

wherein $R_{21}$ and $R_{22}$ are each independently a hydrogen atom, an alkyl group of $C_{1-5}$, an alkoxy group of $C_{1-5}$, an alkylalcohol group of $C_{1-5}$, or alkylamino group of $C_{1-5}$, *—$(CH_2)_n$—$R_{23}$, wherein n is an integer of 1 to 5, and $R_{23}$ is a halogen atom, a hydroxyl group, an amine group, an acryloyl group, an acrylate group, a methacryloyl group, or a methacrylate group, or *—$(CH_2)_n$—$R_{24}$, wherein n is an integer of 1 to 5, and $R_{24}$ is a halogen atom, a hydroxyl group, an amine group, an acryloyl group, an acrylate group, a methacryloyl group, or a methacrylate group, or each of $R_2$, $R_3$, $R_2'$ and $R_3'$ forms an aromatic ring together with any one of adjacent $X_1$, $X_2$, $X_1'$, and $X_2'$; and $X_1$, $X_2$, $X_1'$, and $X_2'$ are each independently a hydrogen atom, a halogen atom, an aldehyde group, a hydroxyl group, a cyano group, a nitro group, an alkyl group of $C_{1-5}$, or an alkoxy group of $C_{1-5}$, or each of $X_1$, $X_2$, $X_1'$, and $X_2'$ forms an aromatic ring together with any one of adjacent $R_1$, $R_2$, $R_3$, $R_1'$, $R_2'$, and $R_3'$.

16. The display device of claim 15, further comprising:
a first display substrate including a first base substrate and a switching element disposed on the first base substrate;
a second display substrate facing the first display substrate and including a second base substrate and the polarizing layer disposed on one side of the second base substrate, facing the first display substrate;
a liquid crystal layer interposed between the first display substrate and the second display substrate; and
a sealing member attaching the first display substrate and the second display substrate to seal the liquid crystal layer.

17. The display device of claim 16,
wherein the second display substrate includes:
a color control pattern layer disposed on one side of the second base substrate;
an overcoating layer disposed on the color control pattern layer; and
a dye alignment layer disposed on the overcoating layer,
wherein the polarizing layer is directly disposed on the dye alignment layer.

18. The display device of claim 15, further comprising:
a first display substrate;
a second display substrate facing the first display substrate and including a base substrate having one side facing the first display substrate and the other side;
a liquid crystal layer between the first display substrate and the second display substrate;
a sealing member attaching the first display substrate and the second display substrate to seal the liquid crystal layer; and
a dye alignment layer directly disposed on the other side of the base substrate, wherein the polarizing layer is directly disposed on the dye alignment layer.

19. The display device of claim 15, further comprising:

a base substrate;

an organic light-emitting element disposed between the base substrate and the polarizing layer; and an encapsulation member disposed between the organic light-emitting element and the polarizing layer to seal the organic light-emitting element.

20. The display device of claim 19, wherein the encapsulation member includes at least one inorganic layer and at least one organic layer which are alternately laminated, and wherein the display device further includes:

a first touch electrode disposed on the encapsulation member;

a second touch electrode disposed on the first touch electrode to be insulated from the first touch electrode;

an insulating layer disposed on the second touch electrode;

a phase retardation layer disposed on the insulating layer; and a dye alignment layer directly disposed on the phase retardation layer, wherein the polarizing layer is directly disposed on the dye alignment layer.

* * * * *